(12) United States Patent
Recker et al.

(10) Patent No.: US 9,408,268 B2
(45) Date of Patent: Aug. 2, 2016

(54) GROUP MANAGEMENT OF A WIRELESS POWER OUTAGE LIGHTING SYSTEM

(71) Applicants: Michael V. Recker, Gaithersburg, MD (US); David B. Levine, Pepper Pike, OH (US)

(72) Inventors: Michael V. Recker, Gaithersburg, MD (US); David B. Levine, Pepper Pike, OH (US)

(73) Assignee: Wireless Environment, LLC, Solon, OH (US)

( * ) Notice: Subject to any disclaimer, the term of this patent is extended or adjusted under 35 U.S.C. 154(b) by 134 days.

(21) Appl. No.: 13/920,545

(22) Filed: Jun. 18, 2013

(65) Prior Publication Data

US 2013/0342131 A1     Dec. 26, 2013

Related U.S. Application Data

(60) Provisional application No. 61/661,548, filed on Jun. 19, 2012.

(51) Int. Cl.
| | | |
|---|---|---|
| G05F 1/00 | (2006.01) | |
| H05B 37/02 | (2006.01) | |
| H05B 39/04 | (2006.01) | |
| H05B 41/36 | (2006.01) | |
| H05B 33/08 | (2006.01) | |
| H02J 9/06 | (2006.01) | |
| H02J 17/00 | (2006.01) | |

(52) U.S. Cl.
CPC ............ *H05B 33/0842* (2013.01); *H02J 9/065* (2013.01); *H02J 17/00* (2013.01); *H05B 37/0272* (2013.01)

(58) Field of Classification Search
CPC .................................................. H05B 33/0842
USPC ..................................................... 315/292, 297
See application file for complete search history.

(56) References Cited

U.S. PATENT DOCUMENTS

| | | | | |
|---|---|---|---|---|
| 6,634,768 B2* | 10/2003 | McKenzie | .............. | F21S 9/022 362/253 |
| 7,715,866 B2* | 5/2010 | Seppinen | ............ | H04W 52/243 370/252 |
| 8,941,269 B1* | 1/2015 | Flegel | .................... | H01H 35/00 307/115 |
| 9,094,083 B2* | 7/2015 | Hunzinger | ......... | H04B 7/15535 |
| 2006/0146553 A1* | 7/2006 | Zeng | ...................... | B60Q 3/001 362/488 |
| 2006/0239333 A1* | 10/2006 | Albert | ............... | H04W 72/0406 375/130 |
| 2008/0180935 A1* | 7/2008 | Burdeen | ............ | H05B 37/0272 362/20 |
| 2009/0278479 A1* | 11/2009 | Platner et al. | ................. | 315/312 |
| 2010/0237781 A1* | 9/2010 | Dupre et al. | .................... | 315/86 |

* cited by examiner

*Primary Examiner* — Sibin Chen
*Assistant Examiner* — Metasebia Retebo
(74) *Attorney, Agent, or Firm* — Finnegan, Henderson, Farabow, Garrett & Dunner, LLP

(57) ABSTRACT

Aspects of the presently disclosed embodiments may include a wireless power outage lighting system comprising one or more power change detection apparatuses and one or more wireless lighting modules where the system is implemented to allow management of multiple groups in the same area such that interference may be avoided when there are multiple transmissions in the same area. A power change detection apparatus may be configured to transmit to avoid interference with another power change detection apparatus. A power change detection apparatus may also be configured through the user input method to operate different groups of wireless lighting modules such that lighting zones may be created. Multiple lighting zone allow a user to configure lighting provided by the wireless power outage lighting system based on their preference.

11 Claims, 15 Drawing Sheets

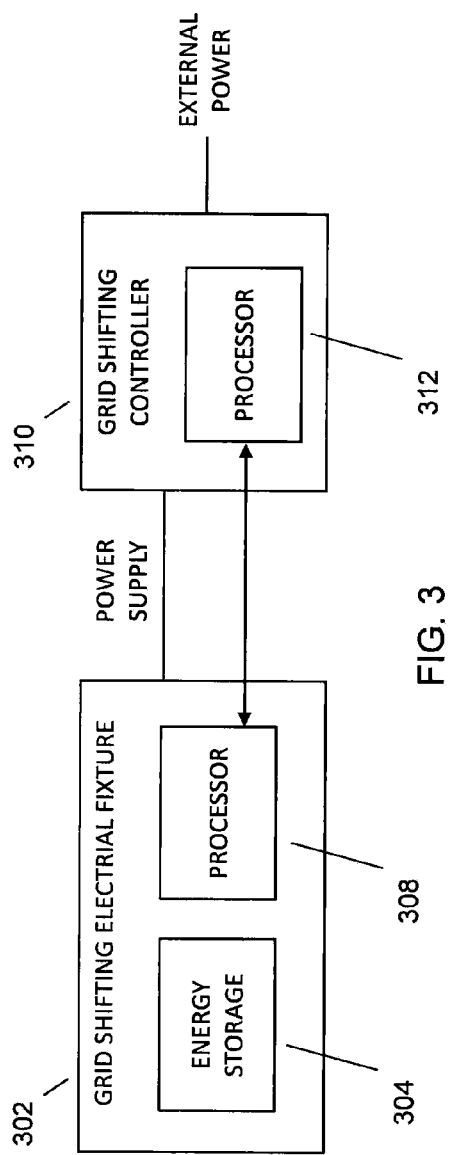
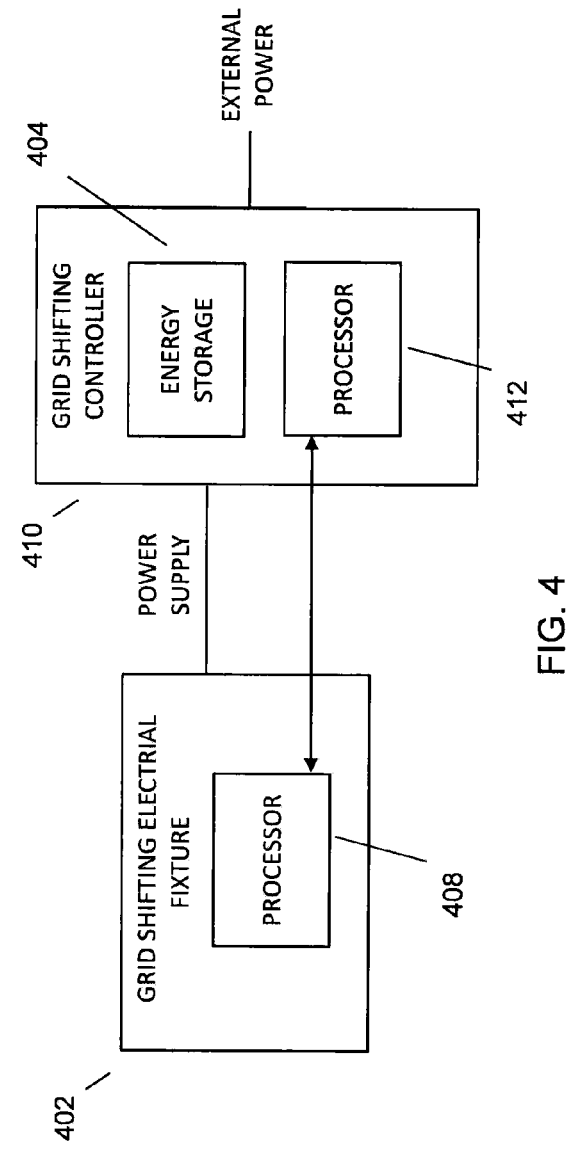

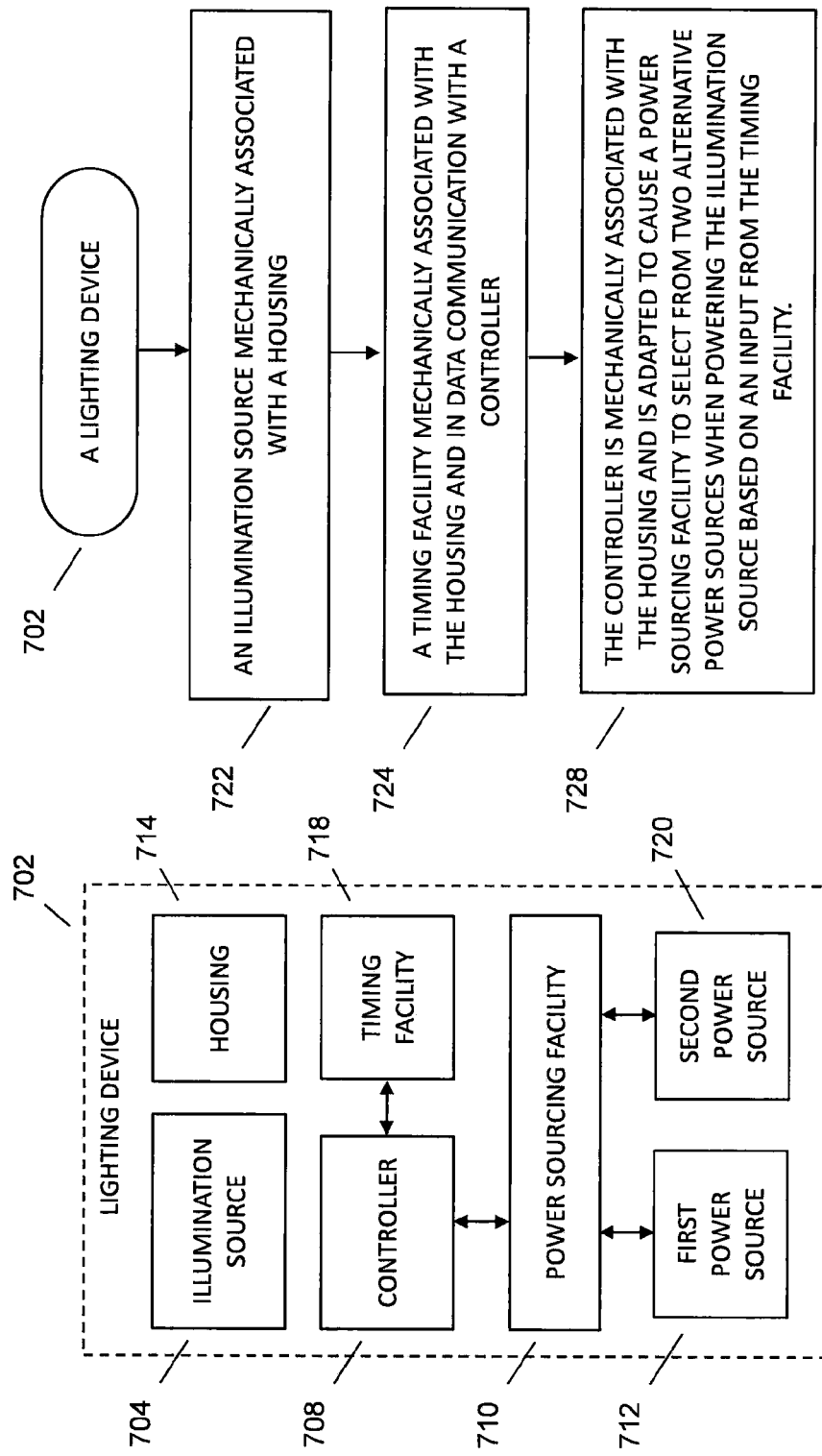

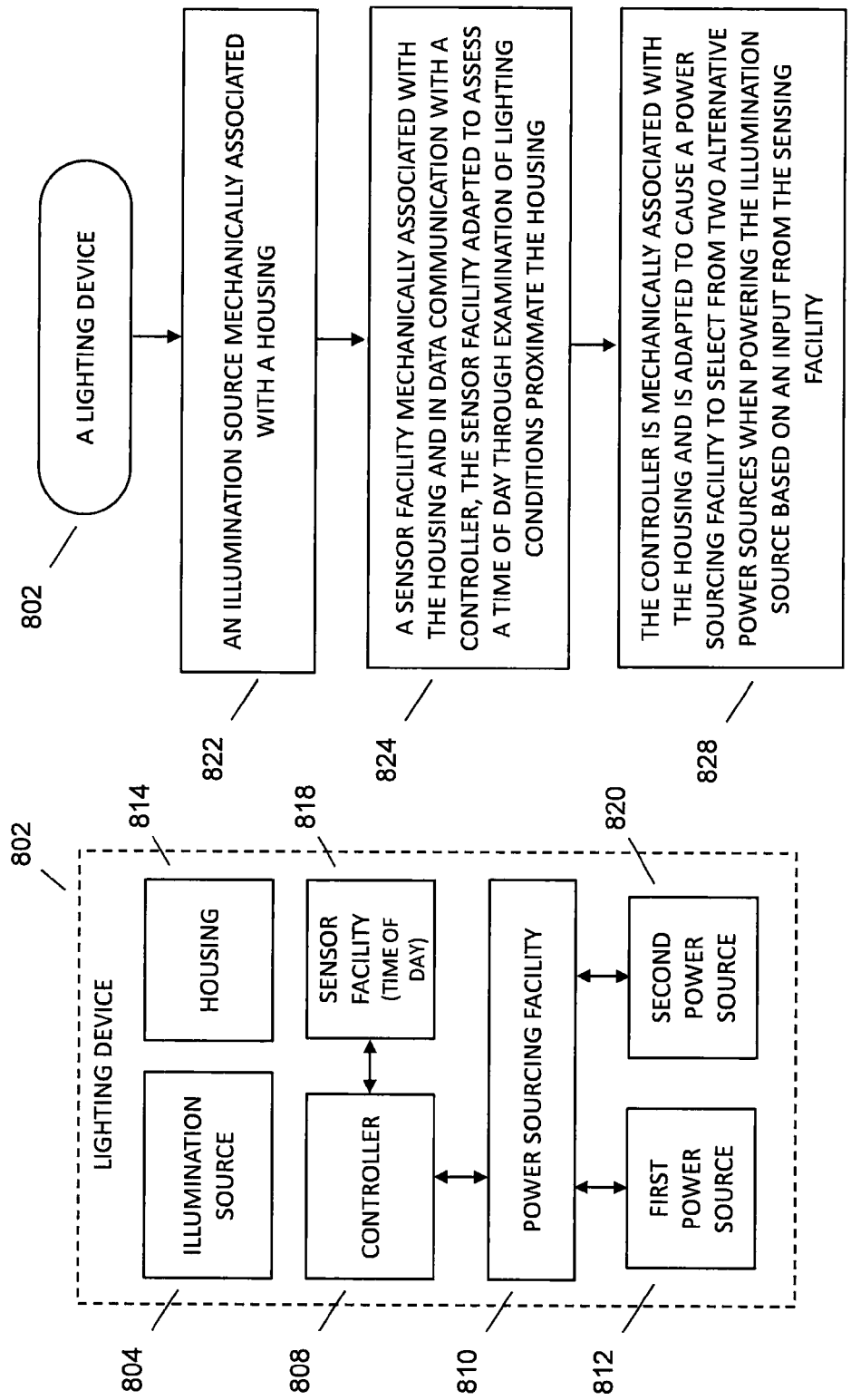

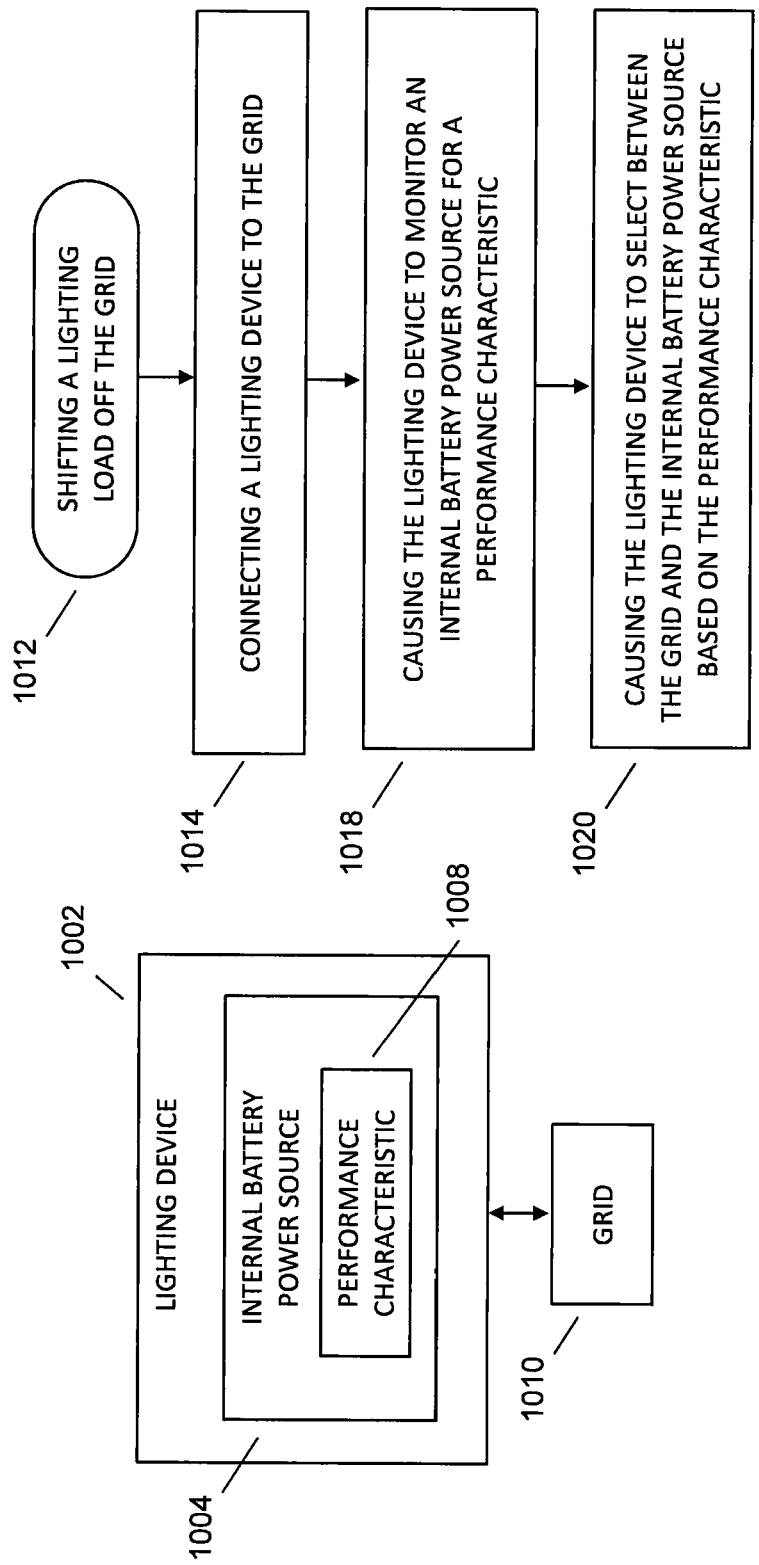

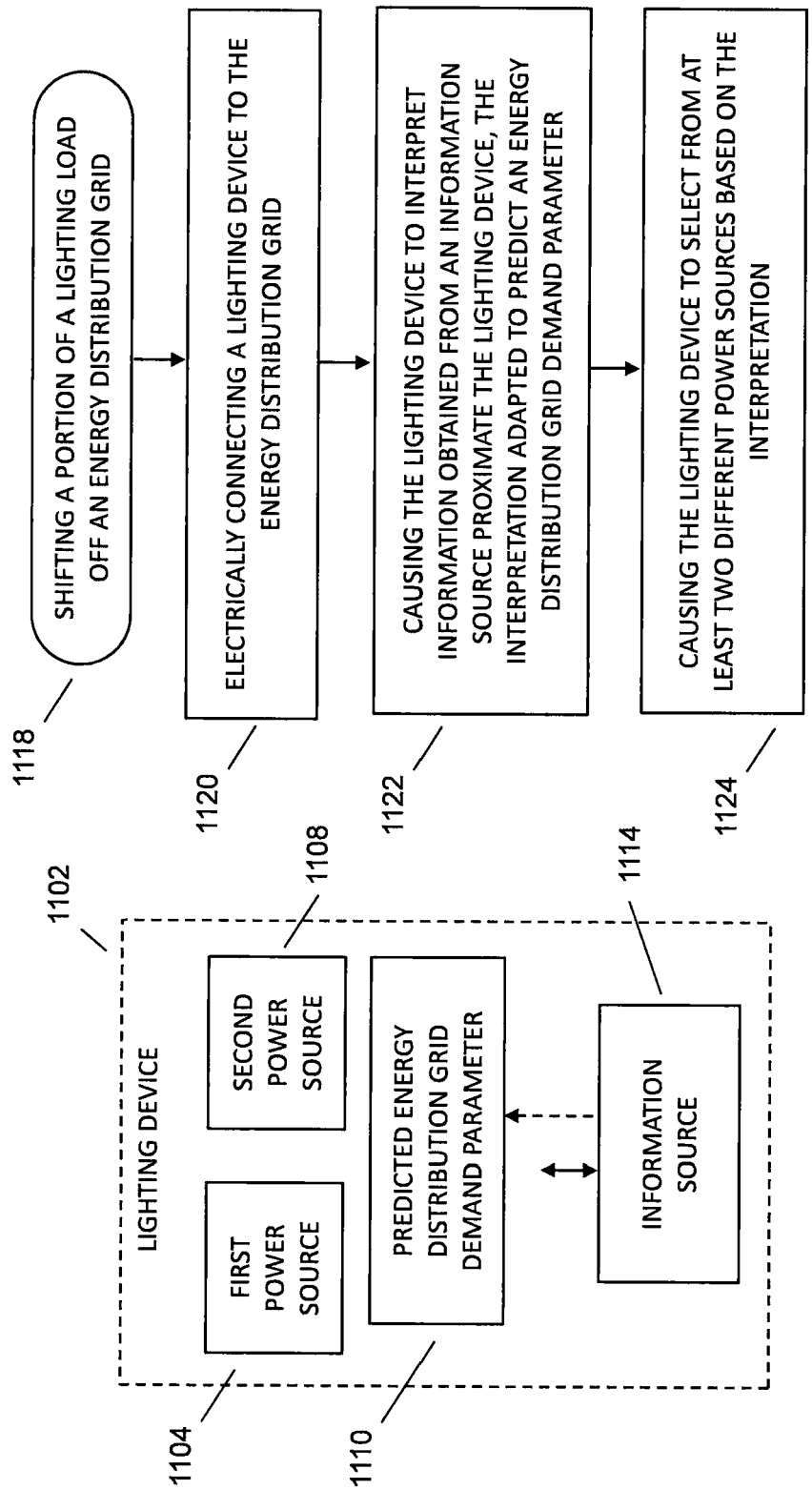

GROUP MANAGEMENT OF A WIRELESS POWER OUTAGE LIGHTING SYSTEM

CROSS-REFERENCE TO RELATED APPLICATIONS

This application claims the benefit of U.S. Provisional Patent Application Ser. No. 61/661,548 entitled "GROUP MANAGEMENT OF A WIRELESS POWER OUTAGE LIGHTING SYSTEM" which was filed Jun. 19, 2012. The entirety of the aforementioned application is incorporated herein by reference.

BACKGROUND

The present disclosure is directed generally to devices and applications for the use of wireless control and wireless power in lighting devices. More particularly, the invention relates to the use of wireless control and wireless power in light emitting diode (LED) based devices primarily for illumination purposes.

Conservation and management of electrical power are a growing concern with regard to both cost and environmental impact. In various lighting applications, the use of light emitting diodes (LEDs) for illumination is beginning to emerge as a lighting source with potential for addressing these concerns. LED light sources have a long life, are energy efficient, are durable and operate over a wide temperature range. While LED lighting is becoming an attractive option for certain applications, it is not optimal for many applications. Therefore, there is a need for improved LED lighting systems.

SUMMARY

The present disclosure is directed generally to devices and applications related to the use of wireless control and wireless power in light emitting diode (LED) based lighting devices. More particularly, the devices and applications according to various embodiments of the present invention make use of wireless control and wireless power in lighting devices to provide advantages that may include increased ease of installation, increased ability to install lighting in locations independent of a connection to wired power, increased cost savings, increased energy efficiency, reduced energy consumption at times of peak demand through controls and power management and in safety, security, and increased convenience for the end user.

Wireless control, as in relation to lighting facilities of the present invention, may be defined as any control aspect that provides a controlling function to the lighting facility without the use of a wired connection, such as a wired control interface, wired power control, and the like. Control aspects may include, but are not limited to, a wireless remote control interface (e.g. RF remote control), a wireless power controller (e.g. control of the source of power to the LEDs, such as including integrated energy storage device(s) and AC power), a wireless control input (e.g. an environmental sensor input), internal programmed control (e.g. internal program store controlled through a state machine or processor), and the like. In embodiments, cost savings and power management may be implemented through wireless control. In embodiments, wireless control may enable a distributed intelligence architecture where the LED lighting facility may operate in an autonomous manner in response to its wireless control inputs or internal program. In embodiments, wireless control may be used in conjunction with wireless power to allow operation of the lighting facility completely independent of the power grid.

In some embodiments, wireless control allows the installation of the device in any indoor or outdoor location where light may be desired without the need for a wired connection to control it. In some embodiments, wireless control is used in a lighting device with a wired connection but allows an alternate method of control of the light rather than by its wired connection. In some embodiments, a lighting circuit may have multiple lights on the circuit, but wireless control built into the lights on that lighting circuit may allow them to be independently controlled.

Power sources that can be used stand-alone as described herein (i.e. not connected to a traditional AC power source) are defined as wireless power sources. A wireless power source may be an energy storage device such as a non-rechargeable battery, a rechargeable battery, a capacitor, a fuel cell, and the like. A wireless power source may be derived from an energy harvesting method such as using solar cells, capturing radiofrequency energy, converting kinetic energy to electrical energy (including converting motion or tension into electrical energy), converting thermal energy into electrical energy, converting wind energy into electrical energy, and the like. Multiple wireless power sources may be used together in some embodiments. For example, a light bulb with an integrated rechargeable battery may also contain solar cells on its housing and the ability to charge the integrated battery accordingly.

In some embodiments, a wireless power source integrated into the lighting device allows the installation of the lighting device in any indoor or outdoor location where light may be desired without the need for a wired connection to an AC power source. In other embodiments there is a wired connection to an AC power source, but the wireless power source is used when advantageous, for example as a backup power source in an emergency or as an alternative power source to provide energy efficiency or cost savings.

The embodiments described for the present invention may use wireless control and wireless power in conjunction with LEDs as a light source for illumination. In one embodiment, a power uninterruptable LED light with sensor-based control for transferring to internal power in the event of an AC power disruption is described. The power uninterruptable LED light may be designed in a housing type of a bulb, tube, lamp, fixture, retrofit fixture, and the like. The housing may contain internal wireless power in the form of an internal power source such as a rechargeable battery that can be used to power the light source upon a detected AC power disruption. For example, the power uninterruptable LED light may be a standard size light bulb that when plugged into a standard light socket acts normally as a light bulb, but in the event of an AC power disruption may use the internal power source to continue emitting light through the power disruption. Several forms of wireless control can be used with the disclosed invention including AC power sensing, impedance sensing of the lighting circuit to determine the on/off state of controlling switches, remote control in the form of a radio frequency receiver, sensors built into the housing such as a switch sensor, motion sensor or light sensor, and the like.

Another embodiment of the invention is directed to a wirelessly controlled LED light bulb containing an integrated power source where the wireless control is through built in sensors, program based intelligence, remote control based on a communication interface wirelessly, over the wire, and the like. With wireless control and wireless power integrated, the wirelessly controlled LED light bulb may operate autonomously in response to the input devices, internal timers, internal clock and/or internal program. It may have the ability to use the integrated power source autonomously for grid shifting, load shedding, independent control of the light sources on a single lighting circuit, backup power, energy harvesting when an energy harvesting power source is integrated in the bulb, or any application-specific function in which an integrated power source may be advantageous.

Another embodiment of the invention is directed to a wirelessly networked LED light with sensor-based control. The wirelessly networked LED light with sensor-based control may be designed in a housing type of a bulb, tube, lamp, fixture, retrofit fixture, battery powered fixture, and the like. Building a networking capability into a removable and replaceable wirelessly networked LED light bulb creates the ability to plug bulbs in such that they become part of the network without running new wiring (i.e. a plug and play lighting network). This is enabled by building the ability to receive control and programming over a network as well as forward or route traffic to other wirelessly networked LED lights that are part of the network into the lights themselves. If the wirelessly networked LED light is a removable device such as a bulb, tube or lamp, it may be installed as a light source and a node in the lighting network by installing it in a standard socket. Networked bulbs, tubes, lamps, fixtures, retrofit fixtures and battery powered fixtures may operate in a coordinated fashion, where one or more light sources are operating with battery only, battery and AC or AC only power sources along with any control source within the group. In some embodiments, the source of the control for one or more lights in the group may be one of the lights in the group in response to a control input that light received. In addition to coordinating operation, the network may be used for communication purposes such that an extensible lighting network can be installed by installing bulbs, tubes, lamps and battery power fixtures in existing locations that do not require an electrician for new wiring or special hardware other than what is contained with the wirelessly networked LED light itself.

Another embodiment of the invention is directed to a centralized power outage system bridged to a networked lighting system. The centralized power outage control may come in the form of a module that detects a disruption in the AC power source and transmits to a system of bulbs, tubes, lamps, fixtures, retrofit fixtures, battery powered fixtures, and the like, to turn on, switch to backup power or change their mode of operation in some manner in response to the detected disruption in power. The power outage module may be connected to an emergency lighting circuit to transmit control to a networked lighting system when the emergency lighting circuit attempts to turn on emergency lighting. Due to its integrated power source, a wirelessly controlled and/or wirelessly powered LED light may continue to operate in an emergency situation as controlled by a power outage control module.

It should be appreciated that combinations of the foregoing concepts and additional concepts discussed in greater detail below are contemplated as being part of the inventive subject matter disclosed herein. In particular, all combinations of claimed subject matter appearing at the end of this disclosure, or elsewhere herein, are contemplated as being part of the inventive subject matter.

These and other systems, methods, objects, features, and advantages of the present invention will be apparent to those skilled in the art from the following detailed description of the preferred embodiment and the drawings. All documents mentioned herein are hereby incorporated in their entirety by reference.

BRIEF DESCRIPTION OF THE FIGURES

The invention and the following detailed description of certain embodiments thereof may be understood by reference to the following figures:

FIG. 3 shows a block diagram of a grid shifting system containing an energy storage device in the electrical fixture;

FIG. 4 shows a block diagram of a grid shifting system containing an energy storage device in an external grid shifting controller;

FIG. 7A shows a block diagram of a lighting device with internal timing for grid shifting;

FIG. 7B shows a flow diagram of a lighting device with internal timing for grid shifting;

FIG. 8A shows a block diagram of a lighting device with time of day inference for grid shifting;

FIG. 8B shows a flow diagram of a lighting device with time of day inference for grid shifting.

FIG. 10A shows a block diagram of a lighting device shifting a lighting load off the grid based on an internal power source performance characteristic;

FIG. 10B shows a flow diagram of a lighting device shifting a lighting load off the grid based on an internal power source performance characteristic;

FIG. 11A shows a block diagram of a lighting device shifting a lighting load off the grid based on internally derived information associated with an energy distribution grid demand parameter;

FIG. 11B shows a flow diagram of a lighting device shifting a lighting load off the grid based on internally derived information associated with an energy distribution grid demand parameter;

Figure 1:
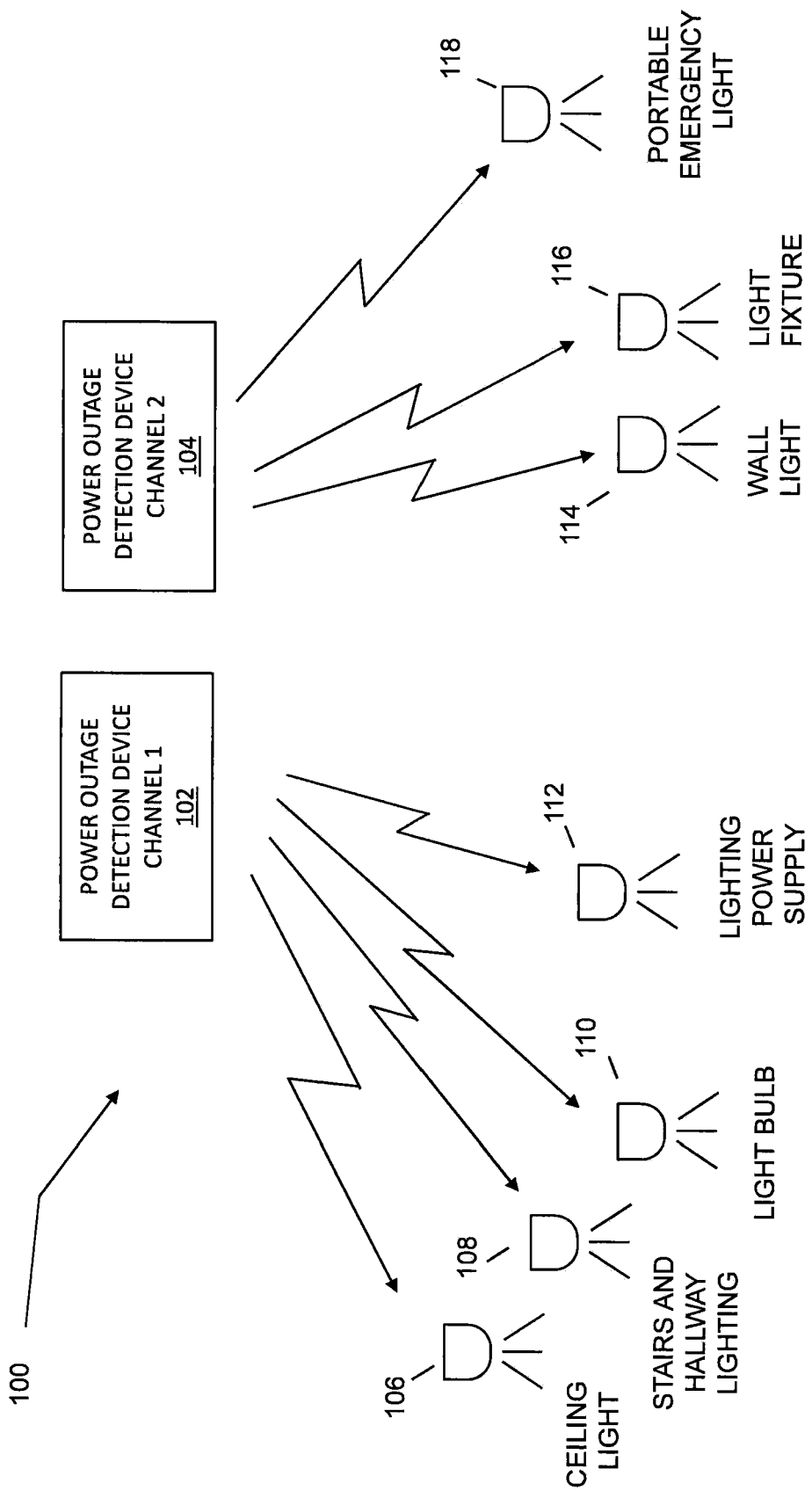
FIG. 1 shows a method of group management for a wireless power outage lighting system.

While the invention has been described in connection with certain preferred embodiments, other embodiments would be understood by one of ordinary skill in the art and are encompassed herein.

DETAILED DESCRIPTION

The claimed subject matter is described with reference to the drawings, wherein like reference numerals are used to refer to like elements throughout. In the following description, for purposes of explanation, specific details may be set forth in order to provide a thorough understanding of the subject innovation. It may be evident, however, that the claimed subject matter may be practiced without these specific details. In other instances, well-known structures and devices are shown in block diagram form in order to facilitate describing the subject innovation. Moreover, the drawings may not be to scale.

In embodiments, the present invention may provide for a power outage lighting management within an environment, comprising a power outage detection device adapted to detect a power outage condition and to wirelessly transmit power outage indication data to a plurality of lighting systems within the environment, where at least one of the plurality of lighting systems include an LED light source that is powered by an internal power source. The plurality of lighting systems may include a light source that is powered selectively by either the internal power source or an external power source. In response to receiving the power outage power indication data, the lighting system including the LED light source that is powered by the internal power source may regulate a light intensity of the LED light source in accordance with the power outage indication data, such as the light intensity as a dimmed light condition, the light intensity as a full brightness light condition or other condition.

In embodiments, the present invention may provide for a power outage management for a plurality of lighting sources, comprising, for example, a plurality of lighting facilities containing an LED lighting source, a power outage input device, an internal power source, a control facility for manipulating the light output of the LED lighting source, and the like, wherein the lighting facility may provide light in response to a power outage signal received by the power outage input device indicating a power outage condition; and a power outage detection device that monitors power at some point in power distribution to detect the power outage condition, where the power outage detection device may wirelessly transmit the power outage signal to the power outage input device of the at least one of the plurality of lighting facilities when the power outage condition is detected. In embodiments, the outage input device may contain a wireless receiver to receive the power outage signal. The response may be provided with an environmental input from a sensor input device in the lighting facility in addition to the signal received by the power outage input device. The lighting facility may take the form of at least one of a light bulb capable of mounting into a lighting fixture, a lighting fixture, a retrofit lighting fixture, a lighting adapter, a battery powered lighting fixture, and the like. The centralized controller may be running a software control program. The signal may be received from a web-based source. The web-based source may be on a local network, on the Internet, and the like. The internal power source may be a rechargeable energy storage device integrated with the lighting facility that is capable of supplying power to the lighting facility independent of the power distribution, and where the recharging may be provided internal to the lighting facility at a time when the power distribution is available. The rechargeable energy storage device internal to the lighting facility may be a battery, fuel cell, super capacitor, and the like. The internal power source may be a non-rechargeable power source such as an alkaline battery. The lighting facility may be disconnected and used as a portable lighting device. The sensor may sense infrared, temperature, light, motion, acoustic, smoke, electromagnetic, vibration or other suitable input. The manipulating may include, for example, switching on the light output, changing the illumination level of the light output, flashing the light output, changing the color content of the light output, and the like. The power outage module may contain an integral power source. The power outage module may contain a light source, where the power outage module may be disconnected from a power source and used as a portable lighting device. The response may be provided with an environmental input from a sensor input device in the centralized controller. The centralized controller may contain pushbuttons, switches, dials, and the like to control the lighting facilities remotely. The centralized controller may be a power outage module monitoring an emergency lighting circuit to detect an indication that emergency lighting must be activated. In this way, the power outage device may be connected to an emergency lighting circuit (e.g., not part of power distribution) but it may allow a wireless extension of the emergency lighting circuit. In some embodiments, the power outage module may be plugged into a wall outlet, screwed into an Edison socket or the like. In embodiments, the present invention may provide a detached lighting system that could be supplemental to an installed emergency lighting system by propagating the control through a connected power outage device to the lights and as such provide a full off the grid power outage lighting system.

In an illustrative embodiment, a method for implementing group management of a wireless power outage lighting system that allows multiple power outage detectors (POD) to operate in the same area to control different groups of wireless lighting modules or wireless lighting devices is described for use in a Multiple Zone Wireless Power Outage Lighting System 100. With reference to FIG. 1, illustrated is a block diagram view of an embodiment of a Multiple Zone Wireless Power Outage Lighting System 100. In the illustrated embodiment, the Multiple Zone Wireless Power Outage Lighting System 100 includes one or more power change detection apparatus 102/104 and one or more wireless lighting modules or devices including but not limited to a ceiling lights 106, stair and hallway lights 108, light bulbs 110 such as LED light bulbs, lighting power supplies 112 such as battery backed ballasts, LED drivers or inverters, wall lights 114, light fixtures 116 and portable lights 118 such as lanterns, table lamps, flashlights and the like. In such embodiments, a channel number or frequency of operation may be assigned to a power change detection apparatus such that it may control the wireless lighting modules or devices assigned to the same channel number or frequency of operation. In embodiments, a power change detection apparatus may contain a wireless transmitter to control wireless lighting modules or devices in response to a change in power or a user action. In some embodiments, the power change apparatus may use time division multiplexing or a time slot structure to avoid interference when multiple power change detection apparatuses operate in the same area. In some embodiments, each power change detection apparatus may operate on its own frequency. It is to be appreciated that the power change detection apparatus and wireless lighting modules or devices may have a user input interface to allow a user to set the channel or frequency to operate on. The power change detection apparatus may also be used as a remote control device with buttons, switches or similar to allow a user to control the operation of the wireless lighting modules or devices in a remote control fashion independent of a power outage. In some embodiments, the power change detection apparatus may be removable from an electrical outlet or wherever it is attached to detect an electricity outage and used as a remote control by a user. In some embodiments, the power change detection apparatus may contain a light source. In one example, the power change detection apparatus may look like a standard flashlight that plugs into the wall. In embodiments, a wireless lighting module or device may contain a light source, energy storage device, a wireless receiver and a user input interface. By way of an example, a residence may have two power change apparatuses installed and two sets of wireless lighting modules or devices where it is desirable to have two zones that operate independently. In the example, one set of a power change detection apparatus and associated wireless lighting modules or devices may be installed on the first floor of a residence covering the living room, kitchen and dining room. A second set of a power change detection apparatus and associated wireless lighting modules or devices may be installed on the second floor in the bedroom area. Each group of detection apparatus and lighting devices would work independently and would be made operational by the mechanism that avoids interference in time, frequency or corruption of a transmitted message. In embodiments, when there is detected change in power, both power change detection apparatuses will detect the change at nearly the same time. In order to operate within the same area, a power change detection apparatus will either have to avoid transmitting at the same time, on the same frequency or do so by encoding or modulating the transmission such that simultaneous transmission more than one power change detection apparatus will be received correctly by the wireless light modules or devices that the transmissions are intended to control. In embodiments when the power change detection apparatus may be used as a remote control device, it may control the associated group of lighting devices. In such embodiments, as a remote control a power change detection apparatus may or may not have an interference avoidance mechanism.

In an alternate embodiment, a power change detection apparatus may have an input method that allows it to operate on more than one channel. In one embodiment, given one or more wireless lighting modules or devices in an area, the input method may comprise of multiple push buttons with each button transmitting on a channel, frequency or similar that may be received by a subset of the modules or devices in the area such that a user may control zones of lighting devices independently from power change detection apparatus when it is used as a remote control. Referring to the example where there is one zone of lights on the first floor and one zone of lights on the second floor of a residence, the power change detection apparatus plugged into an electrical outlet may turn on or off all of the lights in response to a detected change in the state of power however when the power change detection apparatus is removed from the electrical outlet to be used as a remote control, one push button may operate as a toggle on/off control for one zone and a second push button may operate as a toggle on/off control for the second zone allowing a user to turn on and off lights in zones as desired rather than have control that can only operate all of the lights. In some embodiments, the power change detection apparatus may have an all ON or all OFF command that will turn lights on and off independent of the assigned channel, frequency or the like. In embodiments, the power change detection apparatus may control the lighting devices in any manner described herein such as on/off control, brightness control, device configuration and the like. It is to be appreciated that any number of zones may be created that may be controlled by a power change detection apparatus in any user input manner mentioned herein.

In embodiments of an intelligent wall switch, a wall switch may be designed to include a charging mode that may allow the switch to be closed to allow charging of a rechargeable integrated power source in the devices or on the circuit that it is controlling. The intelligent wall switch may provide a change in the electrical characteristics of the line to allow devices on the circuit to detect different modes. By way of an example, a device with a switch sense circuitry may be able to detect charging mode remotely by measuring some electrical characteristic of the branch circuit and change state appropriately. In this example, detecting charging mode may allow a device to charge a rechargeable integrated power source without powering the device for normal operation.

In embodiments, an intelligent grid shifting system may be constructed using an intelligent wall switch and a device with a rechargeable integrated power source with the ability of the intelligent wall switch to enter a charge mode that the end device may detect or may be programmed to enter into a charge mode simultaneously with the wall switch. In some embodiments, the intelligent wall switch and/or grid shifting device may be programmed directly at the switch or device via some user interface with the configuration maintained on the switch or device. In embodiments, the intelligent grid shifting system may communicate with control systems for status and control of the grid shifting function provided by the intelligent grid shifting system. In some embodiments, the intelligent wall switch includes the ability to communicate via wired or wireless connection as mentioned herein. In embodiments, the intelligent wall switch and/or grid shifting device may be programmed, configured or queried via the wired or wireless communication interface by an external controller. In charge mode, the intelligent wall switch may automatically close the wall switch or bypass the wall switch allowing power to be applied to the circuit at times when power was not intended to be applied to the circuit. If the end device may detect that the power is applied but the mode is charge mode, the end device may use the applied power only for charging purposes. The end device may detect charge mode using switch sense functionality, using a communication mechanism over the circuit, by means of synchronized operation with the intelligent wall switch such that both the switch and end device enter charge mode at the same time or the like. In one embodiment, an intelligent grid shifting lighting system may be developed using an intelligent wall switch and one or more lighting devices with a rechargeable integrated power source, charging circuitry, switch sense functionality and a light source that may be powered by either the external power input or the integrated power source. In such an embodiment, the intelligent wall switch may be programmed to use time of day to enter charging mode when the lighting device may not be used, for example during night hours when there is no occupancy in an office space. The lighting devices may detect that the intelligent wall switch is in charge mode and also enter charge mode. As such, the lighting devices use the external power source to charge the integrated power source if needed and do not illuminate the light source. The intelligent wall switch may have user control, for example an on/off switch, such that a user may turn the lighting devices on and off as desired. If a user turns the lights on while in charging mode, the lighting devices may detect the change in switch state and illuminate the light source. In embodiments, the lighting devices have a time of day clock and enter charging mode approximately at the same time as the intelligent wall switch. The intelligent wall switch may be any type of switch or controlling device used to control an electrical or lighting circuit such as but not limited to toggle switches, dimmer switches, three way or multi-way switches, timer controlled switches, motion sensor switches, push button or touch switches, paddle switches, solid state switches, slide switches, rotary switches, control panels, lighting control systems, dedicated charge mode devices and the like. The intelligent grid shifting system may be used for grid shifting for energy efficiency, demand response applications, peak shedding, load control, load leveling, backup power or any other use of a hybrid power system mentioned herein.

Figure 2:
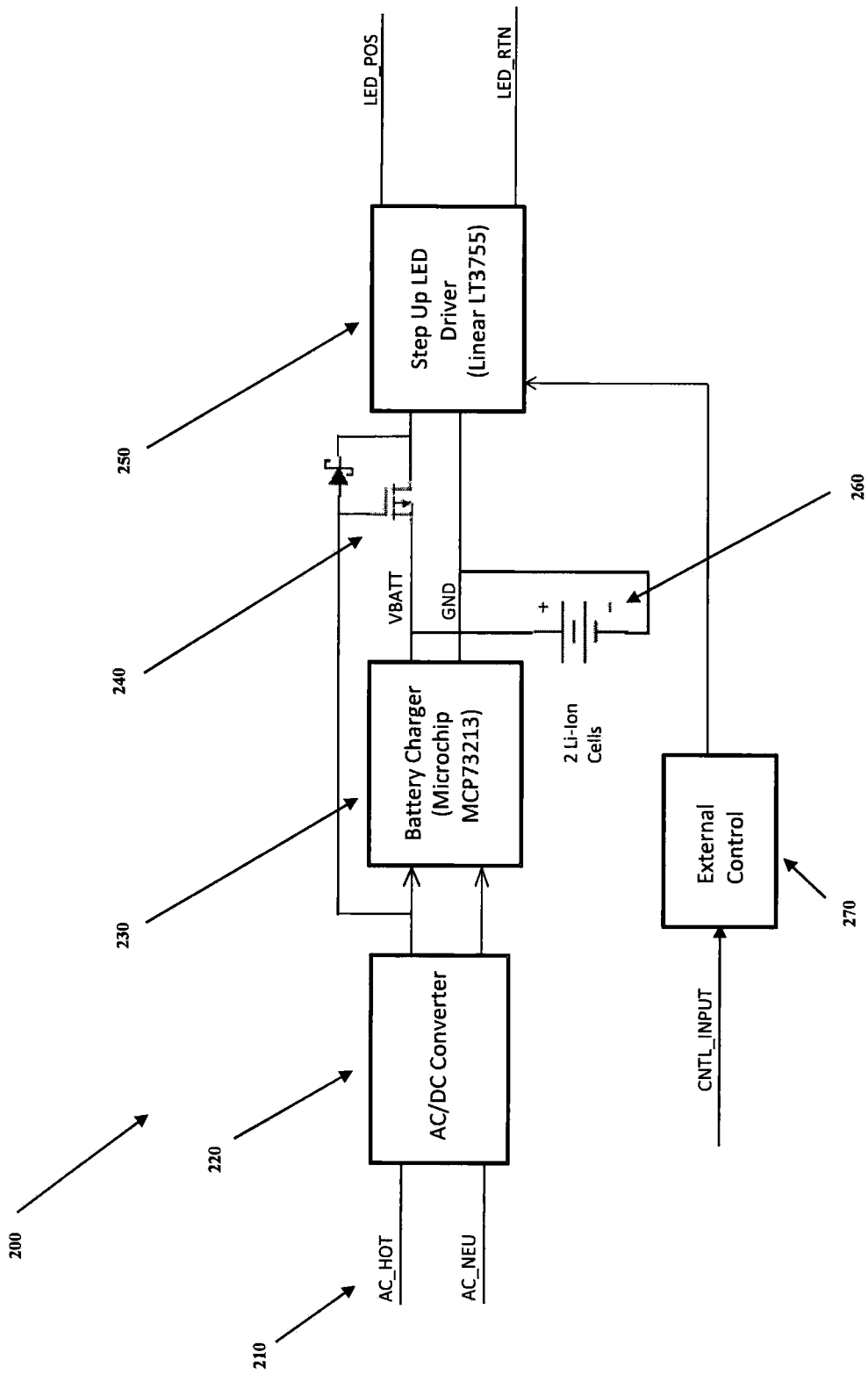
FIG. 2 shows a block diagram of a battery backed LED driver module.

In embodiments, a Battery Backed LED Driver may be constructed. FIG. 2 shows a block diagram of the Battery Backed LED Driver 200 that may use the external power source or integrated power source if the external power source is not available. The Battery Backed LED Driver 200 may include an external power input 210, an AC/DC converter 220, battery charger circuitry 230, a power source selection circuit 240, a step up LED driver 250, an integrated power source 260 and an external control input 270. A Battery Backed LED Driver 200 may be designed with power source selection circuit 240 such that when external power is applied, the external power input 210 supplies power to the light source. When the external power is no longer present the power source selection circuit 240 may automatically switch such that the integrated power source 260 may supply power to the light source. In the illustrative embodiment, the light source may be driven by the step up LED driver 250 whether the power source is the external power input 210 or the integrated power source 260. In the illustrative embodiment, the power selection circuit 240 consists of diode and a FET to allow for the automatic selection of the power source into the step up LED driver 250 such that when power is supplied by the external input, the battery is disconnected from the step up LED driver 250 and when power is not supplied at the external input the FET connects the integrated power source 260 to the step up LED driver 250. In embodiments the switching circuitry may consist of a relay, solid state switch, discrete circuitry and the like such that the desired power source may be supplied. It is to be appreciated that several methods of selecting and switching the power source will be readily apparent to those skilled in the art. In the illustrated embodiment, the step up LED driver 250 is a Linear Technology LT3755 step up LED driver 250. It is to be appreciated that any type of step up DC/DC converter and/or LED constant current driver circuit may be used to supply power with the desired drive characteristics. It is to be appreciated that any alternate LED driver may be used and that driver may be a step up driver, a step down driver, a buck boost driver or the like.

In the illustrated embodiment, the embedded battery supply 260 is a dual cell Li-Ion battery pack. The integrated power source 260 may be any rechargeable battery type mentioned herein. In embodiments, the integrated power source 260 may be non-rechargeable such as one or more alkaline batteries. In other embodiments, the integrated power source 260 may be a capacitor, super capacitor, fuel cell etc. In the illustrative embodiment, the dual cell Li-Ion battery pack is charged with dual cell Li-Ion charging circuit based on the Microchip MCP73213 battery charger. It is to be appreciated that any type of battery charger circuit may be used to charge the desired type rechargeable battery used as the integrated power source 260. In the illustrated embodiment, the AC/DC converter 220 may be any AC/DC converter circuit that meets the requirements of the application. In embodiments, the Battery Backed LED Driver 200 may be designed into a housing to allow it to be integrated into LED lighting devices or used external to LED lighting devices. The housing may have a mounting mechanism to allow it to be physically mounted inside or outside of an LED lighting device. Thus a Battery Backed LED Driver Module may be designed into a singular housing to provide LED drive and battery backup capabilities with the functionality to select the power source and drive the LED light source integrated into the module. In embodiments of a lighting system capable of reducing the power consumption but maintaining a light intensity level, the Battery Backed LED Driver 200 may be used wherein an external command may be received from a demand response server or lighting control system such that the driver may control the amount of power consumed from the two power sources in response to the external command received. By way of an example, an LED light source may be driven by the Battery Backed LED Driver 200 wherein a constant current driver from grid power and a constant current driver from an energy storage device may provide power to the LED light source. The Battery Backed LED Driver 200 may configure a mechanism to adjust the amount of power supplied from each of the power sources and in some cases maintain a light intensity level while shifting some or all of the power consumption to the energy storage device.

The external control input 270 may receive an input or detect a condition that allows the Battery Backed LED Driver 200 to make a decision on which power source to use to power the light source. In the illustrated embodiment, the external control input 270 may receive an input or detect the condition and control the shutdown input to the LT3755 such that the LT3755 will not drive the output. The external control input may enable or disable the integrated power source 260 to supply power using FETs, relays or any other type of control that would allow the external control input 270 to enable or disable integrated power source 240 and/or the external power input 210 from supplying power. The switching devices may be at any position in the circuit to implement the required switching function. In embodiments, power may be shared such that intelligence in the Battery Backed LED Driver 200 may control the power sources such that they both supply some amount of power. The Battery Backed LED Driver 200 may contain a battery level detector to provide an indication of the capacity remaining in the integrated power source 260. By way of an example, an external LED may be driven when the battery level voltage is below a threshold that may indicate a low battery level. The external LED may be mounted in the ceiling to provide a visual indication of the battery capacity level or if the battery is being charged. An indication of the battery capacity level or charging may be provided in any manner described herein.

In embodiments of a battery embedded module for use in retrofit LED fixtures, the battery embedded module may be used for grid shifting applications. In some embodiments, the Grid Shifting Battery Embedded LED Driver Module may contain elements of the Battery Backed LED Driver 200 or the like to allow the integrated power source to be used for grid shifting for energy efficiency, demand response applications, peak shedding, load control, load leveling, backup power or any other use of a hybrid power system mentioned herein. In embodiments, intelligence may be designed into the module to implement a grid shifting algorithm to optimize the use of the device in a retrofit LED fixture.

In one use case, a peak shedding/grid shifting module may be designed that allows grid shifting to occur regularly when battery capacity is available to support grid shifting to achieve cost savings however at certain times when a peak in power usage is expected, for example in the summer months, the module may provide a peak shedding function. In some uses, the module may be integrated into a lighting device to provide this functionality. In other uses, the module may be integrated into any electrical device that may benefit from the peak shedding/grid shifting operation of the module. The module may have intelligence integrated into it to allow the device to hold reserve capacity to guarantee that capacity will be available for the required function. By way of an example, the module may allow grid shifting only down to fifty percent capacity of the integrated power source so that if peak shedding is required, the module may be able to provide that function for a minimum period of time. The module may have similar functionality to the automatic grid shifting wireless light bulb and peak shedding module mentioned herein. It is to be appreciated that grid shifting may be optimized for cost savings and energy efficiency and peak shedding may be optimized for reducing power consumption during peak times.

In embodiments targeting peak shedding, a peak monitoring device may be developed to communicate with devices capable of peak shedding to allow a central detection of a peak in power usage and subsequently control the peak shedding devices to transition power usage to integrated power sources to reduce power consumption during the peak times. When the peak in power usage is over, the peak monitoring device may communicate with the peak shedding devices to transition power back to the external power source. In some embodiments, the peak monitoring device may be electrically and physically connected to the monitored electrical interface. In embodiments, the peak monitoring device may be a current loop to detect the flow of energy on power lines without the need for a direct electrical or physical connection. The method of communication may be wired or wireless and a network of peak shedding devices may allow communication to the devices in a store and forward architecture. Communication between the peak monitoring device and peak shedding devices may be bidirectional such that the peak monitoring device may receive acknowledgements, status, alarms and the like from the peak shedding devices. By way of an example, a peak monitoring device may be attached to the circuit breaker box in a building such that it may monitor power usage at the circuit breaker box. In such a case, the peak monitoring device may be programmed with peak levels such that when it detects a peak level of power usage, the peak monitoring device may communicate control to the peak shedding devices to transition some amount of power to the integrated power source. The communication may include the amount of power to transition to the integrated power source such that the peak monitoring device may control the reduction in load. In another example, the peak shedding devices are lighting devices with integrated power sources. The peak monitoring device may detect a peak in power usage and send a command to the peak shedding lighting devices to move a certain amount of power from the external power input to the integrated power source. One advantage is that the light intensity of the lighting devices does not change but the power consumed from the external power input (and from the source of the power where the peak monitoring device is monitoring) will be reduced during the peak time.

In embodiments, the present invention may provide for a power outage lighting management within an environment, comprising a lighting device adapted to detect a power outage condition and power the lighting device by an internal power source. In embodiments, the lighting device may include a light source that is powered selectively by either the internal power source or an external power source. In response to detecting, the lighting device including the LED light source that is powered by the internal power source may regulate a light intensity of the LED light source in accordance with the power outage indication data, such as the light intensity as a dimmed light condition, the light intensity as a full brightness light condition, and the like.

In embodiments, the present invention may provide for a system of power management and control of an electrical facility, comprising the electrical facility that includes an electrical device, an internal power source, a connection to an external power source through an external power control device, a power source management facility, and a switch sense facility that senses the power control state of the external power control device, wherein the power source management facility controls the source of power being delivered to the electrical device based on the switch sense facility detecting at least one of the power control state of the external power control device and the presence of power being received from the external power control device. In embodiments, the electrical facility is a lighting facility and the electrical device is a lighting source, and where the lighting source may be an LED lighting source. The internal power source, the power source management facility, and the switch sense facility may be external to the lighting facility, and the like. The internal power source, the power source management facility, and the switch sense facility may be external to the electrical device. The power control state may be determined through a sensing of current in an electrical signal sent by the switch sense facility onto the input power connection. Sensing of current may utilize taking multiple samples, averaging, statistical determination, and the like, to determine measured current sense. The power control state may be determined through a sensing of reflections from an incident electrical pulse sent by the switch sense facility onto the input power connection. There may be an electrical coupling between the input power connection and the switch sense facility. The power source management facility may place the internal power source in a charge mode when there is power being received by the external power control device. The power source management facility may power the lighting source from the internal power source when the switch sense facility senses that the power control state of the external power control device is on and that there is no power being received by the lighting facility. The external power control device may be a device that is used to apply power to an electrical circuit. The external power control device may be a device that is used to apply power to a lighting circuit. The power control state may be an open switch or a closed switch. The power control state may be a partially on state from a dimmer device. The power control state may be determined from a threshold value, where the threshold value is predetermined, learned by the switch sense facility, and the like. The learning may be based on an electrical signal provided on the input power connection. The external power source may be AC power, DC power, and the like. The switch sense facility may sense the presence of power being received prior to the external power control device through a power sensing circuit in the external power control device. The power sensing circuit may insert impedance on the circuit that the switch sense facility may detect. The power source management facility may change the source of the power being used by the lighting facility based on the state of the power sensing circuit detected by the switch sense facility. The lighting facility may provide protection circuitry to protect against at least one of electrical transients and surges, where the protection may be to protect the switch sense facility.

In embodiments, the present invention may provide for an uninterruptable lighting source, including an uninterruptable lighting fixture containing an LED lighting source and a control facility for manipulating light output of the LED lighting source and selecting which source of power to use, wherein the uninterruptable lighting fixture provides the LED lighting source in response to a disruption of an external power source, and a rechargeable energy storage device capable of supplying power to the uninterruptable lighting fixture independent of the external power source, where recharging is provided to the uninterruptable lighting fixture at a time when the external power source is available. In embodiments, the external power source may be at least one of an AC and DC external power source. The uninterruptable lighting source may be designed to be a retrofit uninterruptable lighting fixture that replaces an existing lighting fixture. The rechargeable energy storage device and control facility may be integrated with the LED lighting source. The rechargeable energy storage device and control facility may be housed externally to the LED lighting source. The rechargeable energy storage device may be at least one of a battery, fuel cell, and super capacitor. The rechargeable energy storage device may be charged from the external power source. The rechargeable energy storage device may be charged from a constant current drive to the LED light source. The uninterruptable lighting facility may provide illumination based upon a setting of a switch. The switch setting may be sensed by the control facility through at least one of electrical impedance and AC power at the switch. The control facility may receive input through an input component in selecting which source of power to use. The input component may be a switch sense input component that senses at least one of a switch position and the presence of switch power for an external switching facility providing the external power source. The switch position of the external switching facility may be through electrical impedance sensing of the switch. The input component may be an RF input receiving component that receives commands from an external power outage detector. The input component may include a wireless interface from a power sensing facility that may detect a disruption of power. The wireless interface may be a connection to a network. The indication of power outage may be detected over the wired interface. At least one of an internal timer and a time of day clock may control the manipulating. The uninterruptable lighting fixture may include a sensor input device for detecting an environmental condition. The sensor may be a light sensor sensing a level of ambient light. The sensor may be a motion sensor sensing motion. The control facility may control when the rechargeable energy storage device is charging. The manipulating may be switching on the light output, changing an illumination level of the light output, flashing the light output, changing color content of the light output, and the like. The energy storage device may be capable of supplying the source of power for the lighting fixture to provide power management. Power management may be due to external power being interrupted, to improve energy efficiency, to provide cost savings, to reduce energy demand, and the like. The energy demand may be a peak energy demand, at predetermined times, at a time when new energy demand may be required at an energy provider, and the like. The control facility may utilize a control input from an input device, internal timer, internal clock, internal program to manage the power usage, and the like. The management of power usage may be through selection of the power source. The management of power usage may be through control of when a power source is charging. The management of power usage may be through the amount of load shared by the power sources.

In embodiments, the present invention may provide for power management of a lighting source, including providing a lighting facility, where the lighting facility may include the lighting source, an input device, an internal control facility, an energy storage device, a connection to external power, and the like. Sharing power usage between the external power and the energy storage device may be controlled by the internal control facility, where the internal control facility includes an intelligence capability that may utilize a resident program and information received through the input device in the sharing of power usage. In embodiments, the resident program may be stored on memory running on a processor in the internal control facility. Information received through the input device for power sharing may be processed in the internal control facility through dedicated circuitry. The lighting source may be an LED light. The external power may be external AC power. The external power may be external DC power. Sharing of power may be a partial sharing of power between the external power and the energy storage device, where both the external power and the energy storage device as a result of the information received are now supplying power. The input device may receive a program control input to alter the program, input from a remote control, input from a wireless network, input from a sensor, and the like. The input device may receive an external control signal, where a utility company, a networked software application, and the like may generate the external control signal. The external control signal may be communicated from at least one of wirelessly from a network, through the power lines, through a wired network connection, and the like. The energy storage device may be capable of supplying the source of power for the lighting facility to provide power management, where power management may be due to external power being interrupted, to improve energy efficiency, to provide cost savings, to reduce energy demand, and the like. The energy demand may be a peak energy demand, at predetermined times, at a time when new energy demand is required at an energy provider. The internal control facility may utilize a control input from an input device, internal timer, internal clock, internal program, and the like to manage the power usage. The management of power usage may be through selection of the power source, through control of when a power source is charging, through the amount of load shared by the power sources, and the like.

In systems containing devices with an embedded power source on an electrical circuit such as grid shifting systems or battery backup systems, an intelligent charging device may be designed to apply power to the electrical circuit for the purpose of charging the embedded power sources. In such a case, the grid shifting or battery backed up devices may be able to detect when the intelligent charging device is in charging mode and when the operation is based on the controlling devices passing power through onto the electrical circuit for normal operation. In some embodiments, switch sense functionality in end devices may be used to determine whether the applied power is for normal operation or for charging mode. By way of an example, a wall switch controlling an electrical circuit may contain a relay in parallel with the controlling device such that intelligence in the wall switch may apply power to the electrical circuit independent of the state of the controlling device (e.g., in parallel to the controlling device). In the example, the intelligence in the wall switch may use a timer or time of day clock to allow power to be applied to one or more electrical devices for the purposes of charging the battery based on time of day or some other timing mechanism when the user does not intend to power the electrical devices from the external power source for normal operation. In some embodiments, the intelligent charging device may use one or more sensors to determine whether to enter charge mode. By way of an example, a motion sensor may detect occupancy in a room. When no motion has been detected for a period of time, the intelligent charging device may enter charge mode. If motion is detected, the intelligent charging device may exit charge mode and the electrical devices may enter normal operation. In this example, if the electrical devices are lighting devices or lighting fixtures, there may be multiple levels of illumination such that when in charge mode, the illumination level is at a lower level where some of the power delivered may be diverted to charge the embedded power source however when the lights enter normal operation (for example, when motion is detected) the lights set the illumination level to a higher level. In embodiments, the intelligent charging device may close a switch automatically at certain times when the electrical devices may be charging. In some embodiments, the intelligent charging device may monitor current to the circuit to determine if the electrical devices are charging or the rate at which they are charging. In some embodiments, the intelligent charging device may use wired or wireless communication to the electrical devices to communicate whether it is in charging mode or normal operation mode. By way of an example, the intelligent charging device may use a power line communication method to communicate the mode of operation to end devices on an electrical circuit. In some embodiment, the intelligent charging device may provide a mechanism that may be detected by a switch sense circuit such that the switch sense circuit may know that the intelligent charging device is in charging mode and as such not enter its normal operating mode but rather enter a charging mode. By way of an example, the intelligent charging device may insert some impedance based on the charge mode approach that the switch sense circuit may detect as a third state that indicates charging mode. In embodiments, the intelligent charging device may periodically switch to charging mode when it detects that the wall switch is turned to the off position. The intelligent charging device may learn over time typical times when the intelligent charging device may be in the off position and create a schedule of charging times. In embodiments, the functionality may be implemented by a controlling device and integrated circuitry or a module into the controlling device to implement the same functionality as the intelligent charging device. In such embodiments, an existing controlling device may be retrofit with the integrated circuitry or module to allow it to provide the same or similar functionality as the intelligent charging device. In one illustrative example, a grid shifting lighting system may be developed controlled by an intelligent charging device such that batteries embedded in the lights may be charged during times when the user intended the lights to be turned off. In this example, the intelligent charging device may charge the embedded batteries by applying power to the circuit but the lights may be placed in charging mode by wired communication, wireless communication or a switch sensing mechanism and remain off during charging mode.

In embodiments of grid shifting systems, an intelligent grid shifting controller may control charging of embedded power sources and control the use of external and embedded power sources. In embodiments, the intelligent grid shifting controller may contain all of the functionality of the intelligent charging device but may communicate to the end devices the use of the external and embedded power sources. The intelligent grid shifting controller may communicate to the grid shifting end devices when to use the external power source, when to use the embedded power source and when to use both power sources sharing the load. The method of communication may be by wired connection over a power distribution network, for example on the AC power lines (X10, INSTEON, Broadband over Power Lines, proprietary communication scheme etc), or wirelessly through a wireless interface (dedicated RF communication link, ZIGBEE, WIFI, ENOCEAN, BLUETOOTH etc).

In embodiments of battery backed ballasts for fluorescent lighting or battery backed LED driver modules, a ballast or driver module may contain a light source or be able to drive a separate light source in the event that a disruption in power is detected. In these embodiments, the light source may be embedded on the housing of the ballast or driver module or the light source may be in a separate housing that may mount in a location to illuminate an area during a disruption of power. In some embodiments, during a disruption of power the ballast or driver module may drive both the separate light source and the primary light source deriving power from the embedded battery. In some embodiments, during a disruption of power the ballast or driver module may drive only the separate light source deriving power from the embedded battery. By way of an example, a battery backed ballast for fluorescent lighting may mount above a drop ceiling and a separate light source may be mounted in a location nearby to illuminate an area during a disruption in power. The battery backed ballast may have a connection to the separate light source to power it from the embedded battery during a power disruption. In such a use case, a battery backed ballast may power both fluorescent lighting and a separate emergency light during an emergency. In an alternate use case, a battery backed ballast may power only the separate emergency light. In this use case, a separate emergency light may have lower power requirements and thus may require a smaller battery reducing the size and cost. In another use case a light source built into the housing for the ballast or driver module may allow the ballast or driver module to act as the emergency light source. By way of an example, the housing may have an LED light source and a method to mount the housing to a drop ceiling such that the housing and LED light source may be positioned to illuminate an area during a disruption of power.

In embodiments of grid shifting systems, the amount of power to shift to an internal power source may be communicated to an end device using a triac or similar device to create a chopped waveform such that the amount of power that comes from the external power source and the amount of power supplied by an internal power source may be provided in proportion to the chopped waveform. In such embodiments, a controlling device may contain a triac or similar device and may be configured to control the waveform such that an end device powered on the circuit may process the waveform and control the amount of power delivered to an end device based on the input power waveform. By way of an example, a triac based dimmer switch that is used to typically control the light intensity level of a light source may be used to control the amount of power shifted to the internal power source. In such an example, a variable resistor may be used to control how much power is drawn from the line. In some embodiments, the device may use the chopped waveform to manage the amount of power supplied by the external and internal power sources based on the external power waveform. In embodiments, the controller device may use any known method to manipulate or modulate the waveform to communicate the amount of power to shift to the internal power supply. In some embodiments, an intelligent triac based grid shifting controller with the capability of chopping the waveform may be used to control the amount of power shifted to the internal power source. The intelligent triac based grid shifting controller may receive communication from an external device to configure or program the controller. The method of communication may be by wired connection over a power distribution network, for example on the AC power lines (X10, INSTEON, Broadband over Power Lines, proprietary communication scheme etc), or wirelessly through a wireless interface (dedicated RF communication link, ZIGBEE, WIFI, ENOCEAN, BLUETOOTH etc). In some embodiments, the intelligent triac based grid shifting controller may allow direct input through a keypad, LCD screen, computer connected through a USB interface etc and may be programmed to implement the communication to the end device to perform grid shifting. In embodiments, the functionality may be pre-programmed, factory set, designed in a custom electrical circuit or the like to respond to sensor inputs and a pre-programmed algorithm to implement the grid shifting function. The sensors may include a light sensor, motion sensor, an atomic clock or time receiver, temperature sensor or any other sensor mentioned herein that may allow the grid shifting function to meet the requirements of an application. In some embodiments, the grid shifting function is performed based on an intelligent program internally. The intelligent program may contain a real time clock that may be set by the user such that the intelligent program may use time of day or a calendar to perform the grid shifting functionality. The grid shifting function may be used for cost savings, energy efficiency, convenience, safety/security and the like. The controller may have switches, dials, knobs etc to set time of day or sensor thresholds such that a user may be able to control how the intelligent program manages the grid shifting. Once set, the controller may act based on those settings and/or the pre-programmed or designed function. The settings may be changed on occasion by the user. In embodiments where the external power source is a DC power source, a controlling device may use pulse width modulation, amplitude modulation and the like to communicate to a DC powered end device the amount of power to shift to an embedded power source. In an example of a triac controlled grid shifting system, the end device may be a lighting device with an internal power source and the controller may be a wall switch with a triac as well as some intelligence built in. The controller may be programmed to shift some amount of power to the internal power source during daytime hours for cost savings. In another lighting example, the controller may receive a command from an external device to implement a demand response function where the controller may chop the waveform and shift an amount of power delivered to the end device to the internal power source such that the amount of power drawn from the external power source may be reduced however the light intensity may be maintained because the difference in power consumed from the external power source may be transferred to the internal power source. In embodiments of a lighting devices capable of reducing the power consumption but maintaining a light intensity level, the device may be capable of detecting the chopped waveform created by a triac or similar device and adjust the amount of power consumed from each power source accordingly.

In an embodiment of a grid shifting lighting system, a system consisting of one or more lighting devices such as bulbs or fixtures and a grid shifting management device with an integrated power source that may power the one or more lighting devices. The grid shifting management device may have an external power supply such as an AC power source, a DC power source, a method of energy harvesting and the like for providing a source of power to the lighting devices or to recharge the integrated power source. The grid shifting management device may contain a processor for power management and shifting power between an external power supply and integrated power source for the purposes of energy efficiency, demand response applications, peak shedding, load control, load leveling, backup power, local power generation and storage or any other use of a hybrid power system mentioned herein. In some embodiments, the integrate power source may not be in the grid shifting management device but may be distributed into the lighting devices where the grid shifting management device may perform power management and conversion functions with the external power supply and may communicate with the lighting devices to manage the grid shifting operation. In some embodiments, a processor in the grid shifting management device may manage grid shifting in the lighting devices. In embodiments, the lighting devices may contain a processor and when configured or programmed may implement grid shifting functions. In such embodiments, the grid shifting management device may provide the configuration or programming. The lighting devices may receive configuration or programming from another source such as an external control source such as a lighting control network. The lighting devices may have the ability to alter their configuration based on power consumption, sensor inputs or the like such that a change in the grid shifting function may be initiated by the lighting device in response to an input. By way of an example, a group of lighting devices may be DC powered lighting devices such as LED light fixtures. A grid shifting wall switch or controller may contain an AC/DC converter with the LED driver circuit capable of driving the light sources with the proper current and voltage as required by the light sources and fixtures. In embodiments, the grid shifting wall switch or controller may contain an AC/DC converter and supply a DC voltage to the light sources and fixtures which may contain the LED driver circuits for the light sources. It is to be appreciated that any type of light source and associated driver circuit may be used with the present invention. The grid shifting wall switch or controller may have an integrated or may have an external connection to a energy storage device such as a rechargeable battery that may be used for grid shifting purposes. The grid shifting wall switch or controller may be capable of managing power to use the energy storage device and external power source to implement grid shifting for the purposes of energy efficiency, demand response applications, peak shedding, load control, load leveling, backup power, local power generation and storage or any other use of a hybrid power system mentioned herein. In another example, the lighting devices contain an energy storage device and may recharge or use the energy storage device for grid shifting purposes. In this example, the lighting devices may use a constant current of a certain level. The grid shifting wall switch or controller may initiate a shift to the energy storage device by reducing the amount of current supplied. A lighting device may detect the change and automatically begin to source the amount of current from its energy storage device to maintain the drive to the light source at the required level. The grid shifting wall switch or controller may change any characteristic of the power supplied to the lighting devices or may use any other method of communication mentioned herein to alter the management of power at the lighting devices to implement grid shifting. In embodiments, the end device may not be a lighting device but may be any type of electrical device that may benefit from the grid shifting function described herein.

An embodiment of grid shifting lighting devices or lighting devices with an emergency lighting capability may be a street light, street lamp or street light fixture with an internal power source such as a rechargeable battery that is capable of using the internal power source for grid shifting or emergency lighting purposes. The light source may be fluorescent, LED, HID, incandescent or any known lights source. In some embodiments, a replacement bulb that fits into a street light fixture may allow the fixture to be retrofit with grid shifting or emergency lighting functions. In some embodiments, the street light, street lamp or street light fixture that can grid shift may contain a grid tie inverter to return power to local devices or to the grid. In some embodiments, the street light, street lamp or street light fixture may have a connection to one or more external power sources, may have a connection to one or more energy harvesting power source such as solar, wind and the like and may have a connection to an external energy storage device in addition to or instead of an internal energy storage device. In some embodiments, the street light, street lamp or street light fixture may be controlled by RF or IR control, sensor control or any form of wireless control mentioned herein. By way of an example, a light sensor may be used for daylight harvesting for the purposes of changing the light intensity to conserve power based on the amount of ambient light detected. In another example, a motion sensor may be used to turn the light or change the light level if multiple light levels are implemented. In some embodiments, a coordinated lighting function may be implemented where any form of wireless control in one street light, street lamp or street light fixture may be propagated over a wired or wireless network to a group of street lights, street lamps or street light fixtures such that the group may be controlled in a coordinated manner. By way of an example, a motion sensor triggered in one street lamp may transmit a message to a group of street lamps to turn on even if the other members of the group do not directly detect the motion.

Referring to FIG. 3, the present invention may provide a grid shifting electrical fixture 302 which may contain a processor 308 and a energy storage device 304 such as a battery and a connection to external power that is delivered through a grid shifting controller 310, where the processor 312 provides intelligent control of the grid shifting electrical fixture 302 for the purposes of energy efficiency, demand response applications, peak shedding, load control, load leveling, backup power, local power generation and storage or any other use of a hybrid power system mentioned herein. In embodiments, processor 308 and processor 312 may include a microprocessor, a microcomputer, a digital logic circuit, an analog circuit, and the like. In the case where the processor contains a computing device, software for the computing device may fixed at the factory, updated though an external interface to the processor (e.g. though a wired or wireless connection), and the like. Processor 308 and/or processor 312 may make decisions on when and how to recharge the energy storage device, when the grid shifting electrical fixture 302 should shift or share power, why to shift or share power and how much power should be shifted or shared between the power sources. There may be a wired or wireless communication channel between processor 308 and processor 312 for control, status, programming, configuration and the like. In some embodiments, the grid shifting electrical fixture 302 may be a lighting fixture and as such the power source and light source may be managed by processor 308 and processor 312 to implement a grid shifting lighting fixture 302 containing the energy storage device 304. In some embodiments, the energy storage device and a controller or processor may be external to the grid shifting electrical fixture 302. In embodiments of a lighting system capable of reducing the power consumption but maintaining a light intensity level, the grid shifting controller may translate commands received from a utility company, lighting control system or demand response server to provide control to one or more grid shifting electrical fixtures 302 such that the lighting system reducing power consumption but maintaining the light intensity level consists of the fixture and the intermediate control device.

Referring to FIG. 4, the present invention may provide a grid shifting electrical fixture 402 which may contain a processor 408 and a connection to external power that is delivered through a grid shifting controller 410, where there may be an energy storage device 404 such as a battery and a processor 412 that provides intelligent control of the grid shifting electrical fixture 402 for the purposes of energy efficiency, demand response applications, peak shedding, load control, load leveling, backup power, local power generation and storage or any other use of a hybrid power system mentioned herein. In embodiments, processor 408 and processor 412 may include a microprocessor, a microcomputer, a digital logic circuit, an analog circuit, and the like. In the case where the processor contains a computing device, software for the computing device may fixed at the factory, updated though an external interface to the processor (e.g. though a wired or wireless connection), and the like. Processor 408 and/or processor 412 may make decisions on when and how to recharge the energy storage device 404, when the grid shifting electrical fixture 402 should shift or share power, why to shift or share power and how much power should be shifted or shared between the power sources. There may be a wired or wireless communication channel between processor 408 and processor 412 for control, status, programming, configuration and the like. In some embodiments, the grid shifting electrical fixture 402 may be a lighting fixture and as such the power source and light source may be managed by processor 408 and processor 412 to implement a grid shifting lighting system with the grid shifting controller containing the energy storage device 404. In some embodiments, the energy storage device and a controller or processor may be external to the grid shifting controller 410. In some embodiments, the grid shifting electrical fixture 402 may not contain a processor and the grid shifting function may be implemented by the gird shifting controller 410 for one or more electrical fixture devices on the circuit managed by the controller.

Figure 5:
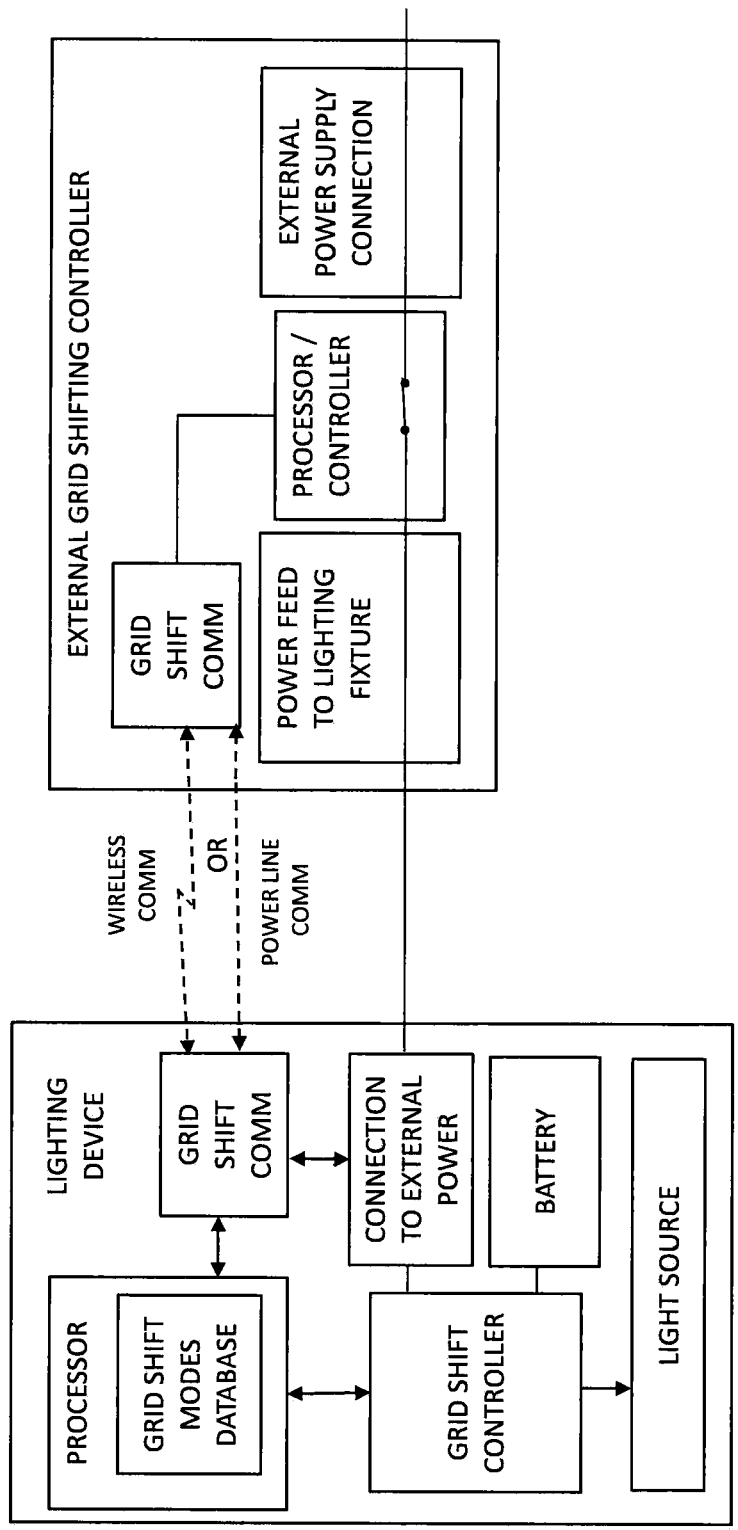
FIG. 5 shows a block diagram of a grid shifting system for lighting devices with an energy storage device in the lighting device.

Referring to FIG. 5, the present invention may provide for grid shifting for one or more lighting devices 502 and an external grid shifting controller 504, where the lighting device 502 may include a processor 508 with a lighting modes database 510, a grid shift controller 512, a power connection to external power 514, a light source 516, an internal power source such as a battery 518, grid shifting communication 522 and the like and where the external grid shifting controller 504 may include a power feed to the lighting fixture 524, grid shifting communication 526, a processor/controller 528, a connection to an external power supply 530, and the like. In embodiments, the lighting device 502 may use the battery for the purposes of energy efficiency, demand response applications, peak shedding, load control, load leveling, backup power, local power generation and storage or any other use of a hybrid power system mentioned herein and as a result, determine whether to power the lighting device 502 using the power connection to external power 514, use the battery 518 or use some amount of power consumed from both sources. In embodiments, the processor 508 may include a microprocessor, a microcomputer, a digital logic circuit, an analog circuit, and the like. In the case where the processor contains a computing device, software for the computing device may fixed at the factory, updated though an external interface to the processor (e.g. though a wired or wireless connection), and the like. The processor 508 may have access to a lighting mode database 510 that may contain information pertaining to controlling the light source, power management to implement the grid shifting function, use of embedded sensors, wired or wireless interfaces and the like. In embodiments, the grid shift controller 512 may implement the sharing or shifting of power of the two power sources that may be combined using a method described herein (diode oring, PWM using FETs to or power sources, controlling solid state switches or relays etc). The power connection to external power 514 may be AC power, DC power or the like. The light source 516 may be fluorescent, LED, HID, incandescent or any known lights source. The light source 516 may be integrated into the same housing as the remaining components of the lighting device or may be removable and replaceable like a light bulb. Grid shift communication 522 may allow the external grid shifting controller 504 to communicate with the lighting device 508 to communicate grid shifting operation to the lighting devices, program or configure the processor 508 or grid shift controller 512, manage recharging the battery 518, gather status and the like. The external grid shifting controller 504 may allow for the control of the grid shifting system by allowing parameters of grid shifting to be entered such that the processor/controller 528 may make decisions on when and how to recharge the battery 518, when the lighting device 502 should shift or share power, why to shift or share power and how much power should be shifted or shared between the power sources. The decision may be based on programming, configuration, external control, sensor inputs, monitoring of power consumption and the like. By way of an example, the external grid shifting controller 504 may be a control panel that allows user input to program grid shifting operation. The processor/controller 528 may contain a real time clock that may allow the user to enter times of the day when the external grid shift controller may enter charge mode by communicating to the lighting devices 502 that they are entering a mode where the battery 518 is charged but the light source 516 is not illuminated. The user may program times of day and the percentage of power that will be supplied from the battery 518 source at those times of day such that the grid shift controller 512 may manage the two power sources to implement the sharing. The external grid shifting controller 504 may implement any of the grid shifting functions described herein.

In an embodiment, an autonomous grid shifting lighting device may be programmed or configured to implement grid shifting using its internal battery. Referring to FIG. 5, the present invention may provide for grid shifting of a lighting device 502 using the processor 508, lighting modes database 510 and grid shift controller 512 to manage the power connection to external power 514, light source 516 and battery 518 such that the lighting device may manage grid shifting operation based on its program. In such an embodiment, there is no external grid shifting controller and the operation of the lighting device is controlled by the components of the lighting device 502 as programmed or configured to operate.

Figure 6:
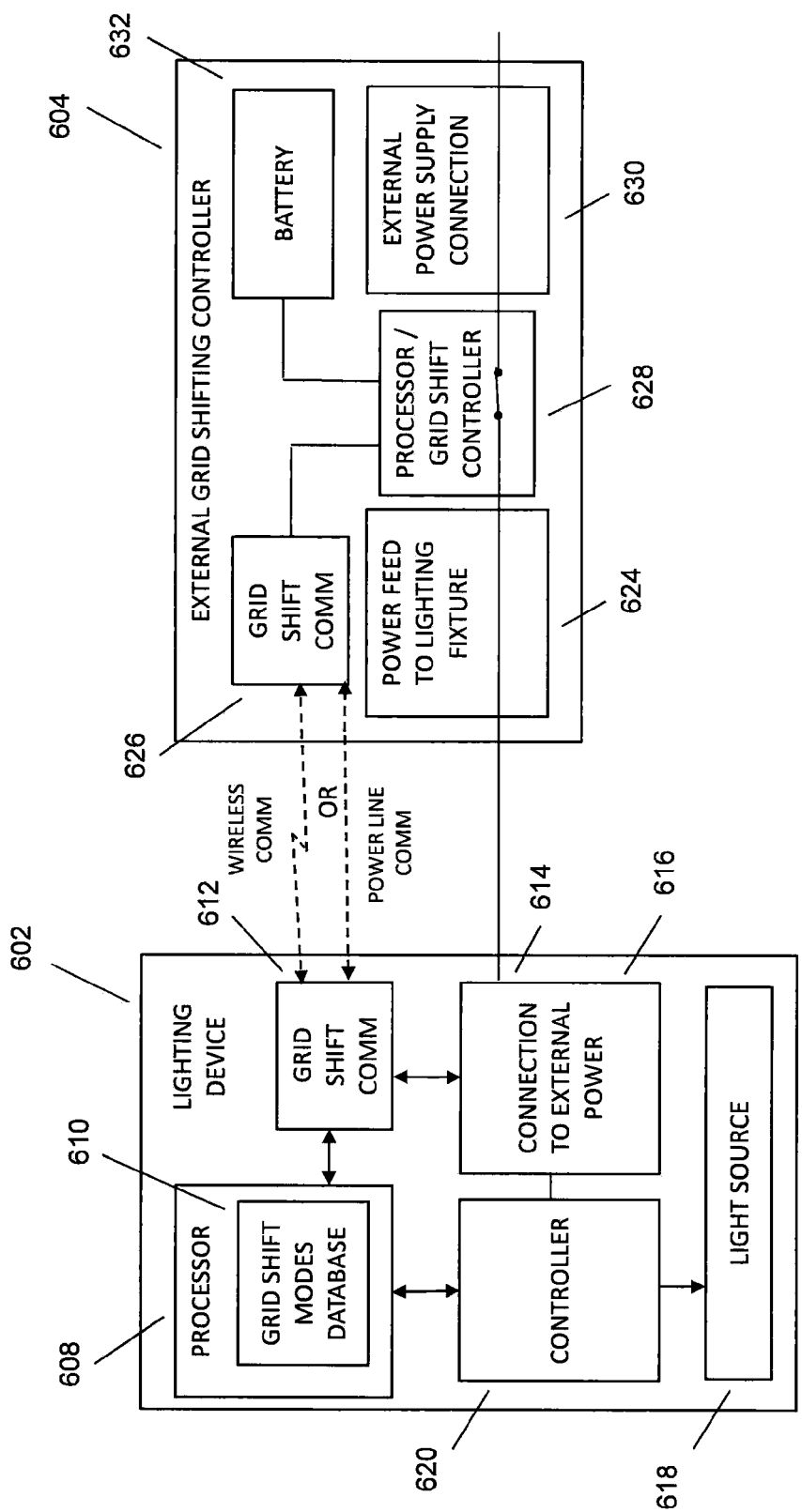
FIG. 6 shows a block diagram of a grid shifting system for lighting devices with an energy storage device in the external grid shifting controller.

Referring to FIG. 6, the present invention may provide for grid shifting for one or more lighting devices 602 and an external grid shifting controller 604, where the lighting device 602 may include a processor 608 with a lighting modes database 610, a controller 612, a power connection to external power 614, a light source 616, grid shifting communication 622 and the like and where the external grid shifting controller 604 may include a power feed to the lighting fixture 624, grid shifting communication 626, a processor/controller 628, a connection to an external power supply 630, an internal power source such as a battery 632 and the like. In embodiments, the external grid shifting controller 604 may use the battery for the purposes of energy efficiency, demand response applications, peak shedding, load control, load leveling, backup power, local power generation and storage or any other use of a hybrid power system mentioned herein and as a result, determine whether to power one or more lighting devices 602 using the connection to an external power supply 630, using the battery 632 or using some amount of power consumed from both sources. In embodiments, the processor 608 may include a microprocessor, a microcomputer, a digital logic circuit, an analog circuit, and the like. In the case where the processor contains a computing device, software for the computing device may fixed at the factory, updated though an external interface to the processor (e.g. though a wired or wireless connection), and the like. The processor 608 may have access to a lighting mode database 610 that may contain information pertaining to controlling the light source, power management, use of embedded sensors, wired or wireless interfaces and the like. In embodiments, the controller 612 may implement power management of the light source 618 and power connection to external power 614. The power connection to external power 614 may be AC power, DC power or the like. The external grid shifting controller 604 may contain an AC/DC converter, DC/DC converter and the like to convert and condition the power for the lighting devices. The light source 616 may be fluorescent, LED, HID, incandescent or any known lights source. The light source 616 may be integrated into the same housing as the remaining components of the lighting device or may be removable and replaceable like a light bulb. Grid shift communication 622 may allow the external grid shifting controller 604 to communicate with the lighting device 608 to communicate grid shifting operation to the lighting devices, program or configure the processor 608 or controller 612, gather status and the like. The external grid shifting controller 604 may allow for the power management and control of the grid shifting system by allowing parameters of grid shifting to be entered such that the processor/controller 528 may make decisions on when and how to recharge the battery 632, when to shift or share power, why to shift or share power and how much power should be shifted or shared between the power sources. The decision may be based on programming, configuration, external control, sensor inputs, monitoring of power consumption and the like. By way of an example, the external grid shifting controller 604 may be a control panel that allows user input to program grid shifting operation. The processor/controller 628 may contain a real time clock that may allow the user to program times of day and the percentage of power that will be supplied from the battery 632 source at those times of day such that the processor/controller 628 may manage the two power sources to implement the sharing. The external grid shifting controller 604 may implement any of the grid shifting functions described herein.

Referring to FIG. 7A, the lighting device 702 may include an illumination source 704, housing 714, controller 708, timing facility 718, power sourcing facility 710, a first power source 712, a second power source 720, and the like. In embodiments, the first power source 712, second power source 720, or both, may be located as part of the housing 714 or outside the housing. Either or both of the power sources 712 or 720 may be any power source described herein, such as a battery, super capacitor, fuel cell, and the like. Either or both of the power sources 712 may be an external power source, such as the power grid, an external DC power source, and the like. For example, the first power source 712 may be a battery internal to the housing 714 and the second power source 720 may be the external power grid. In another example, the first power source 712 may be the external power grid and the second power source may be an external DC power source. Referring to FIG. 7B, In embodiments the lighting device 702 may include an illumination source mechanically associated with a housing 722; a timing facility which may be associated with the housing and in data communication with a controller 724; and where the controller may be mechanically associated with the housing and adapted to cause a power sourcing facility to select from two alternative power sources when powering the illumination source based on an input from the timing facility 728. In embodiments, the timing facility may utilize a calendar to determine times to select from the two alternative power sources. The timing facility may utilize a timing profile to determine times to select from the two alternative power sources. The timing facility may store times when selection is disabled. The timing facility may be a clock that is synchronized with a central clock. The timing facility may be a timer that counts to a predetermined period. The timing facility may utilize time of day. The controller may include a processor. The illumination source may be an LED. The lighting device may be an LED driver module and drive an LED illumination source. The lighting device may be a fluorescent lamp ballast and drive a fluorescent light source. The lighting device may be an inverter module driving a fluorescent lamp ballast and fluorescent light source. The lighting device may be a lighting fixture. The lighting fixture may include a housing that receives the illumination source. The lighting device may be an adapter that accepts the illumination source plugged into it. The step of selecting may involve switching between the two alternative power sources. The step of selecting may involve sharing power between the two alternative power sources simultaneously, such as where x percent of power is consumed from one of the alternative power sources and y percent of power is consumed from the other alternative power source.

Referring to FIG. 8A, the lighting device 802 may include an illumination source 804, a housing 814, a controller 808, a sensor facility 818, a power sourcing facility 810, a first power source 812, a second power source 820, and the like. In embodiments, the first power source 812, second power source 820, or both, may be located as part of the housing 814 or outside the housing. Either or both of the power sources 812 or 820 may be any power source described herein, such as a battery, super capacitor, fuel cell, and the like. Either or both of the power sources 812 may be an external power source, such as the power grid, an external DC power source, and the like. For example, the first power source 812 may be a battery internal to the housing 814 and the second power source 820 may be the external power grid. In another example, the first power source 812 may be the external power grid and the second power source may be an external DC power source. Referring to FIG. 8B, the lighting device 802 may provide an illumination source mechanically associated with a housing 822; a sensor facility mechanically associated with the housing and in data communication with a controller, the sensor facility adapted to assess a time of day through examination of lighting conditions proximate the housing 824; where the controller may be associated with the housing and adapted to cause a power sourcing facility to select from two alternative power sources when powering the illumination source based on an input from the sensing facility. In embodiments, the sensor facility may further comprise a motion detector that is in communication with the controller, the controller adapted to use data from the motion detector when determining which of the two alternative power sources to select. The motion detector may sense motion proximate to the housing. The sensor facility may further comprise a light sensor that is in communication with the controller, the controller adapted to use data from the light sensor when determining which of the two alternative power sources to select and how much power to draw from each source. The controller may include a processor. The illumination source may be an LED, where the lighting device may include an LED driver module. The lighting device may be a fluorescent lamp ballast and drive a fluorescent light source. The lighting device may be an inverter module driving a fluorescent lamp ballast and fluorescent light source. The lighting device may be a lighting fixture. The lighting fixture may include a housing that receives the illumination source. The lighting device may be an adapter that accepts the illumination source plugged into it. The step of selecting may involve switching between the two alternative power sources. The step of selecting may involve sharing power between the two alternative power sources simultaneously, such as where x percent of power is consumed from one of the alternative power sources and y percent of power is consumed from the other alternative power source.

Figures 9A, 9B:
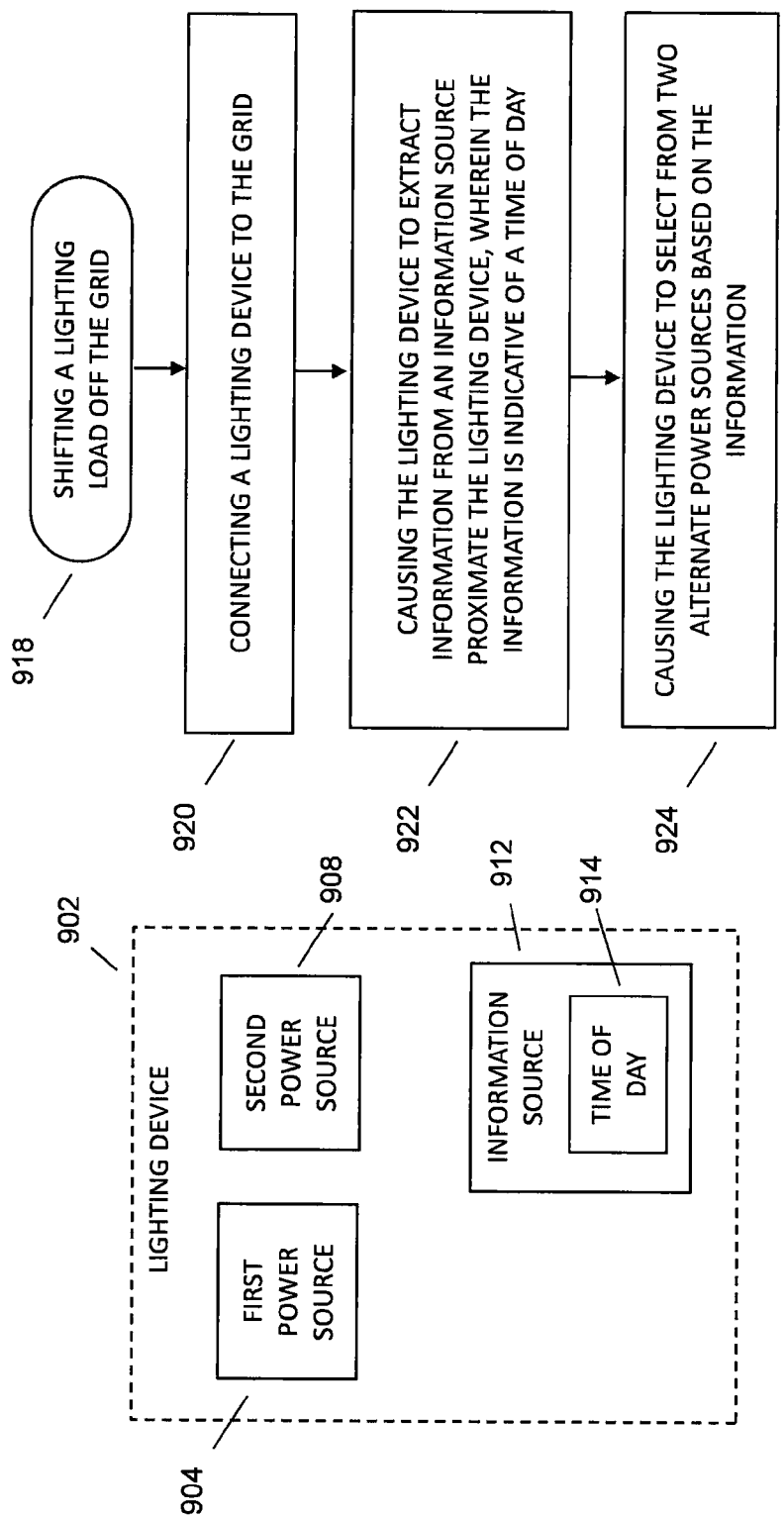
FIG. 9A shows a block diagram of a lighting device shifting a lighting load off the grid based on internally derived information.
FIG. 9B shows a flow diagram of a lighting device shifting a lighting load off the grid based on internally derived information.

Referring to FIG. 9A, the lighting device 902 may include a first power source 904, a second power source 908, an information source, such as to provide time of day information 914, and the like. In embodiments, the first power source 904, second power source 908, or both, may be located as part of the housing of the lighting device 902 or outside the housing. Either or both of the power sources 904 or 908 may be any power source described herein, such as a battery, super capacitor, fuel cell, and the like. Either or both of the power sources 904 or 908 may be an external power source, such as the power grid, an external DC power source, and the like. For example, the first power source 904 may be a battery internal to the housing and the second power source 908 may be the external power grid. In another example, the first power source 904 may be the external power grid and the second power source may be an external DC power source. In embodiments, the information source 912 may be located as a part of the lighting device 902, external to the lighting device, or some combination of internal and external. For example, the information source may provide the time of day to the lighting device 902 from a real time clock module inside the lighting device. In another example, the time of day clock may be maintained in the lighting device and synchronized or set to an external time source (e.g. NTP, an atomic clock, a user interface, and the like). In another example, the lighting device may not maintain the time however an external device maintaining the time may control operation of the lighting device based on time of day. Referring to FIG. 9B, the lighting device 902 may provide a method of shifting a lighting load off the grid 918 by connecting a lighting device to the grid 920; causing the lighting device to extract information from an information source proximate the lighting device, wherein the information is indicative of a time of day 922; causing the lighting device to select from two alternate power sources based on the information 924; and the like. In embodiments, a controller may perform the step of extracting information, where the controller may include a processor. The lighting device may include an LED lighting source. The LED lighting source may include an LED driver module. The lighting device may be a fluorescent lamp ballast and drive a fluorescent light source. The lighting device may be an inverter module driving a fluorescent lamp ballast and fluorescent light source. The lighting device may be a lighting fixture, where the lighting fixture includes a housing that receives the illumination source. The lighting device may be an adapter that accepts the illumination source plugged into it. The step of selecting may involve switching between the two alternative power sources. The step of selecting may involve sharing power between the two alternative power sources simultaneously, such as where x percent of power is consumed from one of the alternative power sources and y percent of power is consumed from the other alternative power source.

Referring to FIG. 10A, the lighting device 1002 may include an internal battery power source 1004, which may include a performance characteristic 1008 such as for battery capacity level; a connection to the power grid 1010; and the like. Referring to FIG. 10B, the lighting device 1002 may provide for shifting of a lighting load off the grid 1012 by connecting a lighting device to the grid 1014; causing the lighting device to monitor an internal battery power source for a performance characteristic 1018; causing the lighting device to select between the grid and the internal battery power source based on the performance characteristic 1020; and the like. In embodiments, the lighting device may include a controller for performing the steps of monitoring the internal battery and choosing between the grid and the internal battery, such as where the controller includes a processor. The lighting device may include an LED lighting source, and the LED lighting source may include an LED driver module. The lighting device may include a fluorescent lamp ballast. The lighting device may be an inverter module driving a fluorescent lamp ballast and fluorescent light source. The lighting device may be a lighting fixture. The lighting fixture may include a housing that receives the illumination source. The lighting device may be an adapter that accepts the illumination source plugged into it. The step of selecting may involve switching between the two alternative power sources. The step of selecting may involve sharing power between the two alternative power sources simultaneously, such as where x percent of power is consumed from one of the alternative power sources and y percent of power is consumed from the other alternative power source.

Referring to FIG. 11A, the lighting device 1102 may include a first power source 1104, a second power source 1108, predict an energy distribution grid demand parameter 1110, an environmental information source 1114, and the like. In embodiments, the first power source 1104, second power source 1108, or both, may be located as part of the housing of the lighting device 1102 or outside the housing. Either or both of the power sources 1104 1108 may be any power source described herein, such as a battery, super capacitor, fuel cell, and the like. Either or both of the power sources 1104 1108 may be an external power source, such as the power grid, an external DC power source, and the like. For example, the first power source 1104 may be a battery internal to the housing and the second power source 1108 may be the external power grid. In another example, the first power source 1104 may be the external power grid and the second power source may be an external DC power source. In embodiments, the information source 1114 may be located as a part of the lighting device 1102, external to the lighting device, or some combination of internal and external. The information source 1114 may be an environmental information source, a power input information source, and the like. For instance, the information source may enable the prediction or determination of an energy distribution grid parameter, such as to improve energy efficiency, provide cost savings, to reduce energy demand, and the like, such as when the energy demand is a peak energy demand, is at predetermined times, at a time when new energy demand is required at an energy provider, and the like. Referring to FIG. 11B, the lighting device 1102 may provide for shifting a portion of a lighting load off an energy distribution grid 1118 by electrically connecting a lighting device to the energy distribution grid 1120; causing the lighting device to interpret information obtained from an environmental information source, which may be proximate the lighting device, the interpretation adapted to predict an energy distribution grid demand parameter 1122; causing the lighting device to select from at least two different power sources based on the interpretation 1124; and the like. In embodiments, the lighting device may include a controller for performing the steps of interpreting the information and selecting between the at least two different power sources, where the controller may include a processor. The environmental information source may include an internal timer, a time of day clock, a calendar, an environmental sensor input device for detecting an environmental condition, and the like. The lighting device may be caused to assess a power viability factor associated with at least one of the at least two different power sources, and where the step of causing the lighting device to select from at least two different power sources may be based on the interpretation comprises causing the lighting device to select from the at least two different power sources based at least in part on the environmental information interpretation and at least in part on the power viability factor. The step of causing the lighting device to select from at least two different power sources based on the interpretation may involve switching between the two different power sources. The step of causing the lighting device to select from at least two different power sources based on the interpretation may involve simultaneously drawing power from the two different power sources, such as where x percent of power is consumed from one of the alternative power sources and y percent of power is consumed from the other alternative power source. The environmental sensor input device may be a light sensor sensing a level of ambient light. The environmental sensor input device may be a motion sensor sensing motion. A power sensor input device may also be included, such as where the power sensor input device measures the amount of power consumed from one or more of the power sources, the power sensor input device measures the capacity level of at least one of the two different power source, the power sensor input device allows for an estimation of the capacity level of at least one of the two different power sources, and the like. In some embodiments, the lighting device may not contain an environmental sensor input and instead rely on measurements of the power sensor input device to select from the at least two different power sources. The lighting device may include an LED lighting source, where the LED lighting source may include an LED driver module. The lighting device may further include a fluorescent lamp ballast. The lighting device may be an inverter module driving a fluorescent lamp ballast and fluorescent light source. The lighting device may be a lighting fixture, such as where lighting fixture includes a housing that receives the illumination source. The lighting device may be an adapter that accepts the illumination source plugged into it. The step of selecting may involve switching between the two alternative power sources. The step of selecting may involve sharing power between the two alternative power sources simultaneously, such as where x percent of power is consumed from one of the alternative power sources and y percent of power is consumed from the other alternative power source.

In embodiments of emergency lighting devices and grid shifting lighting devices, an architecture to provide battery backup as an AC input to AC output in-line battery backup module may be used such that the AC input is converted to DC, then the converted DC input is or'ed (as used herein "OR'ed" and "or'ed" will be used interchangeably with "subjected to the logic function 'OR'") with the output of battery that is fed into a conversion where the output is converted through an inverter to create an AC output to the end device. The DC paths, either from the AC input or from the battery integrated into the in-line battery backup module, may be controlled with a switching circuit and to turn on, turn off or pulse width modulate to control whether power is delivered and/or the amount of power delivered to one or more devices powered by the AC output. In some embodiments, an amount of power delivered to the AC output may be monitored such that a control facility of the in-line battery backup module may be able to manage the amount of power delivered from any input source to provide a desired amount of power at the AC output and to draw the desired amount of power from the input sources.

In embodiments, a power outage may be detected in a wall switch or similar controlling device and with no power on the line still control lighting devices or electrical devices using communication over the power lines between the wall switch or similar controlling device and the lighting or electrical devices that are being controlled. It is to be appreciated that power in the wall switch or similar controlling device, lighting device or electrical device may be provided by the power source integrated into those devices to facilitate power outage functionality. In embodiments, the wall switch or similar controlling device may control the lighting or electrical devices as they may with power applied from the line. In embodiments, the wall switch or similar controlling devices may provide means of control during a power outage such as automated control of the lighting or electrical devices in a pre-configured method. By way of example, upon detecting a power outage, the wall switch or similar controlling device may instruct the control facility in a lighting device or electrical device to remain on for some period of time at which point the wall switch or similar controlling device may instruct the lighting device or electrical device to turn off, change light intensity or change mode or method of operation. In embodiments of grid shifting lighting devices or grid shifting electrical devices, input power may be shut off from grid shifting lighting devices or grid shifting electrical devices but power line communication may still allow a grid shifting controller device to continue to configure and control the grid shifting operation in the absence of power.

In embodiments, the battery powered wireless lighting modules may be controlled such that they are turned on when a disruption may be detected where wired lighting devices are controlled. In embodiments, one or more battery powered wireless lighting modules may receive a signal transmitted from a point on the wired power distribution such that the detected state of power turns on, turns off or changes the operation of battery powered wireless lighting modules. In some embodiments, the battery powered wireless lighting modules may contain transceivers allowing battery powered wireless lighting modules to form a network to transmit, receive and forward commands, control and status. In some embodiments, a wall switch controlling wired lighting may contain a wireless transmitter and an integrated power source such as a coin cell battery, rechargeable battery or the like and may operate to control the one or more battery powered wireless lighting modules if a disruption is detected in wired power. In an embodiment where wall switch controls wired lighting, the switches may still control the battery powered wireless lighting modules. By way of an example, a power outage may be detected by the intelligent wall switch. The intelligent wall switch may transmit a control message to one or more battery powered wireless lighting modules to turn on during the outage. When the intelligent wall switch detects that power has returned, it may send a message including a command to turn off one or more battery powered wireless lighting modules. In addition, the intelligent wall switch may control the battery powered wireless lighting modules through the outage such that if a user turns the switch to the on position, an on command is transmitted and the modules turn on. When the user turns the switch to the off position, an off command is transmitter and the modules turns off. In embodiments, the intelligent wall switch may have additional controls on it to control the battery powered wireless lighting modules independent of control of the wired lighting. By way of an example, a separate on/off switch may be on the intelligent wall switch to control the modules. In another example, an intelligent wall switch may have a USB connector that a user may plug a laptop into to control, configure or gather status of the battery powered wireless lighting modules. By way of an example, the user may control and/or run a test of the battery powered wireless lighting modules via a software application on a laptop or similar computer device that may be connected to an intelligent wall switch to illuminate the lights, gather battery capacity status, configure auto-shutoff times or brightness levels etc.

In embodiments, a control facility may monitor the amount of power used over time to determine when to stop or reduce the use of battery power (versus monitoring battery capacity). Knowing the capacity of the battery when it was installed and knowing the history of use of the battery may allow for a battery capacity estimation. An estimate of capacity loss over time using number of charge cycles at given charge rates, temperature, the characteristics of the power consumption of lighting devices powered by the battery may allow an emergency lighting device or grid shifting lighting device to indicate when the battery capacity may be below a threshold such that the device may not meet specification. In some embodiments, a control facility in the emergency lighting device or grid shifting lighting device may use the information to change the mode of operation (brightness level at start, brightness profile over time, amount of use of battery, charge rates, etc.) to extend the usable battery life.

In embodiments, an LED light fixture with an LED light source and an intelligent driver module that contains an integrated rechargeable battery and the ability to drive the LED light source from the battery as well as the ability to drive the LED light source from a connection to grid power. Intelligence in the form of a microcontroller, microprocessor, programmable logic or the like may control the amount of power consumed in each path (e.g., the path from the battery and the path from the grid). The intelligence may implement control of the amount of power consumed in each path through pulse width modulation control of two switching circuits to allow the two paths to be combined and the amount of power supplied from each path to be controlled via the pulse width modulation. This may allow for control of the amount of power consumed from each path therefore any amount of the power supplied to the light source may be shared between the two sources of power. Multiple methods of control implemented by the integrated intelligence may be provided to make a decision on when to perform grid shifting and how much power to shift. One method may be time of day and/or calendar based. The intelligence may maintain an accurate time of day clock and be capable of maintaining a schedule of when to activate or deactivate grid shifting and by what amount. At each entry in the schedule, the intelligence may change the control of the two paths. In addition, the integrated intelligence may be capable of scheduling charge cycles for the rechargeable battery such that the energy storage device may be charged at the optimal time depending on the application. Time scheduling may be used as a trigger to power the light fixture during a power outage. By way of an example, if full light intensity is required from the fixture during work hours, the light fixture can be programmed to automatically power the light source from the battery during work hours when it detects that the grid connection is no longer providing power. Another method may be the reception of a load control signal from an external controller. This method correlates to an interrupt from an external control source to reduce demand on the grid or return to normal operation. In the context of a grid shifting light fixture, the load control command may contain the amount of power consumption to be shifted and for how long. Time based and load control based methods of triggering grid shifting may have practical application in peak shedding, demand response and other load control mechanisms that may be desirable to a power provider. The grid shifting lighting device may contain a communication interface. A software application may run on a separate device such as a laptop, computer, handheld device, server or the like that allows a user to enter the parameters for grid shifting such that those parameters may then get communicated to the grid shifting lighting device. A user interface may create and format for the commands that get transferred from the user interface through the communication interface to the intelligence on the lighting device. In some embodiments, the grid shifting lighting device may have a transceiver such that one or more grid shifting lighting devices may form a network to receive and/or forward commands or data throughout a network of grid shifting lighting devices. The communication interface may be any type of wired or wireless interface described herein.

Figure 12:
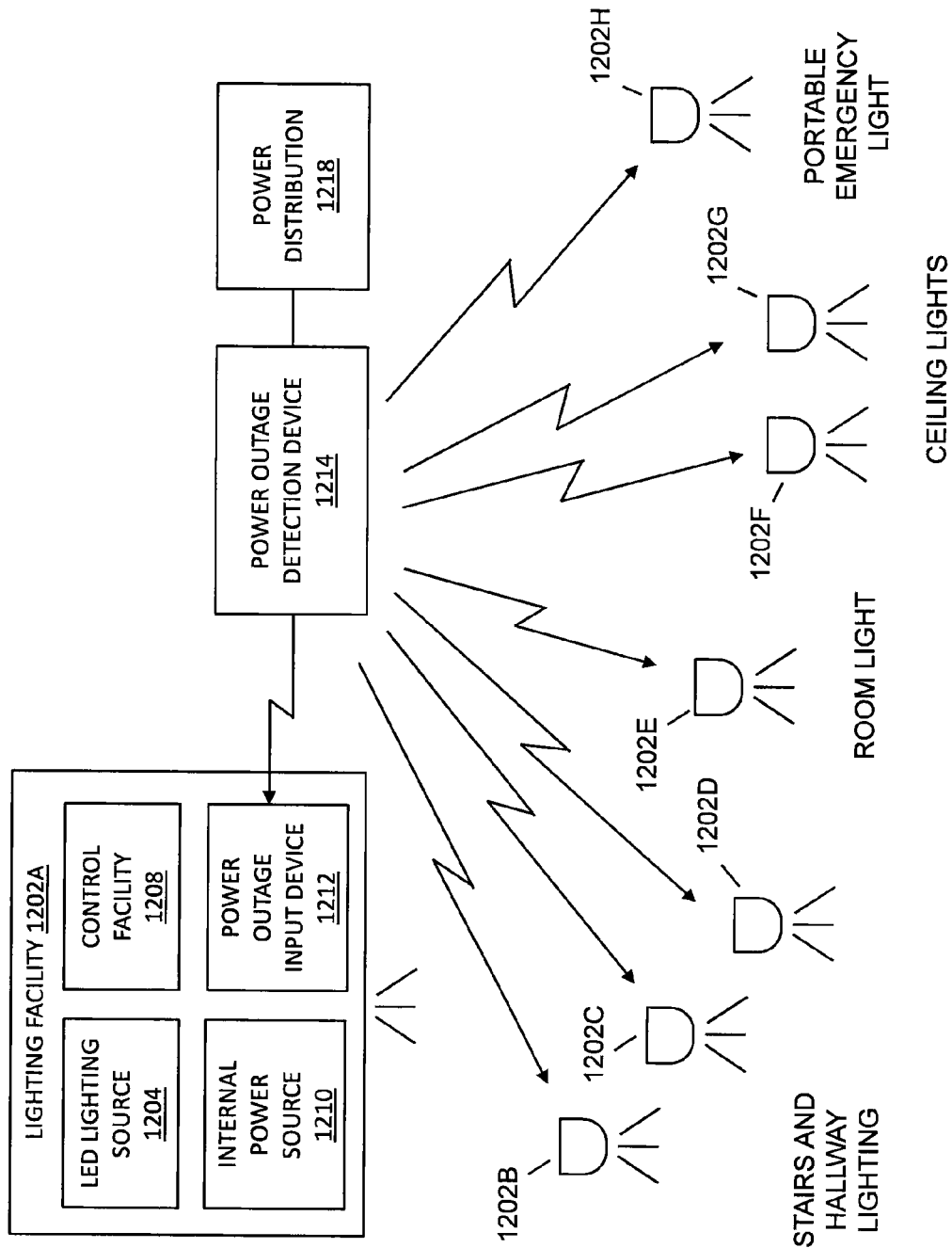
FIG. 12 depicts an embodiment of an emergency lighting system.

Referring to FIG. 12, the present invention may provide for power outage management through a lighting facility 1202A-H and a power outage detection device 1214 connected to power distribution 1218, where the lighting facility 1202A-H may include an LED lighting source 1204, a control facility 1208, an internal power source 1210, a power outage input device, and the like. In embodiments, the power outage detection device 1214 may detect a power outage in the power distribution 1217, and as a result, transmit a power outage signal to the power outage input device 1212 of the lighting facility 1202A-H. The control facility 1202 may then manipulate the LED lighting source 1204, such as turning on, turning on in a dimmed state, flashing, flashing momentarily, changing the spectral output, and the like. In addition, in the case when the lighting facility 1202A-H also has a connection to AC power, such as through the power distribution 1218, the control facility 1208 may switch power to the internal power source 1210. In embodiments, each of the lighting facilities 1202A-H may be set to respond differently, or in groups. For instance, a group of lighting facilities 1202B-D may be located in a hallway or stairway, and they may respond together in a way that provides pathway lighting in those areas; a pair of ceiling lights 1202F-G may respond together, or separately per their different positions in the room; an individual room light 1202E may be controlled separately; a portable emergency light 1202H may be set to glow when responding to help an individual find it during the power outage; and the like.

In embodiments, the present invention may provide for a power outage lighting management within an environment, comprising a power outage detection device adapted to detect a power outage condition and to wirelessly transmit power outage indication data to a plurality of lighting systems within the environment, where at least one of the plurality of lighting systems include an LED light source that is powered by an internal power source. In embodiments, at least one of the plurality of lighting systems may include a light source that is powered by either the internal power source or an external power source. In response to receiving the power outage power indication data, the lighting system including the LED light source that is powered by the internal power source may regulate a light intensity of the LED light source in accordance with the power outage indication data, such as the light intensity as a dimmed light condition, the light intensity as a full brightness light condition, and the like.

In embodiments, the present invention may provide for a power outage management for a plurality of lighting sources, comprising at least one of a plurality of lighting facilities containing an LED lighting source, a power outage input device, an internal power source, a control facility for manipulating the light output of the LED lighting source, and the like, wherein the lighting facility may provide light in response to a power outage signal received by the power outage input device indicating a power outage condition; and a power outage detection device that monitors power at some point in power distribution to detect the power outage condition, where the power outage detection device may wirelessly transmit the power outage signal to the power outage input device of the at least one of the plurality of lighting facilities when the power outage condition is detected. In embodiments, the outage input device may contain a wireless receiver to receive the power outage signal. The response may be provided with an environmental input from a sensor input device in the lighting facility in addition to the signal received by the power outage input device. The lighting facility may take the form of at least one of a light bulb that mounts into a lighting fixture, a lighting fixture, a retrofit lighting fixture, a lighting adapter, a battery powered lighting fixture, and the like. The centralized controller may be running a software control program. The signal may be received from a web-based source. The web-based source may be on a local network, on the Internet, and the like. The internal power source may be a rechargeable energy storage device integrated with the lighting facility that is capable of supplying power to the lighting facility independent of the power distribution, and where the recharging may be provided internal to the lighting facility at a time when the power distribution is available. The rechargeable energy storage device internal to the lighting facility may be a battery, fuel cell, super capacitor, and the like. The lighting facility may be disconnected and used as a portable lighting device. The sensor may sense infrared, temperature, light, motion, acoustic, smoke, electromagnetic, vibration, and the like. The manipulating may be switching on the light output, changing the illumination level of the light output, flashing the light output, changing the color content of the light output, and the like. The power outage module may contain an integral power source. The power outage module may contain a light source, where the power outage module may be disconnected from a power source and used as a portable lighting device. The response may be provided with an environmental input from a sensor input device in the centralized controller. The centralized controller may contain pushbuttons, switches, dials, and the like to control the lighting facilities remotely. The centralized controller may be a power outage module monitoring an emergency lighting circuit to detect an indication that emergency lighting must be activated. In this way, the power outage device may be connected to an emergency lighting circuit (e.g., not part of power distribution) but it would allow a wireless extension of the emergency lighting circuit. In embodiments, the present invention may provide a detached lighting system that could be supplemental to an installed emergency lighting system by propagating the control through a connected power outage device to the lights.

In embodiments of the Wireless Emergency Lighting System the power failure detection device may be hard wired or permanently connected to a junction box, wall outlet, wall switch etc. In such an embodiment the power failure detection device may contain all of the circuitry described when plugged into a wall outlet however it may be hard wired to a device with connectivity to detect a disruption of power of a power source that may transmit to one or more battery powered wireless lighting fixtures to turn on, turn off or change state based on a change of state of the monitored power source. By way of an example, a power outage failure detection device may be integrated into a wall switch. The power outage failure detection device may detect a state of the power source. The power outage failure detection device may include a power monitoring circuit, a wireless transmitter, an integrated power source such as a rechargeable battery and a processor to monitor the state of the power source, process the state and transmit a change of state to the one or more battery powered wireless lighting device. In this example, the power outage failure detection device may also detect the position of the wall switch and transmit information about the intent of the user with respect to the position of the wall switch. If the user intended to turn the lights off, the power outage failure detection device may not transmit control to turn on the battery powered wireless lighting devices or alternatively even if the user intended to turn the lights off, the power outage failure detection device may transmit control to change the state of the battery powered wireless lighting devices. In another embodiment, the power failure detection devices may be designed into a wall outlet. In an embodiment, the power failure detection device may be designed as a module that connects to a junction box such that it may have an electrical connection to the power source passing through the junction box and may detect a disruption in the power source and transmit control to battery powered wireless lighting devices. In some embodiments, the power failure detection device may have a wired or wireless interface to allow it to receive commands such that a user or installer may program the operation of the device. In embodiments, the device may receive a transmission from another power failure detection device or some alternate controller such that a network of power failure detection devices may be instantiated. The power failure detection network may allow an extension of the network beyond the range of the transmitter in a power failure detection device. In embodiments the battery powered wireless lighting devices may contain a wireless transmitter and receiver allowing the power failure detection network to be extended through a network of battery powered wireless lighting devices that may propagate control information through the network to detection devices and wireless lights beyond the range of the original control sources.

In embodiments, an emergency lighting function may be integrated into an LED light bulb or compact fluorescent light bulb by integrating an LED light source and a power source such as a battery into the bulb where the LED) light source and integrated power source operate on a detected power outage, bulb failure or any detected condition that may require the backup light source to be illuminated. In these embodiments, a processor or electrical circuit may be present to detect the outage and control the illumination of the backup light source in the bulb. The integrated power source may be rechargeable such as a super capacitor or rechargeable battery that would allow the storage of energy to be used during a power outage, bulb failure or any detected condition that may require the backup light source to be illuminated. The LED light bulb or compact fluorescent light bulb may operate independent of the backup light source integrated into the bulb. In embodiments of compact fluorescent light bulbs, the backup light source, power source and circuitry may be designed into the section of the housing containing the electronic ballast such that when the outage or failure is detected, the light source within the electronic ballast housing is illuminated. In some embodiments, a switch sense function may be integrated into the LED light bulb or compact fluorescent light bulb to add the ability of the emergency lighting function to be able to detect the state of controlling devices to allow the processor or electrical circuit to use the state of the controlling devices to decide on whether to illuminate the backup light source with the integrated power source. In embodiments that detect a bulb failure, there may be additional electrical circuitry which may monitor the primary light source to determine if there has been a failure of the primary light source. By way of an example, a current sensing may be implemented to determine if current is flowing through the primary light source. In a case where the primary light source has power applied but no current is flowing through the primary light source, the processor or electrical circuit may detect that as a failure of the primary light source. In an embodiment, a light sensor may be used to detect a failure of the primary light source (e.g., it may detect a light source outage).

In embodiments, a light fixture may contain two sockets. In one socket a regular light bulb may be installed and in the other socket a UPS or battery backed light bulb may be installed that only operates when a disruption in power is detected. The size and type of socket for primary and backup lighting may be any size or type to support any bulb mentioned herein as required by the application. The UPS light bulb may contain any functionality mentioned herein. By way of an example, the light source may illuminate during rolling or scheduled blackouts (e.g., regular power outages schedule by the power utility). In an embodiment, the trim of a fixture may contain a light source and a battery backup or similar local power source such that the light fixture trim may be illuminated powered by the battery backup when a disruption of power is detected. In an embodiment, the one of the two sockets of the fixture may be driven by an external battery backed inverter that may be capable of detecting a power outage and supply power from a backup power source. In embodiments, the device with two sockets may be designed in any size or shape lighting fixture housing.

In embodiments, a power outage light bulb may be designed in which the light source may solely be driven by an integrated power source such as a battery. In such an embodiment, the external power source may have an electrical connection to the bulb however the external power source may be used for other reasons such as to detect a disruption of power, to recharge an integrated battery, to allow a switch sense circuit to detect the state of the switch, for external communication over the wired connection and the like. By way of an example, a power outage light bulb may have a connection to AC power through an Edison base. The power outage light bulb may contain a recharge component powered from the AC power input and an LED light source. The power outage light bulb may detect whether AC power is present or not and may contain a processor or electrical circuitry to connect battery power to drive the LED light source based on the detection of the presence of AC power. By way of an example, a power failure light bulb may be designed that illuminates the light source using the integrated power source when AC power is absent at its wired input. In an embodiment, the power outage light bulb may contain switch sense circuitry such that it detect whether a controlling device such as a wall switch may be in an on or off position. In embodiments, the power outage light bulb may be integrated into an emergency lighting device or fixture to meet electrical code for emergency lighting where the power outage light bulb converts a normal fixture into an emergency lighting device or fixture that meets code. In some embodiments, a method of wireless control may be integrated into the power outage light bulb to provide additional methods of control. In one embodiment, a power outage light bulb may include a wireless receiver or transceiver such that it may be controlled independent of its wired interface. In another embodiment, a power outage light bulb may include a motion sensor. In such an embodiment, the power outage light bulb may be capable of operating during a power outage but may also provide general illumination as controlled by the motion sensor and powered by the integrated battery. It is to be appreciated that embodiments of the power outage light bulb may contain any form of wireless control mentioned herein.

In embodiments, an emergency lighting device may be designed that is controlled only by a light sensor. If the detected light level drops below a certain threshold, the emergency lighting device may illuminate powered by an integrated battery source. Thus, a switch may apply power to the light source in response to the detected light level (e.g., a light sensitive switch). When power is returned and the light source is illuminated, the control component may reset the light sensitive switch to normal mode. In some embodiments, a light sensitive switch may also be part of a light bulb with a small light source and battery that is only activated when it detects no ambient light. In some embodiments, the light sensitive switch may also have a time of day clock that may be combined with the output of the light sensor to determine when to switchover. By way of an example, the light sensitive switch may only be enabled at certain times of day.

In one embodiment, a power failure detector may control wireless lighting devices that have a connection to external power and additionally contain an integrated power source. By way of an example, a light fixture or luminaire may be designed with a connection to AC power, a light source, an integrated rechargeable battery and a wireless receiver that may receive control from a power failure detector. In normal operation, the light fixture or luminaire may be controlled by a wall switch to turn on or off the light source. In the event that a power failure detector detects a disruption in AC power, it may transmit a control message to the light fixture or luminaire to turn on the light source powered by the integrated battery. In some embodiments, the integrated battery may be large enough to sustain a high light intensity to provide general illumination for an area. In one embodiment, a task lighting fixture used in a manufacturing facility may be attached to a work bench. In some locations, the power utility may schedule power outages for extended periods of time due to capacity limitations. In such a case, a power failure detector or remote control may transmit to the task lighting fixture to switch to battery power. The light intensity may be at or close to full intensity allowing a worker at the bench to continue working through the scheduled outage. A task lighting fixture such as this would allow work to continue through an outage therefore limiting productivity losses that may be experienced due to a loss of usable light. Thus, the task lighting fixture of a Wireless Emergency Lighting System and power outage detector operate as a grid shifting system where the grid shifting function is required as a result of the power outage. It is to be appreciated that any lighting device with a connection to external power, an integrated power source, a light source and a wireless receiver may receive control from a power outage detector, remote control or other transmitting device to control to provide illumination during a power outage or to provide a higher light intensity for general illumination to allow for normal activity during the outage. It is to be appreciated that by distributing battery power in the lighting devices, the need for a generator or large energy storage device to support the lighting installation may be reduced or eliminated.

In some emergency or power outage lighting system embodiments, control of emergency or power outage lighting functionality may be distributed over a wide area network such as a 2.5G, 3G, wireless broadband etc network where a wide area network receiver or transceiver in the lighting device may provide the ability for an external control device attached to the wide area network to communicate with and control the end device. In some embodiments, a battery powered wireless lighting module may receive power outage information or control through a wide area network connection and be able use its integrated power source based on the control received over the wide area network. In some embodiments, a battery backed wireless lighting device with a connection to external power may receive power outage information or control through a wide area network connection and be able use its integrated power source based on the control received over the wide area network. By way of an example, an externally powered battery backed wireless lighting device may be designed as a street lamp that is normally powered by an external power source (such as AC power). During a power outage the lighting device may receive a command via a 3G receiver to power the light source using the integrated battery. When the power outage is over, the lighting device may detect the return of power or receive control from the 30 network to return to using the external power source. In embodiments, an external controller that may control one or more emergency or power outage lighting devices may receive control over the wide area network. The external controller may then control the one or more lighting device to operate as required during emergency or power outage situations. By way of an example, a server installed in a commercial building may have a 3G connection and may receive commands to control the lighting installation during an emergency or power outage situation. The server may have a wired or wireless connection to the emergency or power outage lighting devices such that it may command the devices to use the embedded battery power during the emergency or power outage situation. In some embodiments, the control received over the wide area network may be to schedule the use of the embedded power source of a lighting device. In cases where a schedule power outage or rolling blackout may be common, control may be distributed to controllers or lighting devices to schedule the use of the embedded battery power throughout the lighting installation. An advantage of using a wide area network may be that it does not require any additional infrastructure to provide the communication from an external controlling source to the emergency or power outage lighting system. A power utility or other service provider may be able to control end devices during an emergency or power outage without having to alter or add to the infrastructure of an end customer. In embodiments, the power outage indication received via a wide area network may extend to any type of device requiring a power outage indication and may provide a control during a power outage for devices such as a lighting device, lighting adapter, lighting fixture, troffer, lamp or lamp base, ballast, lighting power supplies, lighting control device and the like, television, television peripheral, computer, servers, network equipment, storage devices, appliance, washer, clothes dryer, refrigerator, freezer, electric range, microwave oven, electric water heater, vacuum cleaner, cell phone charger, stereo, air conditioner, HVAC devices, electric or hybrid vehicles, electric motors, portable generators and backup power sources, uninterruptable power supplies (UPS), inverters, industrial and manufacturing machinery etc.

In embodiments, a system may be created including a Power Outage Ceiling/Task Lighting Device with a Wireless Receiver having a connection to external power, an integrated power source and a wireless remote control such that a user may turn on the light source powered by the integrated power source during a power outage via the wireless remote control. In some embodiments, the wireless remote control may be a power outage module that is connected to a power source to monitor whether the power source is available or not and transmit to one or more Power Outage Ceiling/Task Lighting Device with Wireless Receiver to turn the light sources on during a detected outage. In some embodiments, the Lighting Device may contain a real time clock to maintain time of day or a calendar. In some embodiments, the wireless remote control may provide an interface to program the Lighting Device allowing the Lighting Device to be programmed to operate based on time of day. In the case where power outages are scheduled, with knowledge of the schedule a user may program the lighting device to operate automatically to provide a light source through the outage. In normal operation, the Power Outage Ceiling/Task Lighting Device with Wireless Receiver may operate powered from the external power source and may be controlled by a power delivery switch such as a wall switch such that the wall switch may turn the Lighting Device on and off, dim or control in any other manner mentioned herein with a second form of wireless control allowing a user to operate the Lighting Device through the wireless receiver using the wireless remote control independent from or in conjunction with the external power source. In some embodiments, the battery may be recharged if needed while external power is applied and when power goes out a user may turn on the light powered by an integrated power source the wireless remote control. A user may turn on a room full of Power Outage Ceiling/Task Lighting Devices with a single remote control. It is to be appreciated that a wireless remote control may control one or more Lighting Devices on more than one lighting circuits. By way of an example, a commercial office building can indicate which lights throughout the office will use the backup power source but these lights may be controlled by a single emergency remote. In some embodiments, one or more wireless remote controls may be used to control one or more Lighting Devices on one or more lighting circuits. In some embodiments, the wireless remote control allows a user to dim a light or select from multiple lighting levels to conserve battery power and thus extend the amount of time that usable light is available. The claimed subject matter may be designed in any size or shape housing to meet the requirements of any standard size bulb (e.g. PAR30, PAR38, A19, R30, MR16 etc), non-standard size bulb, fixture, compact fluorescent bulb, fluorescent bulb or lamp (e.g. T4, T5, T8, circular etc.) or down light assembly (e.g. recessed fixtures, fluorescent fixtures or down light fixtures for residential, commercial or industrial lighting), or the like. It is to be appreciated that any combination of wireless control mentioned herein may be used in conjunction with the claimed subject matter.

In embodiments of emergency wireless lighting devices, a system may be created including a Battery Backed LED Driver Module for LED fixtures containing a connection to external power, an integrated power source, a wireless receiver and the capability to drive the LED light source and a power outage module containing a power outage detector to detect a disruption in power and a wireless transmitter such that the power outage module may control the light source powered by the Battery Backed LED Driver Module via the power outage module. In embodiments, a system may be created including a power outage module and a Battery Backed Ballast with a wireless receiver to perform the functions mentioned herein for fluorescent lighting. In embodiments, the power outage module may be connected to a power source to monitor whether the power source is available or not and transmit to one or more Battery Backed LED Driver Module for LED fixtures to control the light source. In the case of a detected power outage, the power outage module may transmit to the Battery Backed LED Driver Module for LED fixtures to turn the light source on powered by integrated battery power. In some embodiments, the Battery Backed LED Driver Module for LED fixtures may contain a real time clock to maintain time of day or a calendar. In some embodiments, a wireless remote control may provide an interface to program and control the Battery Backed LED Driver Module for LED fixtures allowing the Battery Backed LED Driver Module for LED fixtures to be programmed to operate based on time of day. In some embodiments, the Battery Backed LED Driver Module for LED fixtures may be configured to perform grid shifting to transfer some of all of the power consumed to be supplied by the integrated battery. In the case where power outages are scheduled, with knowledge of the schedule a user may program the driver module to operate automatically to provide a light source through the outage. In normal operation, the Battery Backed LED Driver Module for LED fixtures may operate the light source powered from the external power source and may be controlled by a power delivery switch such as a wall switch such that the wall switch may turn the light source on and off, dim or control in any other manner mentioned herein with a second form of wireless control allowing a user to operate the driver module and light source via the wireless receiver using the power outage module or wireless remote control independent from or in conjunction with the external power source. In some embodiments, the battery may be recharged if needed while external power is applied and when power goes out a user may turn on the light powered by an integrated power source the wireless remote control.

In embodiments of wireless power outage lighting, a transmitter programming sequence method may be designed for a power outage detector and wireless lighting modules to program a channel number into the devices to operate independently from other devices that may be operating on a separate channel number in the same area. The devices may be received by a customer on a default channel. With no changes, the units should work together out of the box for any configuration. In some embodiments, the wireless lighting module or wireless lighting device may have a dip switch or similar to assign a channel number to the module or device. In embodiments a user may set the channel with dip switch on receiver side. A user may press the buttons on a power outage detector to enter channel programming mode. By way of an example, the user may press the ON and the FLASHLIGHT button together and hold them both down for 5 seconds. Channel programming mode automatically starts. An LED on the power outage detector may blink in a pattern to indicate programming mode. The power outage detector may cycle through the channels one by one by transmitting the ON command for each channel, three seconds per channel. When a user sees the desired receiver turn on, they may press a button on a power outage detector and that channel that was being transmitted when the button is pushed is programmed in power outage detector. The power outage detector may be permanently programmed on that channel (burned in FLASH memory of microcontroller). It is to be appreciated that any number of channels or sequencing of the channels by the transmitter may be used in conjunction with the claimed subject matter.

In embodiments of a portable lantern responsive to a power outage detector, the lantern may respond to wireless control of a night light mode in the lantern. In night light mode, the lantern may emit a lower light level than in a brighter mode. The power outage detector or an alternate remote control may turn on and off night light mode. A power outage detector or an alternate remote control may toggle through night light mode, bright mode and off with pushes of the ON button. In some embodiments, a brightness control or dimming of night light mode remotely may be possible. In some embodiments, an auto shutoff time may be associated with the night light mode and the auto shutoff may be set or cleared by the method of control used to set the operation of the lantern.

In some embodiments, a remote light controller may be combined with a smoke detector such that a detection of an alarm condition corresponding to detected smoke may cause the remote light controller to transmit to turn on wireless lights. In one embodiment, path or stair lights may be illuminated wirelessly in response to a condition detected at smoke detector. In some embodiments, a wireless push button may be used as an as accessory to control wireless lights. In alternate embodiments, a burglar system may control wireless lights based on sensor inputs trigger the burglar system to transmit control to wireless lights. In alternate embodiments, laptop and smart phones may control of wireless lighting devices that are part of a wireless power outage lighting system instead of or in addition to a power outage detector.

In embodiments of the wireless power outage lighting system, a hospitality kit for power failure lighting may be designed comprising of a power outage detector built into electrical outlet or as a retrofit electrical outlet that may replace an existing outlet. In such a case, the power outage detector electrical outlet may contain controls such as push buttons, to control the wireless lights responsive to the power outage detector independent of a power outage. Wireless lights may be designed with tamper proof mounting to prevent theft. By way of an example, two security screws may be used to mount a wireless lighting module such that a person may have more difficulty in removing the light from its installed location. In some embodiments, a light source may be provided in the outlet in addition to the control for the remote lights. In another embodiment, a power outage detector may be plugged into an outlet or hard wired to electrical power above a ceiling tile, in access panel or similar place in a hotel, retail store or the like where it may detect a power outage and transmit to wireless lighting modules to illuminate during a power outage.

In some embodiments, a pseudorandom delay may be implemented to delay transmitting from the detection of an outage to allow multiple systems or transmitters to operate in the same area without interfering with each other. A protocol that allows multiple simultaneous transmissions (for example operating on different frequencies) may be implemented to avoid interference. In alternate embodiments, a time slot protocol timed from when a power outage detector detects an outage such that the power outage detector sends when the outage occurs then waits for its channel slot to send again.

In embodiments of a wireless power outage lighting system, a wide area network power outage detector may have the ability to send a text, data or other indication that a power outage has occurred via a cellular network if electricity goes out. The power outage detector may contain or connect to a cellular modem to make the transmission. In some embodiments, the wide area network power outage detector may have a USB port or similar that a network interface device may plug into to allow it to connect to a particular cellular, WAN, LAN or other network. In some embodiments, the wide area network power outage detector may have a GSM or CDMA modem integrate that allows it to connect to a wireless network and send a text message to a destination phone number. In embodiments, the destination phone number may be configured at the wide area network power outage detector such that a user may configure the device to send texts or emails to any end user they desire.

In embodiments of a wireless power outage lighting system, a power outage lighting system lantern may be designed to operate as a portable light that may be responsive to the transmissions of a power outage detector. The intent is that the power outage lighting system lantern allows a user to add a portable lighting device to the wireless power outage lighting system. The power outage lighting system lantern may be stored on a shelf by the user until they anticipate an outage or an outage has already occurred at which time they can pull the lantern off the shelf and place one or more around the house. Thereafter, they may move the lanterns as needed. The lantern may have a push button on the lantern to turn it on, off or toggle between brightness levels. The lantern may have a wireless receiver to allow it to be controlled by a power outage detector or remote control. The power outage lighting system lantern may have two brightness levels—full brightness and a lower brightness level such as a night light mode. The power outage lighting system lantern may be powered by batteries. In one example, the lantern may be powered by four D cell batteries. The lantern may contain a low battery indication such as one or more LEDs indicating when the battery capacity has dropped below a certain level. In some embodiments, the lantern may auto shutoff after it is turned on. By way of an example, after turned on by the transmission of a power outage detector, a lantern may turn off automatically after thirty minutes. In an embodiment, the lantern may have a USB type A female connector providing only +5V and GND for charging an external device. In alternate embodiments, the lantern may have any type of charging connector that may allow for the charging of an external device from the power source of the lantern. In the event of a power outage, the lantern may provide illumination but may also provide the capability to charge a cell phone, laptop, handheld computer or other device via the charging port. The lantern may have a weatherproof housing for indoor and outdoor use. The housing of the lantern may contain a hook for hanging the lantern and/of a handle for carrying the lantern.

In embodiments of the power outage detector, a power outage detector may be integrated with a cordless phone or the base station for a cordless phone such that it may be able to send a text, send data or make an automated phone call over the phone lines if it is a land line or if it is a voice over IP phone lines, over the Internet. In some embodiments, there may be a small backup battery to allow the power outage detector to continue to operate and transmit to wireless lights to turn them on during a power outage. In some embodiments, a user may type in number that a text would be sent to or may program an emergency phone number to automate a call. In alternate embodiments, the power outage detector may be embedded into a cordless phone or any AC powered device where a power outage detector and transmitter may transmit to wireless lights upon detection of an outage from inside an AC powered device.

In embodiments of lighting installations where DC power is distributed in a building to provide a power source for lighting, LED lighting devices with an integrated rechargeable battery may be deployed to store energy to provide lighting during a power outage or for grid shifting purposes. In some embodiments a Lighting-2-Grid architecture may be implemented where a return path exists such that a power output from each lighting device may return power back to a grid tie inverter that would allow for returning power to the grid. In embodiments, a lighting device may have a diode OR connection to the return path such that all lighting devices may be capable of returning power to the grid via the ORed connection. The output of each lighting device used for the purpose of returning power to the grid may be electrically connected so that the diode ORing of the lighting devices provides an electrical path in one direction to the grid tie inverter that ultimately returns power to the grid. In an embodiment where AC power is distributed in a building to provide a power source for lighting, the output of each lighting device for the purpose of returning power to the grid may be electrically connected through the diode ORing however the connection of the lighting devices may produce a DC offset on the AC power lines that may ultimately be connected through an electrical circuit that can extract the DC power from the AC power lines. The extracted power may then be returned to the grid through a grid tie inverter.

In embodiments including a grid tie inverter to return power to the grid, an intelligent power delivery switch may be designed to allow a user to leave a wall switch closed to allow grid tie inverter to return power to the grid while the light source remains off. In such an embodiment, the intelligent power deliver switch may apply power to the light but provide an indication to the light that it should remain off. In one embodiment, a triac controlled dimming circuit contained in the intelligent power delivery switch may chop the waveform to the light in a way to communicate that the light should be off but that the grid tie inverter may still return power to the grid. By way of an example, if the triac controlled dimming circuit contained in the intelligent power delivery switch may chop the waveform such that between 99.5% and 99.7% of the waveform may be chopped. When a circuit in the lighting device detects the waveform with those characteristics, it may disconnect power from the light source via a relay or other switching device controlled by the circuitry in the lighting device. The circuitry inside the lighting device may then activate the grid tie inverter circuit to return power to the grid.

In some embodiments, a lighting driver module or lighting device may include electrical terminals (e.g. wires, screws, terminal blocks, connectors etc.) allowing the lighting device to have an electrical connection to an external battery, power supply or power source. By way of an example, a lighting driver module or lighting device may not have an internal power source but may instead have an external battery, power supply or power source that may be wired to through the electrical terminals on the lighting driver module or lighting device. In some embodiments, there may be protection circuitry on the input power from the external power source. In some embodiments, one or more lighting driver modules or lighting devices may be connected to an external battery, power supply or power source. The lighting driver module may be an LED driver module, LED power supply, fluorescent ballast and the like. The lighting device may be any standard size bulb (e.g. PAR30, PAR38, A19, R30, MR16 etc), non-standard size bulb, fixture, compact fluorescent bulb, fluorescent bulb or lamp (e.g. T4, T5, T8, circular etc.) or down light assembly (e.g. recessed fixtures, fluorescent fixtures or down light fixtures for residential, commercial or industrial lighting), or the like.

In embodiments of power outage devices or grid shifting devices, a battery embedded outlet adapter including an integrated battery, a connection to plug into an electrical outlet, a connector to allow an electrical plug to connect to it and a wired or wireless communication method such that a smart meter or smart grid controller device may communicate with the adapter to switch over to the battery during a power outage or for grid shifting purposes. In embodiments, the battery backed outlet adapter may contain electrical circuitry allowing external power and battery power to be controlled such that some or all power required by one or more connected devices may be supplied by either power source. By way of an example, a battery embedded outlet adapter may plug into a wall outlet such that AC power may come into the adapter. The battery embedded outlet adapter may contain an inverter to convert DC from the embedded battery to AC to power connected devices. An electrical circuit and processor to control the amount of power from input AC power and from embedded battery power may be included in the battery embedded outlet adapter. The smart meter may also have a battery in it to allow it to operate during an outage.

In embodiments of grid shifting lighting devices, a system may be created including a Grid Shifting Ceiling/Task Lighting Device with a Wireless Receiver containing a connection to external power and an integrated power source and a wireless remote control such that a user may turn on the light source powered by the integrated power source during a power outage (such as a scheduled power outage or rolling blackout) or when there is a need to reduce power consumption on the via the wireless remote control. In some embodiments, the wireless remote control may be a power outage module that is connected to a power source to monitor whether the power source is available or not and transmit to one or more Grid Shifting Ceiling/Task Lighting Device with Wireless Receiver to turn the light sources on during a detected outage. In embodiments, the lighting device may be programmable, may have a real time clock, may be AC or externally powered and controlled by a wall switch allowing normal light operation, may allow the battery to be recharged while AC power or external power is applied or when power goes out may allow a user control the light source from the RF remote/controller while powered by the battery power source. In embodiments, a grid shifting module installed on an electrical circuit to determine how much power is being consumed by the circuit may detect the amount of power consumed on a circuit and transmit to a Grid Shifting Ceiling/Task Lighting Device with Wireless Receiver to transfer some of the power consumed to the integrated power source. The grid shifting module may be installed at a wall switch, circuit breaker or any other location in the power distribution to monitor how much power is passing through a point in an electrical circuit. In some embodiments, the Lighting Device may contain a real time clock to maintain time of day or a calendar. In some embodiments, the wireless remote control may provide an interface to program the Lighting Device allowing the Lighting Device to be programmed to operate based on time of day. In the case where power outages are scheduled, with knowledge of the schedule a user may program the lighting device to operate automatically to provide a light source through the outage. In normal operation, the Grid Shifting Ceiling/Task Lighting Device with Wireless Receiver may operate powered from the external power source and may be controlled by a power delivery switch such as a wall switch such that the wall switch may turn the Lighting Device on and off, dim or control in any other manner mentioned herein with a second form of wireless control allowing a user to operate the Lighting Device through the wireless receiver using the wireless remote control independent from or in conjunction with the external power source. In some embodiments, the battery may be recharged if needed while external power is applied and when power goes out a user may turn on the light powered by an integrated power source the wireless remote control. A user may control a room full of Grid Shifting Ceiling/Task Lighting Devices with a single remote control. It is to be appreciated that a wireless remote control may control one or more Lighting Devices on more than one lighting circuits. By way of an example, a commercial office building can indicate which lights throughout the office will have some or all of their power supplied by internal power. These lights may be controlled by a single wireless remote. In some embodiments, one or more wireless remote controls may be used to control one or more Lighting Devices on one or more lighting circuits. In some embodiments, the wireless remote control allows a user to dim a light or select from multiple lighting levels to conserve battery power and thus extend the amount of time that usable light is available. The claimed subject matter may be designed in any size or shape housing to meet the requirements of any standard size bulb (e.g. PAR30, PAR38, A19, R30, MR16 etc), non-standard size bulb, fixture, compact fluorescent bulb, fluorescent bulb or lamp (e.g. T4, T5, T8, circular etc.) or down light assembly (e.g. recessed fixtures, fluorescent fixtures or down light fixtures for residential, commercial or industrial lighting), or the like. It is to be appreciated that any combination of wireless control mentioned herein may be used in conjunction with the claimed subject matter.

Control of grid shifting functionality may be distributed over a wide area network such as a 2.5G, 3G, wireless broadband etc network where a wide area network receiver or transceiver in the grid shifting device may provide the ability for an external control device attached to the wide area network to communicate with the grid shifting end device. In some embodiments, a wireless lighting device with a connection to external power and an integrated power source may receive grid shifting information or control through a wide area network connection and be able to transition some or all of the power sourced to an integrated power source based on the control received over the wide area network. By way of an example, an externally powered battery backed wireless lighting device may be designed as a down light in a commercial office building that is normally powered by an external power source (such as AC power). When there is a need to shift power to the integrated power source, the lighting device may receive a command via a 3G receiver to power the light source using the integrated battery. In embodiments, an external controller that may control one or more grid shifting lighting devices may receive control over the wide area network. The external controller may then control the one or more lighting device to perform grid shifting functions. By way of an example, a grid shifting controller may be installed in a commercial building to control one or more lighting circuits. The grid shifting controller may have a 3G connection and may receive commands to control the lighting installation to perform grid shifting functions. The grid shifting controller may have a wired or wireless connection to the grid shifting lighting devices such that it may command the devices to use the embedded battery power in conjunction with or in lieu of the external power source. In some embodiments, the control received over the wide area network may be to schedule the use of the embedded power source of a lighting device. In cases where a schedule power outage or rolling blackout may be common, control may be distributed to controllers or lighting devices to schedule the use of the embedded battery power throughout the lighting installation. An advantage of using a wide area network may be that it does not require any additional infrastructure to provide the communication from an external controlling source. A power utility or other service provider may be able to control end devices for grid shifting purposes without having to alter or add to the infrastructure of an end customer.

Figure 13:
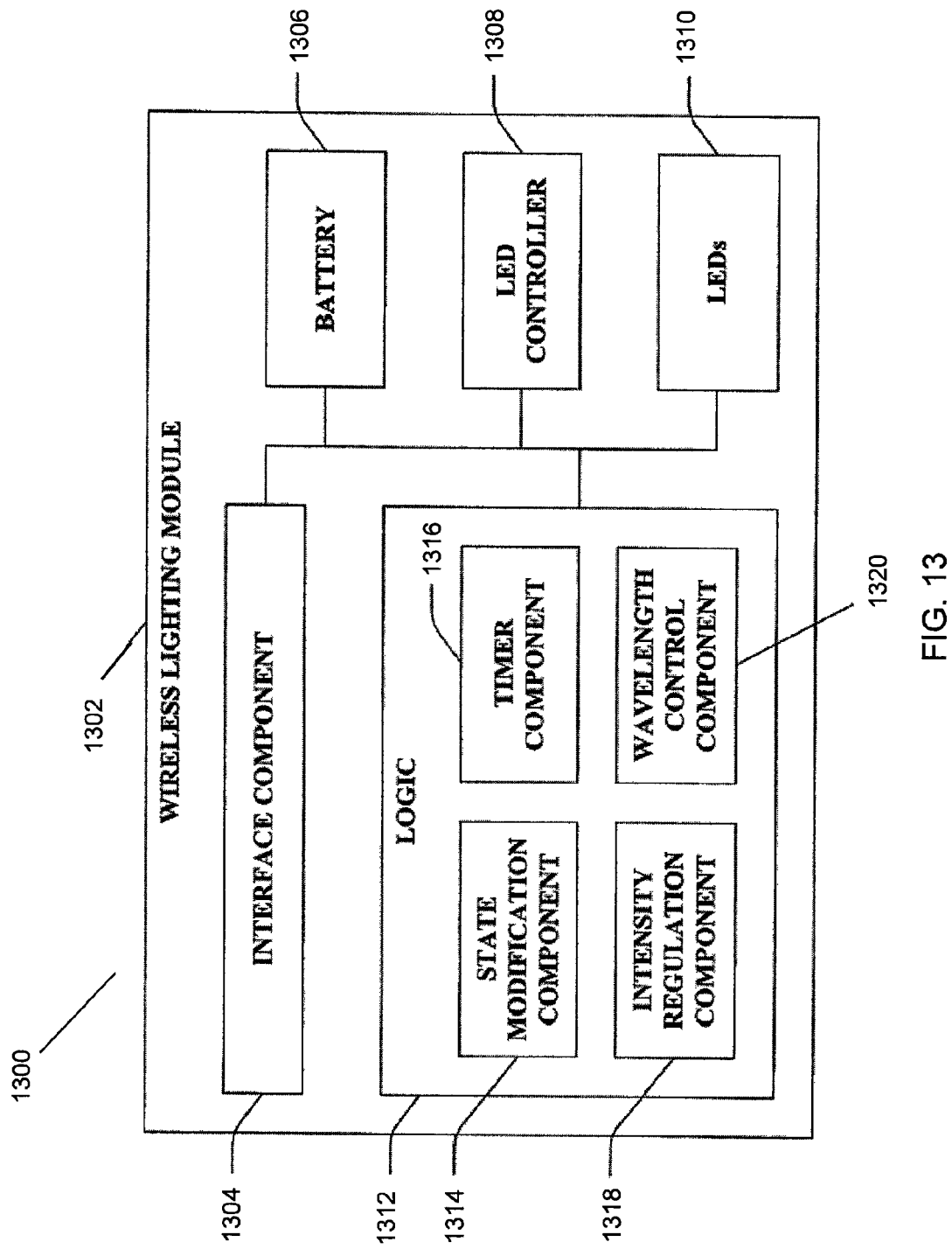
FIG. 13 depicts an embodiment of a wireless lighting module.

With reference to FIG. 13, illustrated is a block diagram of a system 1300 that provides illumination with a wireless light which may be used in embodiments described herein. System 1300 includes a wireless lighting module 1302 that can further comprise an interface component 1304, a battery 1306, an LED controller 1308, LEDs 1310, and/or logic 1312. The wireless lighting module 1302 can be incorporated into a housing (not shown). Any size and/or shape housing can be employed with the wireless lighting module 1302. According to another illustration, the housing can include at least a portion that is moveable (e.g., manually by a user, automatically with a motor or the like) to allow for directing emitted light. For example, a remote control can provide a signal to manipulate a moveable portion of the housing. Moreover, the housing can orient the LEDs 1310 in substantially any manner to provide general lighting (e.g., illuminating an indoor or outdoor area), task lighting (e.g., reading), accent lighting, and so forth. The remote control may also adjust settings associated with reducing power consumption from the battery, grid shifting, peak shedding, load leveling or any other functionality discussed herein. In embodiments, there may be a connection to an external power source such as an AC power source or the like.

The interface component 1304 can receive an input from a disparate device such as a remote control, sensor, another light and the like to, for example, adjust settings associated with grid shifting, peak shedding, load leveling or any other functionality discussed herein. The interface component 1304 can provide various adaptors, connectors, channels, communication paths, etc. to enable interaction with the disparate device. Pursuant to an illustration, the input can be wirelessly transmitted (e.g., via an RF signal, an IR signal) from the disparate device to the interface component 1304; thus, the interface component 1304 can be a receiver and/or a transceiver that obtains the wirelessly transferred signal. By way of example, an infrared sensor or motion sensor can monitor occupancy in an environment and, upon detecting presence within the monitored environment, the sensor can transmit a wireless input to the interface component 1304. It is to be appreciated that any type of sensors can be utilized in connection with the claimed subject matter such as, but not limited to, infrared sensors, light sensors, proximity sensors, acoustic sensors, motion sensors, carbon monoxide and/or smoke detectors, thermal sensors, electromagnetic sensors, mechanical sensors, pressure sensors, chemical sensors, and the like. According to another example, any type of remote control can wirelessly communicate with the interface component 1304. For instance, the remote control can be a stand-alone remote control (e.g., the remote control 300 of FIG. 3) and/or incorporated into a disparate device (e.g., incorporated into a key fob, a programmable wireless transceiver integrated in an automobile.). Moreover, the remote control can be a personal computer, a cellular phone, a smart phone, a laptop, a handheld communication device, a handheld computing device, a global positioning system, a personal digital assistant (PDA), and/or any other suitable device; such devices can communicate directly with the interface component 1304 and/or via a network (e.g., local area network (LAN), wide area network (WAN), cellular network). In accord with another example, radio frequency identification (RFID) can be utilized to provide the input to the interface component 1304. As such, an RFID tag associated with a user can be detected when in range of the interface component 1304, and lighting preferences of the particular user (e.g., retained in memory) can be effectuated in response to the detection of the user.

Additionally or alternatively, the interface component 1304 can be a sensor that can monitor a condition associated with the wireless lighting module 1302 to generate the input. According to another example, the interface component 1304 can be a connector, port, etc. that couples to such sensor.

Further, the interface component 1304 can wirelessly transmit data (e.g., feedback, related to a current and/or anticipated future state) to a remote device and/or sensor. By way of another example, the interface component 1304 can wirelessly communicate with an interface component of a disparate wireless lighting module to enable coordinated operation between more than one wireless lighting module. Following this example, an input can be retransmitted within a network of wireless lighting modules, where the network of lighting modules can be dispersed within a geographic area.

An interface component 1304 integrated into the wireless lighting module 1302 that allows it to be used stand alone, a sensor on the wireless lighting module 1302 used for input or by a remote control that provides input wirelessly to the wireless lighting module 1302, as described herein (e.g., not connected by wire to the wireless lighting module 1302) may be defined as wireless control. Wireless control allows the installation of the wireless lighting module 1302 in any indoor or outdoor location where light may be desired without the need for a wired connection to control it.

The battery 1306 can be any number and/or type of battery. For instance, the battery 1306 can be a rechargeable battery. According to another example, the battery 1306 can be a non-rechargeable battery. The battery 1306 supplies power to the wireless lighting module 1302 to enable installing, moving, replacing, etc. the wireless lighting module 1302 at substantially any indoor or outdoor location while mitigating the need for expensive and time consuming wiring and/or utilization of aesthetically unpleasing and potentially inconvenient cords commonly associated with conventional lighting.

The LED controller 1308 can obtain instructions from the logic 1312 to control operation of the LEDs 1310 as well as power management. For example, the LED controller 1308 may adjust settings associated with reducing power consumption from the battery, grid shifting, peak shedding, load leveling or any other functionality discussed herein. The LED controller 1308, for example, can receive and effectuate instructions to switch one or more LEDs 1310 on and/or off, change an intensity of illumination (e.g., brightness), switch a wavelength of light emitted from the LEDs 1310 (e.g., to change light color), manipulate direction of illumination (e.g., by moving, rotating, etc. one or more of the LEDs 1310). It is contemplated that any number, type, color, arrangement, etc. of LEDs 1310 can be utilized with the wireless lighting module 1302.

The logic 1312 employs the input obtained by the interface component 1304. The logic 1312 can further include a state modification component 1314, a timer component 1316, an intensity regulation component 1318, and/or a wavelength control component 1320; however, the logic 1312 can include a subset of these components 1314-1320. The state modification component 1314 may utilize input obtained via the interface component 1304 to generate an instruction to change a state of one of more of the LEDs 1310. The state modification component 1314 effectuates transitioning one or more LEDs 1310 to an on state, an off state, etc. Further, the state modification component 1314 can yield commands to strobe one or more LEDs 1310 (e.g., periodically turning LED(s) 1310 on and off with substantially any periodicity). The state modification component 1314 can decipher that a received input pertains to one or more of the LEDs 1310. Moreover, the state modification component 1314 can analyze the input to determine whether to instruct the LED controller 1308 to change the state (e.g., compare an input from a sensor to a threshold, evaluate whether a condition has been met, based upon retrieved instructions corresponding to the input retained in memory.). The state modification component 1314 can also adjust settings associated with reducing power consumption from the battery, grid shifting, peak shedding, load leveling or any other functionality discussed herein.

The timer component 1316 can operate in conjunction with the state modification component 1314. For instance, the timer component 1316 can enable delaying state changes. Thus, turning the LEDs 1310 on or off can be delayed for an amount of time by the timer component 1316. Further, the amount of time for the delay can be predetermined, randomly selected, included with the input obtained by the interface component 1304 (e.g., based on a number of times a button of a remote control is depressed), etc. According to another example, the timer component 1316 can conserve battery life by enabling the state modification component 1314 to switch the LEDs 1310 to an off state at a particular time of day, after an elapsed amount of time subsequent to an input that turned the LEDs 1310 to the on state, and so forth. Pursuant to another illustration, the timer component 1316 can operate in conjunction with the intensity regulation component 1318 and/or the wavelength control component 1320 described below.

The intensity regulation component 1318 can alter the intensity (e.g., brightness) of the LEDs 1310 based upon the received input from the interface component 1304. The intensity can be changed by the intensity regulation component 1318 adjusting a proportion of LEDs 1310 in an on state to LEDs 1310 in an off state. Additionally or alternatively, the intensity regulation component 1318 can control the intensity of light emitted by each of the LEDs 1310. According to an example, the interface component 1304 can obtain RFID related input that identifies the presence of a particular user, and this user can have lighting preferences stored in memory (not shown) associated with the wireless lighting module 1302. Following this example, the particular user's preferences may indicate that she desires the LEDs 1310 to be dimly lit, which can be effectuated by the intensity regulation component 1318. Pursuant to another example, upon a smoke detector or carbon monoxide detector sensing smoke or carbon monoxide, respectively, the intensity regulation component 1318 can increase the brightness of the illumination of the LEDs 1310 to a highest level (e.g., while the state modification component 1314 can strobe the LEDs 1310, the wavelength control component 1320 can change the color). It is to be appreciated, however, that the embodiments are not limited to the aforementioned examples.

The wavelength control component 1320 can change the wavelength (e.g., color) of light generated by the LEDs 1310 as a function of the input obtained by the interface component 1304. For example, the LEDs 1310 can be color changing LEDs, and the wavelength control component 1320 can yield commands to adjust the color based upon the input obtained by the interface component 1304. By way of another example, the LEDs 1310 can include subsets of LEDs that yield differing colors, and the wavelength control component 1320 can select which of the LEDs 1310 to turn to the on state to yield the desired color.

A building wireless lighting kit may be comprised of wireless lighting devices or wireless lighting modules where the wireless lighting devices are installed in an area such as a room, residence, floor of an office building etc where there may not be a need for wall switches, dimmer switches etc. In such a kit, the wireless lighting devices may contain forms of wireless power and wireless control to allow them to be completely disconnected from and act with respect to the grid. In some embodiments, the building wireless lighting kit may contain a connection to the grid to power the wireless lighting devices however the wireless lighting devices may not have wired mechanisms to control them on individual lighting circuits. The lighting devices in the building wireless lighting kit may contain wireless controls and have intelligence built in such that no controlling switch may be necessary. By way of an example, a residence may be built without any wall switches. The wireless lighting devices may contain wireless control mechanisms such as motion sensors, light sensor etc. The wireless lighting devices may contain a processor that may be programmed to manage control of the building wireless lighting kit. The wireless lighting devices may contain a wireless receiver or wireless transceiver allowing the devices to be controlled by a remote transmitter or by a disparate wireless lighting device allowing coordinated operation by a group of wireless lighting devices. In one embodiment, the wireless lighting device may be a ceiling light that contains a motion sensor, light sensor, wireless transceiver, a processor with a real time clock and a connection to external power. Also in this embodiment, the kit may include a software program and a transmitter or transceiver that may be connected to a computer running the software program such that it may program, configure, gather status from etc the ceiling lights in the kit. With no controlling switch on the wired connection to external power, the wireless lighting devices would be controlled on by the wireless control mechanisms available to it. In a building wireless lighting kit, the wireless ceiling lighting devices may be installed throughout a room or floor of a building and be controlled only by wireless control or programmed by the software program, computer and connected transmitter.

In embodiments, a wireless proximity aware remote control device that turns on the lighting devices that are closest in proximity to remote control may be implemented. In such an embodiment, the lighting devices may contain a mechanism to measure the range to the remote control and determine if it is the within range to be controlled by the remote control. The lighting devices may be programmed or configured with a desired range such that when control is received from the remote control, if the light device determines that it is within the pre-programmed range, it will be act on control or commands received by the remote. In some embodiments, the lighting devices are wireless lighting modules. In some embodiments, lighting devices may be grouped together such that they may coordinate operation to function in a coordinated fashion to turn on, off, dim or modulate operation of the light sources as commanded by the remote control. In some embodiments, there may be two way communications between the wireless proximity aware remote control device and the lighting devices. If a group of lights receive control or a command from the wireless proximity aware lighting device, the lighting devices may respond to the command such that the first response received by the wireless proximity aware remote control determines which group of lights is within proximity. Then the wireless proximity aware remote control may send a second command with a group identifier in it such that it only control the lighting devices that had been previously determined to be closest in proximity to the remote control. In some embodiments, the range between the remote control and one or more lighting devices may be determined prior to the control being sent. With a range information table, the wireless proximity aware remote control may be able to send control or commands to the one or more lighting devices within a set range as programmed in the wireless proximity aware remote control. The method to determine proximity or a distance between the remote control and lighting devices may include but is not limited to round trip delay, time of arrival, use of global positioning satellites (GPS), signal strength, localization techniques using wireless networks such as Wifi, Zigbee etc, infrared, sonar, radar and the like. The wireless proximity aware remote control and lighting devices may contain tightly synchronized clocks to determine time of arrival. By way of an example, a user may be in one room in a residence holding a wireless proximity aware remote control and want to control the lighting in only that room. The user may push a button to illuminate the lights on the wireless proximity aware remote control. The wireless proximity aware remote control may transmit a command to all of the lighting devices within range. This command may contain a timestamp at the time of transmission. Upon receiving the transmission, the lighting devices may time stamp the received time and compare it to the transmit time stamp. If the difference in time from the transmit time to the received time is less than some preset threshold then the lighting device may be within range of the remote control such that it should act on the remote control command. If a lighting device is beyond the range as determined by the time of flight calculation, perhaps in a adjacent room, then it should not act on the remote control command. In some embodiments, light devices throughout an area may communicate between themselves independent of the remote control to synchronize clocks, set up groups or operate in a coordinated fashion.

In embodiments, a disparate device such as a remote control, a remote sensor, another light, a power outage module and the like may alter the transmit power out of a transmitter as a means to control lights located at different ranges with respect to the disparate device differently. In some embodiments, the disparate device controls a wireless lighting module or an externally powered battery embedded wireless lighting device wherein the receiver within the module or device may receive the control from the disparate device. By way of an example, there may be four buttons on a remote control that a user may push. Buttons on the remote control may provide on and off control to all of the wireless lighting modules within a one hundred foot range by transmitting a 10 mW power level control signal or message to all modules within that range. Buttons on the remote control may provide on and off to all of the wireless lighting modules within a fifteen foot range by transmitting a 1.5 mW power level control signal or message to all modules within that range. Further, the wireless lighting modules may be installed throughout a home. By using the different buttons, a user may turn the lights on and off only in the room they are in by using the low power transmit buttons and turn on and off the lights throughout the house by using the high power transmit buttons. It is to be appreciated that any command for lighting including on, off, dimming, color, timing, configuration or programming of lights and the like may be used in connection with the claimed subject matter.

In embodiments, a disparate device such as a remote control, a remote sensor, another light, a power outage module and the like may be capable of transmitting on different control channels as a means to control lights differently located within range with respect to the disparate device. In some embodiments, the disparate device controls a wireless lighting module or an externally powered battery embedded wireless lighting device wherein the receiver within the module or device may receive the control from the disparate device with the control channel being part of the control message. By way of an example, there may be four buttons on a remote control that a user may push on a power outage module. One button on the remote control may provide on and off toggle control to all of the wireless lighting modules within range that are configured to be controlled by a first channel wherein the control signal or message contains an indication of the first channel to control all modules within range. A second, third and fourth button on the power outage module may provide on and off toggle control to all of the wireless lighting modules within range that are configured to be controlled by a second, third and fourth channel respectively wherein the control signal or message contains an indication of those channels to control all modules within range. Further, the wireless lighting modules may be installed throughout a home. By using the different buttons, a user may turn the lights on and off only in an area or zone designated by a particular channel setting. In some embodiments, a wireless lighting module or an externally powered battery embedded wireless lighting device may be configured to respond to more than one channel. In embodiments any number of channels or any format by which one or more devices or modules can be addressed in the command to direct a command to those devices or modules may be implemented. It is to be appreciated that any command for lighting including on, off, dimming, color, timing, configuration or programming of lights and the like may be used in connection with the claimed subject matter.

A wireless lighting system may be comprised of battery powered wireless lighting devices or wireless lighting modules that have an input jack to receive external power, a rechargeable battery inside, a recharge component, a light source, one or more sensors and RF control, an energy harvesting mechanism such as solar panels, wind mills etc and power cabling to cable power from the energy harvesting mechanism to the installed battery powered wireless lighting devices. In one embodiment, a residential house contains an installation of recessed LED light fixtures that are battery powered wireless lighting devices that have a rechargeable battery, recharge component, DC input and wireless control. The residential house may contain solar panels on its rooftop. A power bus from the solar panels may be wired throughout the house such that a power feed plugs into all of the recessed LED light fixtures throughout the house. The battery powered wireless lighting devices may be controlled by motion sensors, light sensor or wireless receiver such that the lights may be turned on, off, dimmed etc remotely by a user. In this embodiment, the batteries may charge during day and be used at night or in day if needed. One or more windmills are adjacent to the residence and a power bus is cabled from the windmills to the residence. In this case, the batteries may be charged during the day or at night. In an embodiment, a second plug in point may be accessible to allow a generator to be plugged in for use if the battery charge is not kept high enough for the lighting devices to operate properly. Assuming 10 W of power required for each fixture, then if there are 20 fixtures lighting for the entire house requires 200 Whr of power. To providing lighting for 5 hours a day requires approximately 1 KWHr per day. In embodiments, a plug in receptacles for lamps may be developed that may allow similar operation of the lamps designed as battery powered wireless lighting devices.

In embodiments, a processor or electrical circuit may provide a mechanism to reduce current through the LED light source when batteries capacity falls below a threshold to lessen the chance that the motion sensor would false trigger when LED light source is turned off. In cases where a motion sensor may be in the wireless lighting device, when the battery provides power to the LED light source, the battery voltage may drop significantly due to the high power consumption of the LED light source. When the motion sensor does not detect motion for some period of time the light source may turn off and the voltage level may increase significantly and quickly potentially causing the motion sensor to falsely trigger. In such a case, reducing the amount of power required by the LED light source may reduce the size of the voltage swing from light source on to light source off and reduce or eliminate the chance of a false trigger. By way of an example, an LED spotlight with a 2 W LED light source, a motion sensor and 3 D cell batteries may detect motion and turn the light source on. Prior to motion detected when the light source is off, the battery voltage may be measured at 4.0V. After the light source is turned on, the battery voltage may be measured at 3.4V. This is caused by the heavy load on the batteries pulling the battery voltage down to a lower voltage. After motion is not detected for some period of time, the light source is turned off and the battery voltage will return to 4.2V in a very short period of time (perhaps in the millisecond range). If upon detecting that the battery voltage has dipped below 4.1V, the processor that controls the current drawn by the LED light source may reduce the current draw by some amount. By way of an example, if the processor reduces the current draw by 50%, the battery voltage with the light source on may only be 3.7V thus reducing the voltage swing from light source on and light source off thus reducing or eliminating the chance that there will be false triggers from the motion sensor.

In embodiments of wireless lighting devices, there may be a charging port accessible in the base of a rechargeable street or sidewalk lamp. In such embodiments, the rechargeable street or sidewalk lamp may be recharged by plugging in an off grid power source to the charging port. In embodiments, the off grid power source may be another battery or may be derived from an energy harvesting method such as using solar cells, capturing radiofrequency energy, converting kinetic energy to electrical energy (including converting motion or tension into electrical energy), converting thermal energy into electrical energy, converting wind energy into electrical energy, and the like. By way of an example, a user may push a cart with a car battery or recharger and plug into a port on the base to recharge. In another example, pads in the street can be used to generate energy to recharge the battery. The pressure from the cars passing over the pads or mats in the street is converted to electrical energy for the charging of the batteries in the lamps. In embodiments of any form of wireless control may be associated with the rechargeable street or sidewalk lamp. Wireless control, as in relation to lighting facilities of the present invention, may be defined as any control aspect that provides a controlling function to the lighting facility without the use of a wired connection, such as a wired control interface, wired power control, and the like. Control aspects may include, but are not limited to, a wireless remote control interface (e.g. RF remote control, another lighting facility), a wireless power controller (e.g. control of the source of power to the LEDs, such as including integrated energy storage device(s) and AC power), a wireless control input (e.g. an environmental sensor input), internal programmed control (e.g. internal program store controlled through a state machine or processor), and the like.

In embodiments of grid shifting devices, a microgrid may be constructed out of renewable energy sources (solar, wind etc) and rechargeable batteries in end devices that are grid shifting capable including lights, appliances, washers, clothes dryers, refrigerators, freezers, etc. The microgrid may be grid tied, might have the ability to off load or power share with the renewable/stored energy sources and may be able to return power to the grid or to other sub-microgrids in the area. For example, four lighting circuits and two electrical circuits with appliances may have embedded rechargeable batteries and grid tie inverters. If one lighting circuit uses all of its stored energy, it may draw energy from one of the other "sub-microgrids".

In embodiments of a night light, the night light may contain a battery backup and port to charge a cell phone or other device. In some embodiments, the night light may be built with an integrated rechargeable battery and a charging circuit for increasing the charge of the integrated battery off of the connection to an outlet supplying AC power. In some embodiments, the batteries may be either rechargeable or non-rechargeable and may be removable and replaceable. In such embodiments, the charging circuit may be capable of distinguishing which type of battery is installed in the night light and may inhibit charging if it is not a battery compatible with the charging circuit. In some embodiments, the night light may have a USB or other connector to allow the rechargeable batteries in the night light to be charged via a USB interface. In some embodiments, the night light may have a USB connector to allow devices to be plugged into it for charging.

In embodiments of wireless lighting devices, a battery powered motion sensor LED light with a day/night sensor may be designed wherein a time delay is implemented from the time the day/night sensor transitions from day to night before the motion sensor is enabled. In such an embodiment, a user can use an overhead light sometimes and when they turn it off, they will not immediately get picked up by the motion sensor. By way of an example, a 3 second delay may be implemented in enabling the motion sensor to provide enough time for someone to exit a room before turning the light on due to motion detection.

In embodiments of wireless lighting devices containing a light sensor, the light sensor may be used as on/off switch. In such embodiments, the light sensor may be behind transparent or semi-transparent cover such that a user may block light into the sensor for example with a finger or hand and turn light on. The wireless lighting device may latch that light on state when the light sensor detects very little or no ambient light for some known amount of time. By way of an example, if circuitry in the wireless lighting device detects a low level of ambient light for between 2 and 10 seconds then returns to a high level of ambient light, the light may be latched in the on state. In some embodiments, the on state entered in this manner may start an auto shutoff timer such that the light may turn off automatically when the timer expires. In alternate embodiments, the light sensor control may be a toggle such that the first action turns the light on, the second action turns the light off and so on. In alternate embodiments, the light sensor control may enable a motion sensor such that the detected motion subsequent to the light sensor control action may turn the light on. In such embodiments, an auto shutoff timer may start when motion is last detected and automatically turn the light off when the timer expires. The light sensor switch may see transition for light level to off to light level in some short period of time. In some embodiments, the light sensor control actions may set timers for different actions based on how long circuitry detects the light sensor below some threshold. By way of an example, 2 seconds turn off, 5 seconds dim by 50%.

In embodiments, a remote control device may use multiple levels of transmit power out of a transmitter to control receiver lights based on proximity to the remote control device. A remote control may be a standalone remote control or incorporated into a disparate device. Moreover the remote control can be a personal computer, a cellular phone, a smart phone, a laptop, a handheld communication device, a handheld computing device or any other suitable device. In an embodiment, four buttons may be present on a standalone remote control. The receiver lights may be battery powered wireless lighting modules or wireless lighting devices that may have a connection to wired power. Two buttons may control all lights within a one hundred foot range by transmitting a signal at approximately 10 mW transmit power level. These two buttons may control lights that are in multiple rooms of a house where the receivers within the lights may be able to receive the transmission. Two other buttons on the standalone remote control may control all lights within a shorter range by putting out a 1.5 mW transmission. These two buttons may control lights that are in within 15 feet from where a user is located such as in the same room or area. Thus, using the lower power transmission buttons a user may turn the lights off only in the room they are in. In an alternate embodiment, the remote control may be a power outage detector that may detect a power outage and transmit control to off grid lights that may be turned on during a power outage. The power outage detector may transmit control at one or more transmit power levels to control off grid lights within different ranges of the power outage detector. By way of an example, multiple power outage detectors may be used in an area such as a house wherein each power outage detector is dedicated to control power outage lighting devices in a dedicated area with the area defined by the transmit power level of the power outage detector. In another example, the power outage detector may be removable from a wall outlet and used as a remote control to turn on and off power outage lighting devices within range. Upon detecting a power outage, the power outage detector may transmit at a high transmit power level however when removed from a wall outlet, the power outage detector used as a remote control may transmit at a lower transmit power level. In such an example, the power outage detector may be able to control all of the lights within house upon detecting a power outage however when removed and used as a remote control it may be capable of controlling only the power outage lights in a shorter range. In operating this way, the power outage detector allows a user to turn lights on and off in areas of a house that they want to control the lighting but during a power outage all lights would turn on automatically. It is to be appreciated that any number of transmit power levels may be used in conjunction with the claimed subject matter.

In embodiments of wireless lighting modules, there may be a low battery indicator inside a battery compartment. In embodiments, there may be one or more colored LEDs or a multicolor LED on a wireless lighting module that may provide a visual indication of the battery level. In embodiments, the low battery indication may be present to alert a user to change or charge batteries. By placing the low battery indicator inside the battery compartment, a weatherproof wireless lighting module may not require an additional weatherproof seal. In embodiments, the low battery indicator inside the battery compartment may also eliminate the need to make the indicator readily viewable by a user. If a user suspects that the battery may need to be changed, the user may remove the cover of the battery compartment and get an indication of the battery level. The indicator may be any color and may represent the status of the battery in any way such as a green LED may indicated that the battery is healthy, a yellow LED may indicate a low battery level, a red LED may indicate a need to change the battery, a multicolor LED may allow several indications in the same LED. Battery powered wireless lighting fixtures may have an icon with light bars within the battery compartment. The light bars may show the battery life of each light fixture. The indicators may always be illuminated or illuminated when a button on the fixture or on a remote is pressed. The battery powered wireless lighting fixture may contain a push button such that a user may test the battery by pushing the button rather than containing an always on indication. The push button may be an illuminated push button to provide the indication. In alternate embodiments, the low battery indicator may be positioned to illuminate the optical lens or light transmitting cover of a wireless lighting module when the battery is low. A user may see a different color light coming from the wireless lighting module where the light source may typically provide light and know from the different color that the battery is at a low level.

In embodiments, a wireless lighting module or device may be capable of receiving command, configuration or control on multiple channels and may be capable of transmitting commands, configuration or control on multiple channels automatically based on pre-programmed operation. The methods in embodiments of the programmable wireless lighting device may include direct configuration or control of the unit through one or more buttons, dials, toggles, switches, levers, knobs, an LED touch screen, a keypad, or any such controls on the unit, configuration of the unit via the communication interface, configuration of the unit by design, configuration of the unit by factory pre-programming, configuration of the unit through processing the inputs and adjusting state appropriately, configuration of the unit through some sequence of action to indicated to the unit a configuration and the like. It is to be appreciated that any combination of programming or configuration method is possible in embodiments of a wireless lighting device. In normal operation, the wireless lighting device may receive input via its interface component or through device programming. Upon receiving an input, the wireless lighting device may process the input and change state of the wireless lighting device or transmit one or more commands on one or more channels to disparate wireless lighting devices. The operation of the wireless lighting device may be to provide coordinated operation of a group of wireless lighting devices, may be to act as a network node to forward or repeat a received packet to other wireless lighting devices and the like. By way of an example, multiple zones may be configured to operate in an area by setting up different channels for each set of wireless lighting devices. Wireless lighting devices may be configured to respond to multiple channel numbers and as such may operate in more than one group of wireless lighting devices.

In an embodiment of wireless controls for a wireless light, a garage door opener transmitter may be used to control a wireless lighting device. In one embodiment, the wireless lighting device is a battery powered LED light with a wireless receiver and processor that may receive and process the transmission of the remote control for a garage door opener. In some embodiments, there may be a method to program the code of the garage door opener into the wireless lighting device such that the wireless lighting device may respond to the transmission and encoding/encryption of the garage door opener. By way of an example, a garage door opener may also control a wireless lighting device such as a porch light or a entry way light such that when the garage door is opened, the wireless lighting device may turn on and when the garage door is closed, the wireless lighting device may turn off.

In embodiments of wireless lighting modules and devices, a wireless remote control transmitter device may be used as a beacon and regularly transmit commands such that when the wireless transmitter is in the range of wireless lighting device such as a battery powered LED lights containing a receiver and responsive to the transmitted command, the lighting device may turn on thereby allowing control of a lighting device through its proximity to the transmitter. In some embodiments, the wireless lighting device. By way of an example, a wireless remote control transmitter device may be installed in an automobile. The transmitter device may transmit an ON command every 3 seconds. When the automobile within range of the receiving light, for example pulling into a driveway or into a garage, the beaconing transmitter will automatically turn on one or more wireless lighting devices. In this example, it may be a porch light, entry way light, path light and the like. The transmitter device keeps transmitting.

After some auto shutoff time, the wireless lights will turn off and not turn on again when hearing the ON command every 3 seconds until the ON command goes away for some period of time for example 30 seconds. Then, the wireless light is reset and begins listening for the ON command again. A user can pull up and park their car and the lights turn on automatically. They get out and walk inside their house. At 2 minutes, for example, the lights shut off automatically and stay off. Later, the user leaves for the grocery store and the wireless lights "reset" and wait for the next ON command. The user returns home and the lights turn on automatically. In some embodiments, a light sensor inside the lights might be used as a day/night sensor to enable the wireless light only when the level of ambient light detected at the light sensor falls below some threshold.

In embodiments of an automatic proximity control for wireless lighting modules and devices, a beaconing wireless transmitter device may be integrated into an automobile, onto a person, on a bike, onto a back pack, on a belt clip, smart phone case, a flashlight or any other object where a user may want to automatically control one or more wireless lights based on the proximity of the beaconing transmitter to the wireless lighting modules and devices. The transmission may send any command described herein including an ON command, brightness command, delayed action command, alert or alarm command or the like. The wireless lighting modules and devices may contain a receiver and processor allowing it to receive and interpret the commands. In some embodiments, the modules and devices may auto shutoff the light source or change the operation of the modules and devices after some period of time based on the received command. By way of an example, the modules and devices may turn ON by the command from the beaconing wireless transmitter device but may turn off after some pre-programmed period of time or period of time received as part of the command. The modules and devices may transition through multiples states managed by a state management component where an input component may receive commands that are interpreted to transition between states and a timer component may manage timing of the transitions between states. A light intensity component may manage the brightness of the modules and devices.

There may be one or more wireless power sources in the beaconing wireless transmitter device, wireless lighting modules and wireless lighting devices. By way of an example, a wireless lighting module may be powered by alkaline batteries. In another example, the beaconing wireless transmitter device may be powered by alkaline batteries or may have a connection such that it is powered by an automobile battery. In some embodiments, a wireless lighting module may be completely off grid. In some embodiments, a wireless lighting device may have a grid connection. In embodiments, the beaconing wireless transmitter device may have additional controls such as push buttons, switches or the like to control the wireless lighting modules and devices. The interface component may provide various adaptors, connectors, channels, communication paths, etc. to enable interaction with the beaconing wireless transmitter device. In one embodiment, the beaconing wireless transmitter device and wireless lighting modules and devices may have a dip switch or channel programming method allowing for a channel number to be assigned for communication only within a specified group. In alternate embodiments there may be methods of interference avoidance in time or frequency such that multiple beaconing wireless transmitter devices may operate in the same area without interfering. In some embodiments, the beaconing wireless transmitter device may be able to transmit at different transmit power levels to allow a user to adjust the range by which the wireless lights are activated. The transmit power level may change automatically based on the programming of the device or sensors that may be designed into the beaconing wireless transmitter device. In some embodiments, a wireless lighting module or device may contain an environmental sensor such as a motion sensor or light sensor. In some embodiments, the receiver may have an audible alert or alarm that may be integrated with the wireless light. By way of an example, a battery powered LED porch light that is controlled by the beaconing wireless transmitter device when the transmitter devices comes into range of the porch light may also have a shrieking alarm that may be enabled by a user to provide a loud audible indication that an object tagged with the beaconing transmitter is within range. The wireless lighting module or device may take the form of at least one of a light bulb capable of mounting into a lighting fixture, a lighting fixture, a retrofit lighting fixture, a lighting adapter, a battery powered lighting fixture, and the like. A battery powered lighting fixture may be installed anywhere and may take the form of a spotlight, ceiling light, path light, night light, porch light, wall light, deck light, garage light, post light, street lamp and the like. The light source may be comprised of at least one of one or more light emitting diodes (LEDs) light sources, an incandescent light source, a fluorescent light source, a halogen light source or the like. By way of an example, a battery powered LED spotlight may be responsive to the beaconing wireless transmitting device. In embodiments, an adapter for a light bulb may responds and can override the switch control. In some embodiments, there may be a battery in the adapter to allow it to power the light source independent of wired power. In some embodiments, the adapter may have its own light source such that the adapter may illuminate in response to the beaconing wireless transmitting device. In some embodiments, the beaconing wireless transmitting device may be capable of sending the wireless transmission in a specific direction. For example, a directional antenna may be used with the beaconing wireless transmitting device such that the object may need to be directed towards the wireless lighting modules and devices to activate them. By way of an example, an automobile with a beaconing wireless transmitting device may be positioned with a direction antenna behind the front grill of the automobile such that the wireless lights may only be activated when the car is oriented with the front of the car pointed towards the lights such as when a car pulls in a driveway.

In embodiments, wireless and battery powered remote sensors for example a motion sensor, magnetic switch, pressure sensor etc may have a transmitter and send to a cellular base station that may interpret the sensor data and send a text or transmit data on a change to the sensor status. In some embodiments, the cellular base station may have a USB port or similar that a network interface device may plug into to allow it to connect to a particular cellular, WAN, LAN or other network. In some embodiments, the cellular base station may have a GSM or CDMA modem integrate that allows it to connect to a wireless network and send a text message to a destination phone number. In embodiments, the destination phone number may be configured at the base station such that a user may configure the device to send texts or emails to any end user they desire. In alternate embodiments, the base station may record information in time from sensors around a house, office, secure area etc and display them in some manner to a user. By way of an example, a motion sensor remote transmitter may detect a child walking into a room or area that they should not be in.

In embodiments of wireless path lights, the wireless path lights may be comprised of a light source, rechargeable battery, charging connector and wireless control. A charging unit or secondary charging device may be plugged into a wireless path light at a charging connector to recharge the battery inside the wireless path light. In such an embodiment, a wireless path light would not have to rely on solar cells to recharge the battery but rather a rechargeable battery inside the device may be charged using a recharging unit eliminating the need for solar energy. The wireless path lights may contain a light source that is brighter than is typical of solar path lights and may hold a greater charge/be able to charge more rapidly with a charging unit. The charging unit may contain multiple connectors to allow several path lights to be charged at the same time.

In embodiments, power supply device or control device may include circuitry to detect conditions that may allow an intelligent decision on which power source to use. The switch sensing device may detect whether the controlling switch or breaker applying power to a battery backed AC powered light bulb is open or closed, if input AC power is present, if the quality of the input AC power is acceptable, and the like. The switch sensing device may monitor the presence and quality of the input AC power with circuitry to detect the presence of AC power and make a measurement of the characteristics of the AC power. It may also measure the impedance, resistance, and/or capacitance of the AC power input or may measure any other electrical characteristic of the AC power input to determine whether the controlling switch or breaker is open or closed (or if electricity has been turned off at any point up to the AC input of the switch sensing device). The switch or breaker may be any type of switch or breaker used to control an electrical or lighting circuit such as but not limited to toggle switches, dimmer switches, three way or multi-way switches, timer controlled switches, motion sensor switches, push button or touch switches, paddle switches, solid state switches, slide switches, rotary switches, switches with specialized intelligence built in, open fuses in the electrical or lighting circuit, poly fuses or poly switches, low, medium or high voltage circuit breakers, magnetic circuit breakers, thermal magnetic circuit breakers, common trip circuit breakers, residual current circuit breakers, earth leakage circuit breakers and the like. In some embodiments, the switch sensing device may store information such that one or more associated light sources may be able to operate as it was when the outage occurred. For example, the switch sensing device may be controlled by a dimmer switch, the switch sensing device may store the dim level and when there is a power outage, the switch sensing device may switch to PWM dimming that is similar to the light intensity level that had been set by the dimmer switch, and the like. By way of an example, if the controlling switch or breaker is open, there may be a high impedance detected on the input AC power. If the controlling switch or breaker is closed, there may be a measurable impedance, resistance and/or capacitance or electrical characteristic different from when the controlling switch or breaker is open. A threshold may be set in the bulb such that if the measurement is above or below the threshold, the switch or breaker is closed, and if the measurement is on the opposite side of the threshold, the switch or breaker is open. The switch sensing device and associated one or more light sources may be controlled by the state of the controlling switch or breaker (on or off), but may also detect the condition when the controlling switch or breaker is closed but AC input power is not present or is not acceptable and may be able to switch over to the rechargeable or non-rechargeable batteries that are embedded as the power source. Thus, the switch sensing device may be able to switch to embedded battery power without directly knowing whether the switch is open or closed, but rather by measuring the electrical characteristics of the AC input. In some embodiments, the switch sensing device may have circuitry to be able to detect the switch transition from on to off or off to on. By way of an example, in a power outage, the wall switch may still be used to control the switch sensing device and associated one or more light sources that are powered by battery to on or off such that even when AC is not applied, a transition from switch closed to switch open will turn off the switch sensing device that is powered by the embedded power source.

In some embodiments, the switch sensing device may perform an impedance discontinuity check to determine if the controlling switch or breaker is open or closed. In some embodiments, the switch sensing device may generate a signal onto the line and monitor the electrical response of the line to determine if the response indicates an impedance discontinuity typical of an open circuit that may be indicative of a switch or breaker open in the lighting circuit or if the response indicates a closed circuit typical of a switch or breaker closed in the lighting circuit. By way of an example, the switch sensing device may perform a function typical of a time domain reflectometer by generating a short rise time pulse at the connection to input and monitor the input for a reflected signal that would be indicative of an open or closed circuit. If the reflected signal exceeds a set threshold, it may indicate an open circuit. In some embodiments, the switch sensing device may learn where such a threshold should be set. The switch sensing device may be installed in many variations of lighting circuits where the amount, length, gauge or type of wiring to the switch or breaker may vary and where there may be many other sources of loads on the lighting circuit (such as bulbs, fixtures, multiple switches or controls etc.) therefore it may have to adjust its detection circuitry to operate properly. The setting of the threshold may be done automatically by the switch sensing device or manually by a user through any process that may allow the bulb to be set to a threshold where one side of the threshold indicates the switch or breaker is open and the other side of the threshold indicates the switch or breaker is closed. It is to be appreciated that when the switch sense functionality is implemented, the switch or breaker may still be able to turn on and off power to the switch sensing device and associated one or more light sources even when running off of the embedded battery power source because the switch sensing device may be able to determine if the switch is on or off and apply power or not apply power to the one or more associated light sources based on the switch position. The switch sense circuitry may still be powered along with any other necessary circuitry to implement this function even when the light source is not being powered. In some embodiments, a device may be designed that may be electrically and mechanically attached to an existing switch or breaker of any type mentioned herein such that it may have electrical characteristics that may be easily detected by the switch sensing device in an outage. The device, a switch sensing detection module, may be an electrical circuit that may monitor the state of the switch, open or closed, and whether power is present at the input side of the switch. If there is no input power, whether the switch is open or closed, the device may insert a circuit with the electrical characteristics that may be easily detected by the one or more switch sensing devices on the lighting circuit. This allows the switching sensing device to be able to detect an outage even when the controlling switch or switches are open by allowing it to be electrically connected to the input side of the switch. There may be control on the device such that the user may enable the switch sensing device to turn on when the light switch is open and there is no power at the input of the switch. If this function is disabled, the user may control the switch sensing device and associated one or more light sources by the controlling switch, but if the function is enabled, the switch sensing device may be capable of switching to battery power whether the controlling switch is open or closed. The device may not be attached to a switch or breaker, but is the switch or breaker itself thus the function may be installed by replacing an existing switch or breaker. In embodiments, the device may physically and electrically be connected anywhere in a lighting or electrical circuit that it would be desirable to detect a power outage. In some cases, the switch sensing device may not be able to reliably detect the state of the switch in which case the device may be added to make the detection of the switch state reliable.

Figure 14:
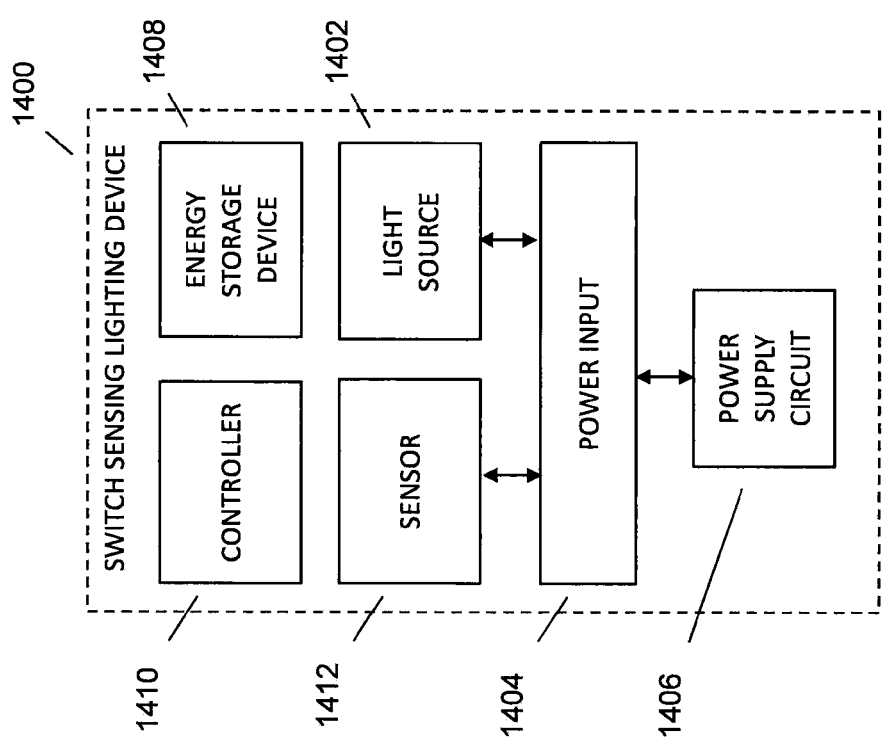
FIG. 14 depicts an embodiment of a switch sensing lighting unit.

Referring to FIG. 14, the present invention may provide a switch sensing lighting unit 1400 capable of detecting the state of a controlling device such that the light source can have an emergency backup that can detect when the user intended to apply power to the light source but power is not present. By way of an example, if the controlling device is a standard wall switch, there would be three states including switch open, switch closed with power applied and switch closed without power applied wherein a switch sensing lighting unit can apply power from a local energy storage device in response to switch closed without power applied. The switch sensing lighting unit 1400 may be comprised of a light source 1402, a power input 1404 in electrical association with the light source and a power supply circuit 1406, an energy storage device 1408, a controller 1410 and a sensor 1412. In some embodiments, the light source may be in the same housing as the other components and in some embodiments the light source may be in a separate housing. In embodiments, a power input 1404 may be adapted to receive power via a power supply circuit 1406 wherein the power supply circuit receives a supply of external power through a controlling device and includes an energy storage device. In one embodiment, the power supply circuit 1406 receives a supply of AC power through a switch and includes a rechargeable battery supplying a source of DC power. The light source 1402 may be comprised of at least one of one or more light emitting diodes (LEDs) light sources, an incandescent light source, a fluorescent light source, a halogen light source or the like adapted to receive power via the power input 1404. A sensor 1412 may be configured to generate an output indicative of an impedance, resistance or capacitance associated with the power supply circuit 1406. A controller 1410 may be configured to determine the operational state of the controlling device through one or more measurements of the sensor output and may cause power from the energy storage device 1408 to be supplied when external power is not present on the power input 1404 and the operational state of the controlling device indicates that the controlling device is in the closed or partially closed state (e.g., is configured to apply power to the power supply circuit 1406). In some embodiments, the controller 1410 may make a plurality of measurements to determine the operational state of the controlling device. The controller 1410 may be configured to determine a first impedance, resistance or capacitance value associated with the power supply circuit 1406 corresponding to an open operational state of the controlling device (e.g., is configured not to apply power to the power supply circuit 1406; in one example it is an open switch). The controller 1410 may be configured to determine a second impedance, resistance or capacitance value associated with the power supply circuit 1406 corresponding to a closed operational state of the controlling device (e.g., is configured to apply power to the power supply circuit 1406; in one example it is a closed switch). The controller 1410 may establish a threshold impedance, resistance or capacitance level based on the first and second values. The controller 1410 may determine a third impedance, resistance or capacitance value associated with the power supply circuit 1406 when external power is not present on the power input 1404 and may cause the power from the energy storage device to be supplied to the light source from the energy storage device 1408 when external power is not present on the power input 1404 and a comparison between the third impedance, resistance or capacitance value and the threshold value indicates the controlling device in the closed state. In some embodiments, the controller 1410 may be configured to allow the threshold value to be manually set. In some embodiments, the controller 1410 may be configured to allow the threshold value to be automatically set by one or measurements of the power supply circuit 1406 wherein the threshold value is determined when the controlling device is in a known state, when the controller 1410 may presume what state the controlling device is in or over a period of time where one or more measurements may provide a statistical sampling that may be used to determine the state of the controlling device. In embodiments, the sensor generates an output indicative of an impedance, resistance or capacitance associated with the power supply circuit 1406 as part of a time domain reflectometry process. In such an embodiment, the sensor 1412 may generate one or more pulses of a given time duration, amplitude etc, monitor the reflective signals and provide a signal to the controller determined by a measurement or analysis of the reflections in response to the one or more pulses corresponding to an impedance discontinuity, impedance, resistance or capacitance associated with the power supply circuit 1406.

In some embodiments, the energy storage device 1408 may be comprised of at least one of a rechargeable battery, non-rechargeable battery such as an alkaline battery, fuel cell, super capacitor, photovoltaic cell or the like. The energy storage device 1408 may be integrated in the same housing with the lighting unit or may be separate from the lighting unit with an electrical connection to the housing. The controller 1410 may be configured to control charging of the energy storage device 1408. In some embodiments, one or more photovoltaic cells may be used to recharge the energy storage device 1408. The switch sensing lighting unit 1400 may be configured for mounting to an Edison socket. In some embodiments, the claimed subject matter may be designed in any size or shape housing to meet the requirements of any standard size bulb (e.g. PAR30, PAR38, A19, R30, MR16 etc), non-standard size bulb, fixture, compact fluorescent bulb, fluorescent bulb or lamp (e.g. T4, T5, T8, circular etc.) or down light assembly (e.g. recessed fixtures, fluorescent fixtures or down light fixtures for residential, commercial or industrial lighting), or the like. The lighting unit may be configured as a retrofit lighting fixture wherein the unit comprises of a housing configured for installation into a preexisting structure. Thus, a user may install or retrofit an emergency light or power failure light that is capable of performing the switch sensing function into an existing location such that there may not be any additional wiring required to add the emergency lighting or power failure lighting function. Typical emergency lighting installations require an unswitched power connection to detect a power outage but a switch sensing lighting unit 1400 may be able to detect the switch position over existing wiring. In other embodiments, the switch sensing lighting unit 1400 may be designed with the switch sensing function contained in a power device such as power supply, ballast, in-line inverter, LED driver or the like with battery backup wherein a connected lighting device such as one or more LED devices, an LED array, an incandescent light bulb, fluorescent tube or the like may accept power from the switch sensing power device wherein the source of power may be from the power supply circuit 1406 or from the energy storage device 1408 converted to a power output as required by the connected lighting device and determined by the sensor 1412 and controller 1410. In some embodiments, the switch sensing lighting unit 1400 may contain a timer to control the supply of power to the light source. In some embodiments, the lighting unit may contain an environmental sensor such as a motion sensor, light sensor or the like. By way of an example, a light sensor may be used by the lighting unit to sense a level of ambient light and control the supply of power to the light source based in part on the output of the light sensor. The controller 1410 may be configured to control the light source to be on or off, the illumination level of the light source or the color of the light source.

In embodiments, a Switch Sensing Power Outage Light Fixture comprising of a light source, an integrated battery, a recharge component, a connection to external power and the switch sensing functionality may be designed in a housing to have the switch sensing functionality operate the light source based on the state of the external power and the state of the controlling switch or device. In embodiments, the light source may be LED, fluorescent, incandescent or the like. In one embodiment, the Switch Sensing Power Outage Light Fixture may operate as a normal light where turning the controlling switch or device on, off, dimming or similar control when there is not a disruption of power however when there is a disruption of power if the switch sensing functionality detects that the switch is closed, it may use the integrated battery as a power source to illuminate the light source. The normal state of the Switch Sensing Power Outage Light Fixture may be that the light source is not illuminated. In those embodiments, the light source may only be illuminated when a disruption of power is detected and the switch is detected such as it intends to apply power to the lighting fixture. The Switch Sensing Power Outage Lighting Fixture may detect the state of a controlling switch or device remotely and the Switch Sensing Power Outage Lighting Fixture may illuminate the light source independent of the state of the other lighting devices based on the state of the switch and power on the circuit. In some embodiments, the Switch Sensing Power Outage Light Fixture may contain a light source, a driver for the light source, a connection to the power circuit, an embedded power source, the ability to sense the state of one or more controlling devices and a control facility to manage the operation of the device. In one embodiment, the Switch Sensing Power Outage Lighting Fixture may be in a housing that contains three 1 W LEDs, an LED driver, a connection to AC power on the circuit it is monitoring, an integrated rechargeable battery, a recharging component, switch sensing circuitry and a processor to act as the control facility to take the detected switch sense and state of power delivered on the circuit and illuminate the LEDs upon certain conditions situated in the same housing. The Fixture may have an electrical circuit to allow an electrical ORing of the power sources or alternatively may have an electrical circuit allowing the control facility to select the power source for the light source. The Switch Sensing Power Outage Lighting Fixture may be installed and operate as a light normally controlled by a wall switch. When the wall switch is on and power is available, the Switch Sensing Power Outage Lighting Fixture may illuminate its light source powered by the AC power. When the wall switch is off, the Switch Sensing Power Outage Lighting Fixture may not illuminate its light source. The processor may control the Switch Sensing Power Outage Lighting Fixture to implement any function described herein for battery backup lighting capable of detecting the state of the controlling switches or devices. The switch sensing circuitry in the Switch Sensing Power Outage Lighting Fixture may not need external components to detect the state of the switch and from a detection of the difference in electrical characteristics at its external power input be capable of determining the state of a controlling switch or device. In embodiments, a system may be comprised of a Switch Sensing Power Outage Lighting Fixture and a power outage detector built into a wall switch or controlling device. The switch sense capability built into a lighting fixture with a power outage detector built into a wall switch allows the Switch Sensing Power Outage Lighting Fixture to detect a power outage prior to an open wall switch via the power outage detector. When the power outage detector presents an impedance or other electrical characteristic that the Switch Sensing Power Outage Lighting Fixture may detect as an additional level, it may allow the control facility to add a state to transition to such that when the switch is open and power is not present prior to the switch, the Switch Sensing Power Outage Lighting Fixture may illuminate its light source. The switch sensing sensor and control facility may be able to set multiple thresholds to allow measurements to indicate different conditions of the electrical characteristics of the electrical circuit where the Fixture resides to indicate different states of the electrical circuit and controlling devices.

In embodiments a system may be comprised of a power outage detector and a switch sense capable device such that the power outage detector may sense the state of power prior to a controlling switch or device and present an impedance or other electrical characteristic that the switch sense capable device may detect as a 3rd level allowing the switch sense capable device to transition to a state based on the state of the power outage detector. In such an embodiment, when the controlling switch or device is open and power is not present prior to the switch, the switch sensing capable device may cause a transition to a new state such as to be powered by a local or integrated power source when the controlling switch or device is open and power is not detected prior to the switch via the power outage detector. Thus, the switch sense capable device may detect three separate states with respect to the electrical characteristics it may measure. It may measure electrical characteristics that indicate controlling switch or device open, controlling switch or device closed or controlling switch or device open with no power prior to the controlling switch or device.

In embodiments, a switch sensing LED light fixture may be comprised of a processor with internal programmable dimming control capability, a connection to external power, a detection circuit to detect whether external power may be present, a switch sense circuit, an integrated battery and an LED lights source. In such an embodiment, the processor may control the intensity of the light source to extend the amount of time in which usable light may be available during a power outage. In some embodiments, the switch sensing LED light fixture may contain intelligence to detect the battery capacity level and adjust the light intensity level to extend the amount of time there is usable light out of the switch sensing LED light fixture. This may take advantage of the characteristic of batteries that at lower continuous current levels the rate of battery drain will be lower. By way of an example, if there is a short power outage, the initial light intensity level may be a high level, however after some amount of battery drain over some period of time, the light intensity level may be dropped to a lower level requiring less continuous current from the batteries, extending the amount of time the light source may run on batteries (anticipating that the power outage may last a long period of time).

In embodiments of lighting devices containing the switch sensing functionality, the switch sense function may contain the ability to measure the electrical characteristics of the building infrastructure supplying power to the switch sensing lighting device. The electrical characteristics may include the electrical response of the circuitry in the power distribution or a branch circuit including the connection to the secondary winding of the transformer supplying power to a building, through the circuit breaker box and through the wiring to every device that may be connected in parallel in the power distribution in a residence, office building etc. On an individual lighting circuit, there may be a power feed to one or more controlling switches or devices that control applying power to the devices on that lighting circuit. Thus, on the downstream side of the switch e.g., on the side of the switch electrically connected to the circuit breaker, all electrical devices are in parallel with one another. In the residential case, this includes other lighting devices, appliances like refrigerators, heaters, televisions, computers and the secondary coil of the transformer when power enters the building. On the upstream side of the switch e.g., on the side of the switch electrically connected to the lighting circuit, all of the electrical and lighting devices connected to the lighting circuit are present. As viewed from the lighting device containing the switch sensing functionality, the electrical characteristics that can be detected such as resistance, capacitance, inductance, impedance discontinuities, responses to generated signals etc are different depending on the state of the controlling switches or devices that control applying power to the devices on the lighting circuit. By way of an example, a wall switch controlling a lighting circuit may have a closed or open position either applying power to the lighting circuit or not applying power to the lighting circuit. If the switch is open, a lighting device containing the switch sensing functionality may detect or measure at its input power connection the electrical characteristics of the devices on the upstream side of the switch for example the incandescent, CFL or LED light bulbs, ballasts, ceiling fans, lighting fixtures, alternate forms of control and the like. If the switch is closed, a lighting device containing the electrical characteristics of the electrical devices, appliances, lighting devices etc on the downstream side of the switch will modify the electrical characteristics of the circuit as detected or measured at the input power connection of the lighting device. The change in electrical characteristics as seen at the input power connection of the lighting device may be due to the electrical characteristics of all of the devices added in both upstream and downstream of the switch contributing to present a different electrical circuit to the lighting device. The difference in electrical characteristics with the switch open and closed allows a lighting device with the switch sensing functionality to determine whether the switch is open or closed without a change or modification the existing infrastructure. The sensor within the lighting device may make the measurement or detection of the electrical characteristics and the control facility may act on that information along with other configuration or programming information to control operation of the lighting device. Embodiments of lighting devices containing the switch sensing functionality eliminate the need for retrofitting, altering the exiting circuitry in the building and provide an out-of-the-box or plug-and-play solution where the entire functionality may be installed with the installation of the lighting device itself.

In embodiments of grid shifting and switch sensing lighting devices, a Grid Shifting Lighting Device with Switch Sensing Capability may be comprised of a connection to external power, a rechargeable energy storage device, a light source, a sensor for detecting the state of a power delivery switch, a control facility and a housing. In embodiments, a user may turn on, off, dim or control the light source using the power delivery switch. When the sensor and control facility detect that the power delivery switch intends to apply external power to the lighting device and external power is not detected by the lighting device, the control facility may apply power to the light source from the rechargeable energy storage device. The Grid Shifting Lighting Device with Switch Sensing Capability may be powered by the rechargeable energy storage device during a power outage. In cases such as a scheduled power outage or rolling blackout, the Grid Shifting Lighting Device with Switch Sensing Capability may provide illumination for an extended period of time allowing normal operation during the outage. By way of an example, a manufacturing facility may be able to continue operation during a scheduled power outage using the Grid Shifting Lighting Device with Switch Sensing Capability which would automatically switch over to the rechargeable energy storage device when the power outage is detected. The power deliver switch will continue to control the lighting device even during the power outage. In embodiments, the lighting device may be programmable, may have a real time clock, may be AC or externally powered and controlled by a wall switch allowing normal light operation, may allow the battery to be recharged while AC power or external power is applied or when power goes out or may allow a user control the light source from the RF remote/controller while powered by the battery power source. In some embodiments, the Grid Shifting Lighting Device with Switch Sensing Capability may have an interface to program the Lighting Device allowing the Lighting Device to be programmed to operate based on time of day. In some embodiments, a wireless receiver in the lighting device allows a user to dim a light or select from multiple lighting levels via a wireless remote control to conserve battery power and thus extend the amount of time that usable light is available. In some embodiments, the power delivery switch contains a motion sensor such that the switch sensing function may detect from the power delivery switch whether motion has been detected to determine whether to illuminate the light source. In such a case, the motion sensor switch may contain a battery such that it may continue to operate during the power outage. The claimed subject matter may be designed in any size or shape housing to meet the requirements of any standard size bulb (e.g. PAR30, PAR38, A19, R30, MR16 etc), non-standard size bulb, fixture, compact fluorescent bulb, fluorescent bulb or lamp (e.g. T4, T5, T8, circular etc.) or down light assembly (e.g. recessed fixtures, fluorescent fixtures or down light fixtures for residential, commercial or industrial lighting), or the like. It is to be appreciated that any combination of wireless control mentioned herein may be used in conjunction with the claimed subject matter.

In embodiments containing the switch sensing functionality, the frequency response of a pulse or signal generated by switch sense circuitry may indicate the position of the controlling switch or devices. In embodiments of the switch sensing functionality containing a sense resistor, a spectrum analysis of the pulse or signal after the sense resistor may provide information to determine the state of the controlling switch. The response of the pulse or signal to the electrical characteristics of the different configurations seen based on the state of the controlling switches or devices may be detected or measured as different based on the state of the switch. By way of an example, some frequency band in the pulse or signal may be significantly attenuated by the electrical characteristics of the power feed to the switch sensing device when the switch is in one state whereas when the switch is in another state the pulse or signal may not be attenuated.

In embodiments containing the switch sensing functionality, the switch sensing function may be in a separate housing from the lighting device. In some embodiments, the switch sensing sensor may be in a separate housing. In some embodiments, the switch sensing sensor and control facility may be in a separate housing. The components of a switch sensing lighting device may be arranged in any manner to implement the switch sensing function for a lighting device and the various arrangements may require electrical or mechanical interfacing between different housings, enclosures, electrical apparatuses etc to implement the switch sensing function for the lighting device.

In some embodiments, an intelligent wall switch may contain one or more environmental sensor and an integrated power source such that the intelligent wall switch may detect an environmental condition and control a lighting device even in the absence of external power at the device. In one embodiment, a motion sensing intelligent wall switch may contain a motion sensor and an integrated rechargeable battery such that a switch sensing circuit inside a lighting device may detect from the motion sensing intelligent wall switch whether motion has been detected to determine whether to illuminate the light source. In such an embodiment, the motion sensor switch contains a battery such that it may continue to operate during the power outage. In such an embodiment, the motion sensing intelligent wall switch may open and close a switch to the external power source when motion is detected however when the switch is closed and external power is not present, the switch sensing circuit inside the lighting device will detect this as a power outage condition and illuminate the light source powered by its local power source. In another embodiment, an intelligent wall switch with an integrated power source and a dimming capability may continue to operate a switch sensing lighting device during a power outage. In such a case, the switch sensing circuit may detect an electrical characteristic that it may associated with an intensity level of the light source such that the control facility in the switch sensing lighting device may PWM control, amplitude control, constant current control etc the light source to achieve the desired light intensity level. In embodiments, a light sensor may be present in the intelligent wall switch and provide a daylight harvesting function during a power outage where the light intensity is set based on the ambient light level detected such that the ambient light plus the light generated by the light source maintain a constant light level. This would be done in conjunction with a switch sensing lighting device such that the switch sensing circuit may detect electrical characteristics of the circuit that represent the light intensity level required of the switch sensing lighting device to maintain the proper light intensity level.

Figure 15:
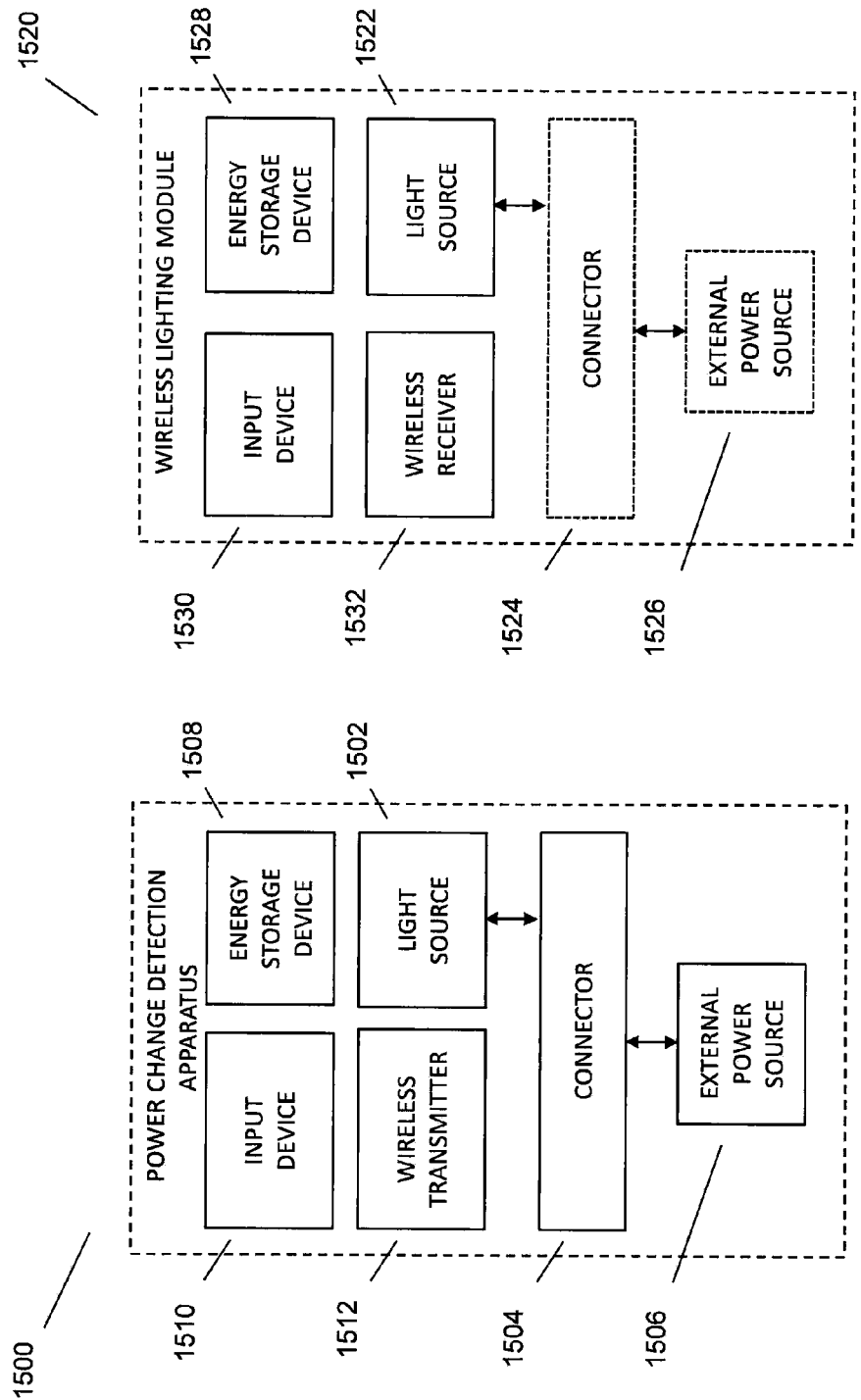
FIG. 15 shows a block diagram of a wireless power outage lighting system where a power change detection apparatus can avoid interference.
Figure 16:
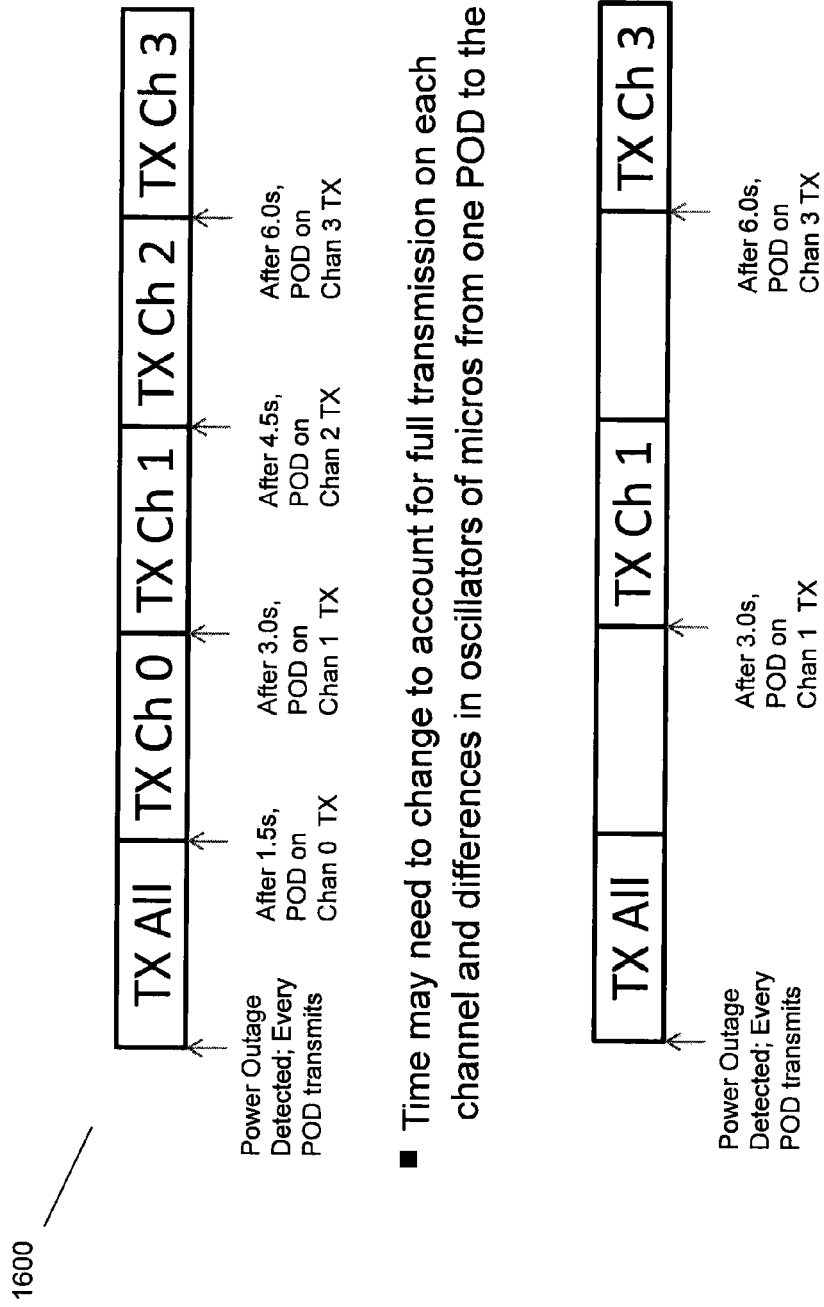
FIG. 16 illustrates embodiments of operating a plurality of power change detection apparatuses in a wireless power outage lighting system.

Referring to FIG. 15, the present invention may provide a wireless power outage lighting system capable of transmitting in a manner that avoids interference the wireless power outage lighting system comprising of at least one power change detection apparatus 1500 and at least one wireless lighting module 1520. The power change detection apparatus 1500 may be comprised of a light source 1502, a connector 1504 in electrical association with an external power source 1506, an energy storage device 1508, an input device 1510, and a wireless transmitter 1512. The wireless lighting module 1520 may be comprised of a light source 1522, an energy storage device 1528, an input device 1530, and a wireless receiver 1532. In some embodiments, the wireless lighting module 1520 may have a connector 1524 in electrical association with an external power source 1526. In some embodiments, the power change detection apparatus 1500 may be comprised of an electric power interface in electrical communication with an electric power source, a detector configured to detect a change in electric power of the electric power source, a wireless transmitter configured to transmit a lighting action command responsive to the detected change in electric power wherein the wireless transmitter avoids interference with the transmission of a second power change detection apparatus 1500 in the same range and an energy storage device configured to provide power to the power change detection apparatus 1500. The wireless transmitter may avoid interference with the transmission of a second power change detection apparatus 1500 in time, frequency or corruption of a transmitted message. In order to operate within the same area, a power change detection apparatus will either have to avoid transmitting at the same time, on the same frequency or do so by encoding or modulating the transmission such that simultaneous transmission more than one power change detection apparatus will be received correctly by the wireless light modules or devices that the transmissions are intended to control. In some embodiments, the power change apparatus may use time division multiplexing or a time slot structure to avoid interference when multiple power change detection apparatuses operate in the same area. In some embodiments, each power change detection apparatus may operate on its own frequency. In embodiments a wireless lighting module or device may be comprised of a light source, a receiver configured to receive a lighting action command directing the wireless lighting module to respond to the detected change in electric power, a power source configured to provide power to the light source, a controller configured to control the power source in response to the lighting action command and a housing including the light source, the receiver and the power source. In embodiments of the wireless power outage lighting system, the wireless transmitter of a first power change detection apparatus avoids interference with the transmission of a second power change detection apparatus by transmitting at a first time delay from a detected change in electric power and the second power change detection apparatus avoids interference with the transmission of the first power change detection apparatus by transmitting at a second time delay from a detected change in electric power. The power change detection apparatuses may use a time delay that is set by assigning a channel number to a power change detection apparatus corresponding to the delay in time of the transmission from the detected change in power. The power change detection apparatuses may have the channel number assigned by at least one of a dip switch, a device programming method or factory configuration. In embodiments, the power change detection apparatuses may transmit the channel number as part of the lighting action command. In embodiments of the wireless power outage lighting system, the wireless transmitter of a first power change detection apparatus avoids interference with the transmission of a second power change detection apparatus by transmitting at a different frequency. In embodiments, the wireless power outage lighting system may have a first group of one or more wireless lighting modules configured to respond to the channel number assigned to a first power change detection apparatus and a second group of one or more wireless lighting modules configured to respond to the channel number assigned to a second power change detection apparatus. FIG. 16 illustrates embodiments of operating the power change detection apparatuses in a wireless power outage lighting system.

In embodiments a wireless lighting module or device may be comprised of a light source, a receiver configured to receive a lighting action command directing the wireless lighting module to respond to the detected change in electric power, a power source configured to provide power to the light source, a controller configured to control the power source in response to the lighting action command and a housing including the light source, the receiver and the power source. In embodiments of the wireless power outage lighting system, the wireless transmitter of a first power change detection apparatus avoids interference with the transmission of a second power change detection apparatus by transmitting at a first time delay from a detected change in electric power and the second power change detection apparatus avoids interference with the transmission of the first power change detection apparatus by transmitting at a second time delay from a detected change in electric power. The power change detection apparatuses may use a time delay that is set by assigning a channel number to a power change detection apparatus corresponding to the delay in time of the transmission from the detected change in power. The power change detection apparatuses may have the channel number assigned by at least one of a dip switch, a device programming method or factory configuration. In embodiments, the power change detection apparatuses may transmit the channel number as part of the lighting action command. In embodiments of the wireless power outage lighting system, the wireless transmitter of a first power change detection apparatus avoids interference with the transmission of a second power change detection apparatus by transmitting at a different frequency. In embodiments, the wireless power outage lighting system may have a first group of one or more wireless lighting modules configured to respond to the channel number assigned to a first power change detection apparatus and a second group of one or more wireless lighting modules configured to respond to the channel number assigned to a second power change detection apparatus.

In an alternate embodiment, the wireless power outage lighting system 1500 may be comprised of at least one power change detection apparatus 1500 and at least one wireless lighting module 1520. The at least one power change detection apparatus may be comprised of an electric power interface in electrical communication with an electric power source, a detector configured to detect a change in electric power of the electric power source, a wireless transmitter configured to transmit a lighting action command responsive to the detected change in electric power wherein the lighting action command contains a channel number, a channel input interface and an energy storage device configured to provide power to the power change detection apparatus. The at least one wireless lighting module or device may be comprised of a light source, a receiver configured to receive a lighting action command directing the wireless lighting module to respond to the detected change in electric power, a power source configured to provide power to the light source, a controller configured to control the power source in response to the lighting action command, a channel input interface and a housing including the light source, the receiver and the power source. In some embodiments of the power change detection apparatus, the channel number is determined by the channel input interface. In some embodiments of the power change detection apparatus, the channel input interface consists of a plurality of push buttons wherein the each push button corresponds to a lighting action command containing a channel number corresponding to that push button. In some embodiments of the at least one wireless lighting module, the channel number is selected by using the channel input interface comprising at least one of a dip switch or a device programming method. In some embodiments of the wireless power outage lighting system, a first group of one or more wireless lighting modules is configured to respond to the channel number assigned to a first lighting action command of the power change detection apparatus and a second group of one or more wireless lighting modules is configured to respond to the channel number assigned to a second lighting action command of the power change detection apparatus. Any combination of wireless control mentioned herein may be used in conjunction with the claimed subject matter.

The invention claimed is:

1. A wireless power outage lighting system, comprising:
a first power change detection apparatus comprising:
a first electric power interface in electrical communication with an electric power source;
a first detector configured to detect a change in electric power of the electric power source;
a first wireless transmitter configured to transmit, to a first wireless lighting module, a first lighting action command after a first time delay and in response to the detected change in electric power; and
a first energy storage device configured to provide power to the first power change detection apparatus;
the first wireless lighting module comprising:
a light source;
a receiver configured to receive the first lighting action command directing the first wireless lighting module to respond to the detected change in electric power;
a power source configured to provide power to the light source;
a controller configured to control the power source in response to the lighting action command; and
a housing including the light source, the receiver and the power source;
the wireless power outage lighting system further including: a second power change detection apparatus comprising:
a second electric power interface in electrical communication with the electric power source;
a second detector configured to detect the change in the electric power of the electric power source; and
a second wireless transmitter configured to, in response to the detected change, transmit a second lighting action command to a second wireless lighting module after a second time delay to avoid interference with the first wireless transmitter, wherein the second lighting action command directs the second wireless lighting module to respond to the detected change in electric power.

2. The wireless power outage lighting system of claim 1, wherein the first time delay is set by assigning a channel number to the first power change detection apparatus, the channel number corresponding to the first time delay of the transmission.

3. The wireless power outage lighting system of claim 2, wherein the channel number is assigned by at least one of a dip switch, a device programming method or factory configuration.

4. The wireless power outage lighting system of claim 2, wherein the channel number is transmitted as part of the first lighting action command.

5. The wireless power outage lighting system of claim 1, wherein the first wireless transmitter of the first power change detection apparatus is configured to transmit at a different frequency from the second power change detection apparatus.

6. The wireless power outage lighting system of claim 1, wherein a first group of one or more wireless lighting modules is configured to respond to the channel number assigned to the first power change detection apparatus and a second group of one or more wireless lighting modules is configured to respond to the channel number assigned to the second power change detection apparatus.

7. A wireless power outage lighting system, comprising:
a first power change detection apparatus comprising:
a first electric power interface in electrical communication with an electric power source;
a first detector configured to detect a change in electric power of the electric power source;
a first wireless transmitter configured to transmit, to a first wireless lighting module, a first lighting action command on a first channel responsive to the detected change in electric power, wherein the first lighting action command contains a first channel number corresponding to the first channel;
a first channel input interface; and
a first energy storage device configured to provide power to the power change detection apparatus;
the first wireless lighting module comprising:
a light source;
a receiver configured to receive the first lighting action command directing the first wireless lighting module to respond to the detected change in electric power;
a power source configured to provide power to the light source;
a controller configured to control the power source in response to the first lighting action command;
a channel input interface; and
a housing including the light source, the receiver and the power source;
the wireless power outage lighting system further including: a second power change detection apparatus comprising:
a second electric power interface in electrical communication with the electric power source;
a second detector configured to detect the change in the electric power of the electric power source;
a second channel input interface; and
a second wireless transmitter configured to, in response to the detected change, transmit a second lighting action command to a second wireless lighting module on a second channel to avoid interference with the first wireless transmitter, wherein the second lighting action command contains a second channel number corresponding to the second channel, and the second lighting action command directs the second wireless lighting module to respond to the detected change in electric power.

8. The wireless power outage lighting system of claim 7, wherein the first channel number is determined by the first channel input interface.

9. The wireless power outage lighting system of claim 7, wherein the first channel input interface includes a plurality of push buttons, and wherein the each push button corresponds to a lighting action command containing a channel number corresponding to that push button.

10. The wireless power outage lighting system of claim 7, wherein the first channel number is selected by using the first channel input interface comprising at least one of a dip switch or a device programming method.

11. The wireless power outage lighting system of claim 7, wherein a first group of one or more wireless lighting modules is configured to respond to the first channel number assigned to the first lighting action command of the first power change detection apparatus and a second group of one or more wireless lighting modules is configured to respond to the second channel number assigned to the second lighting action command of the second power change detection apparatus.

* * * * *